United States Patent
Minnen

(10) Patent No.: US 10,642,364 B2
(45) Date of Patent: May 5, 2020

(54) PROCESSING TRACKING AND RECOGNITION DATA IN GESTURAL RECOGNITION SYSTEMS

(71) Applicant: OBLONG INDUSTRIES, INC., Los Angeles, CA (US)

(72) Inventor: David Minnen, Santa Monica, CA (US)

(73) Assignee: Oblong Industries, Inc., Los Angeles, CA (US)

(*) Notice: Subject to any disclaimer, the term of this patent is extended or adjusted under 35 U.S.C. 154(b) by 0 days.

(21) Appl. No.: 14/064,736

(22) Filed: Oct. 28, 2013

(65) Prior Publication Data

US 2014/0240231 A1 Aug. 28, 2014

Related U.S. Application Data

(63) Continuation-in-part of application No. 12/572,689, filed on Oct. 2, 2009, now Pat. No. 8,866,740, and a
(Continued)

(51) Int. Cl.
*G06F 3/01* (2006.01)
*G06F 3/00* (2006.01)
(Continued)

(52) U.S. Cl.
CPC .............. *G06F 3/017* (2013.01); *G06F 3/005* (2013.01); *G06F 3/011* (2013.01); *G06F 3/0325* (2013.01);
(Continued)

(58) Field of Classification Search
None
See application file for complete search history.

(56) References Cited

U.S. PATENT DOCUMENTS 4,843,568 A 6/1989 Krueger et al.
5,454,043 A 9/1995 Freeman
(Continued)

FOREIGN PATENT DOCUMENTS

WO 8909972 A1 10/1989
WO 9935633 A3 9/1999
(Continued)

OTHER PUBLICATIONS

Addison-Wesley: "Inside Macintosh—vol. I", vol. I Chapter 1-8, Jan. 1, 1985 (Jan. 1, 1985), pp. 1-58.
(Continued)

*Primary Examiner* — Charles E Anya
(74) *Attorney, Agent, or Firm* — Jeffrey Schox; Shant Tchakerian

(57) ABSTRACT

Systems and methods are described for detecting an event of a source device, and generating at least one data sequence comprising device event data specifying the event and state information of the event. The device event data and state information are type-specific data having a type corresponding to an application of the source device. A data capsule is formed to include the at least one data sequence. The data capsule has a data structure comprising an application-independent representation of the at least one data sequence. The systems and methods detect poses and motion of an object, translate the poses and motion into a control signal using a gesture notation, and control a computer application using the control signal. The systems and methods automatically detect a gesture of a body, translate the gesture to a gesture signal, and control a component coupled to a computer in response to the gesture signal.

34 Claims, 74 Drawing Sheets

Related U.S. Application Data continuation-in-part of application No. 12/572,698, filed on Oct. 2, 2009, now Pat. No. 8,830,168, and a continuation-in-part of application No. 13/850,837, filed on Mar. 26, 2013, now Pat. No. 9,804,902, and a continuation-in-part of application No. 12/417,252, filed on Apr. 2, 2009, now Pat. No. 9,075,441, and a continuation-in-part of application No. 12/487,623, filed on Jun. 18, 2009, now abandoned, and a continuation-in-part of application No. 12/553,845, filed on Sep. 3, 2009, now Pat. No. 8,531,396, and a continuation-in-part of application No. 12/553,902, filed on Sep. 3, 2009, now Pat. No. 8,537,111, and a continuation-in-part of application No. 12/553,929, filed on Sep. 3, 2009, now Pat. No. 8,537,112, and a continuation-in-part of application No. 12/557,464, filed on Sep. 10, 2009, now Pat. No. 9,910,497, and a continuation-in-part of application No. 12/579,340, filed on Oct. 14, 2009, now Pat. No. 9,063,801, and a continuation-in-part of application No. 13/759,472, filed on Feb. 5, 2013, now Pat. No. 9,495,228, and a continuation-in-part of application No. 12/579,372, filed on Oct. 14, 2009, now Pat. No. 9,052,970, and a continuation-in-part of application No. 12/773,605, filed on May 4, 2010, now Pat. No. 8,681,098, and a continuation-in-part of application No. 12/773,667, filed on May 4, 2010, now Pat. No. 8,723,795, and a continuation-in-part of application No. 12/789,129, filed on May 27, 2010, now Pat. No. 9,823,747, and a continuation-in-part of application No. 12/789,262, filed on May 27, 2010, now Pat. No. 8,669,939, and a continuation-in-part of application No. 12/789,302, filed on May 27, 2010, now Pat. No. 8,665,213, and a continuation-in-part of application No. 13/430,509, filed on Mar. 26, 2012, now Pat. No. 8,941,588, and a continuation-in-part of application No. 13/430,626, filed on Mar. 26, 2012, now Pat. No. 8,896,531, and a continuation-in-part of application No. 13/532,527, filed on Jun. 25, 2012, now Pat. No. 8,941,589, and a continuation-in-part of application No. 13/532,605, filed on Jun. 25, 2012, now abandoned, and a continuation-in-part of application No. 13/532,628, filed on Jun. 25, 2012, now Pat. No. 8,941,590, and a continuation-in-part of application No. 13/888,174, filed on May 6, 2013, now Pat. No. 8,890,813, and a continuation-in-part of application No. 13/909,980, filed on Jun. 4, 2013, now abandoned, and a continuation-in-part of application No. 14/048,747, filed on Oct. 8, 2013, now Pat. No. 9,952,673.

(60) Provisional application No. 61/719,109, filed on Oct. 26, 2012, provisional application No. 61/722,007, filed on Nov. 2, 2012, provisional application No. 61/725,449, filed on Nov. 12, 2012, provisional application No. 61/787,792, filed on Mar. 15, 2013, provisional application No. 61/785,053, filed on Mar. 14, 2013, provisional application No. 61/787,650, filed on Mar. 15, 2013, provisional application No. 61/747,940, filed on Dec. 31, 2012.

(51) Int. Cl.
*G06K 9/00* (2006.01)
*G06F 3/03* (2006.01)
*H04N 7/15* (2006.01)

(52) U.S. Cl.
CPC ..... *G06K 9/00201* (2013.01); *G06K 9/00335* (2013.01); *G06K 9/00362* (2013.01); *G06K 9/00375* (2013.01); *H04N 7/15* (2013.01)

(56) References Cited

U.S. PATENT DOCUMENTS

| | | |
|---|---|---|
| 5,581,276 A | 12/1996 | Cipolla et al. |
| 5,594,469 A | 1/1997 | Freeman et al. |
| 5,651,107 A | 7/1997 | Frank et al. |
| 5,982,352 A | 11/1999 | Pryor |
| 6,002,808 A | 12/1999 | Freeman |
| 6,043,805 A | 3/2000 | Hsieh |
| 6,049,798 A | 4/2000 | Bishop et al. |
| 6,072,494 A | 6/2000 | Nguyen |
| 6,075,895 A | 6/2000 | Qiao et al. |
| 6,191,773 B1 | 2/2001 | Maruno et al. |
| 6,198,485 B1 | 3/2001 | Mack et al. |
| 6,215,890 B1 | 4/2001 | Matsuo et al. |
| 6,222,465 B1 | 4/2001 | Kumar et al. |
| 6,256,033 B1 | 7/2001 | Nguyen |
| 6,351,744 B1 | 2/2002 | Landresse |
| 6,385,331 B2 | 5/2002 | Harakawa et al. |
| 6,456,728 B1 | 9/2002 | Doi et al. |
| 6,486,874 B1 * | 11/2002 | Muthuswamy ..... G06F 3/04883 178/18.01 |
| 6,501,515 B1 | 12/2002 | Iwamura |
| 6,515,669 B1 | 2/2003 | Mohri |
| 6,703,999 B1 | 3/2004 | Iwanami et al. |
| 6,819,782 B1 | 11/2004 | Imagawa et al. |
| 7,034,807 B2 | 4/2006 | Maggioni |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,109,970 B1 | 9/2006 | Miller |
| 7,129,927 B2 | 10/2006 | Mattsson |
| 7,145,551 B1 | 12/2006 | Bathiche et al. |
| 7,170,492 B2 | 1/2007 | Bell |
| 7,227,526 B2 | 6/2007 | Hildreth et al. |
| 7,229,017 B2 | 6/2007 | Richley et al. |
| 7,259,747 B2 | 8/2007 | Bell |
| 7,340,077 B2 | 3/2008 | Gokturk et al. |
| 7,348,963 B2 | 3/2008 | Bell |
| 7,366,368 B2 | 4/2008 | Morrow et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,421,093 B2 | 9/2008 | Hildreth et al. |
| 7,428,542 B1 | 9/2008 | Fink et al. |
| 7,430,312 B2 | 9/2008 | Gu |
| 7,466,308 B2 | 12/2008 | Dehlin |
| 7,559,053 B2 | 7/2009 | Krassovsky et al. |
| 7,598,942 B2 | 10/2009 | Underkoffler et al. |
| 7,665,041 B2 | 2/2010 | Wilson et al. |
| 7,834,846 B1 | 11/2010 | Bell |
| 7,850,526 B2 | 12/2010 | Zalewski et al. |
| 7,979,850 B2 | 7/2011 | Ivanov et al. |
| 8,059,089 B2 | 11/2011 | Daniel |
| 8,212,550 B2 | 7/2012 | Katsurahira et al. |
| 8,363,098 B2 | 1/2013 | Rosener et al. |
| 8,370,383 B2 | 2/2013 | Kramer et al. |
| 8,407,725 B2 | 3/2013 | Kramer et al. |
| 8,531,396 B2 | 9/2013 | Underkoffler et al. |
| 8,537,111 B2 | 9/2013 | Underkoffler et al. |
| 8,537,112 B2 | 9/2013 | Underkoffler et al. |
| 8,625,849 B2 | 1/2014 | Hildreth et al. |
| 8,669,939 B2 | 3/2014 | Underkoffler et al. |
| 8,681,098 B2 | 3/2014 | Underkoffler et al. |
| 8,723,795 B2 | 5/2014 | Underkoffler et al. |
| 8,745,541 B2 | 6/2014 | Wilson et al. |
| 10,353,483 B2 | 7/2019 | Kramer et al. |
| 2002/0041327 A1 | 4/2002 | Hildreth et al. |
| 2002/0065950 A1 | 5/2002 | Katz et al. |
| 2002/0126876 A1 | 9/2002 | Paul et al. |
| 2002/0184401 A1 | 12/2002 | Kadel et al. |
| 2002/0186200 A1 | 12/2002 | Green |

(56) References Cited

U.S. PATENT DOCUMENTS

| | | |
|---|---|---|
| 2002/0186221 A1 | 12/2002 | Bell |
| 2002/0194393 A1 | 12/2002 | Hrischuk et al. |
| 2003/0048280 A1 | 3/2003 | Russell |
| 2003/0076293 A1 | 4/2003 | Mattsson |
| 2003/0103091 A1 | 6/2003 | Wong et al. |
| 2003/0169944 A1 | 9/2003 | Dowski et al. |
| 2004/0125076 A1 | 7/2004 | Green |
| 2004/0145808 A1 | 7/2004 | Cathey et al. |
| 2004/0161132 A1 | 8/2004 | Cohen et al. |
| 2004/0183775 A1 | 9/2004 | Bell |
| 2004/0193413 A1 | 9/2004 | Wilson et al. |
| 2005/0006154 A1 | 1/2005 | Back et al. |
| 2005/0031166 A1 | 2/2005 | Fujimura et al. |
| 2005/0212753 A1 | 9/2005 | Marvit et al. |
| 2005/0257013 A1 | 11/2005 | Ma |
| 2006/0010400 A1* | 1/2006 | Dehlin .................. G06F 3/0354 715/856 |
| 2006/0055684 A1 | 3/2006 | Rimas-Ribikauskas et al. |
| 2006/0098873 A1 | 5/2006 | Hildreth et al. |
| 2006/0138225 A1 | 6/2006 | Richley et al. |
| 2006/0173929 A1 | 8/2006 | Wilson |
| 2006/0177103 A1 | 8/2006 | Hildreth |
| 2006/0187196 A1 | 8/2006 | Underkoffler et al. |
| 2006/0208169 A1 | 9/2006 | Breed et al. |
| 2006/0210112 A1* | 9/2006 | Cohen ................. G06K 9/00348 382/103 |
| 2006/0269145 A1 | 11/2006 | Roberts |
| 2006/0281453 A1 | 12/2006 | Jaiswal et al. |
| 2007/0021208 A1 | 1/2007 | Mao et al. |
| 2007/0109266 A1* | 5/2007 | Davis ...................... G06F 3/002 345/163 |
| 2007/0112714 A1 | 5/2007 | Fairweather |
| 2007/0121125 A1 | 5/2007 | Dodge et al. |
| 2007/0139541 A1 | 6/2007 | Fein et al. |
| 2007/0266310 A1 | 11/2007 | Sasaki et al. |
| 2007/0282951 A1 | 12/2007 | Selimis et al. |
| 2007/0288467 A1* | 12/2007 | Strassner et al. ................ 707/10 |
| 2008/0013793 A1* | 1/2008 | Hillis ................... G03H 1/0005 382/114 |
| 2008/0018595 A1 | 1/2008 | Hildreth et al. |
| 2008/0030460 A1 | 2/2008 | Hildreth et al. |
| 2008/0036743 A1* | 2/2008 | Westerman ............. G06F 3/038 345/173 |
| 2008/0056536 A1 | 3/2008 | Hildreth et al. |
| 2008/0059578 A1 | 3/2008 | Albertson et al. |
| 2008/0062123 A1 | 3/2008 | Bell |
| 2008/0112592 A1 | 5/2008 | Wu et al. |
| 2008/0114873 A1* | 5/2008 | Chakravarty et al. ......... 709/224 |
| 2008/0137913 A1 | 6/2008 | Hildreth |
| 2008/0148149 A1* | 6/2008 | Singh ..................... G06F 3/038 715/700 |
| 2008/0166022 A1 | 7/2008 | Hildreth |
| 2008/0170776 A1* | 7/2008 | Albertson ............... G06F 21/35 382/154 |
| 2008/0187178 A1 | 8/2008 | Shamaie |
| 2008/0199071 A1 | 8/2008 | Gu |
| 2008/0205701 A1 | 8/2008 | Shamaie et al. |
| 2008/0208517 A1 | 8/2008 | Shamaie |
| 2008/0219502 A1 | 9/2008 | Shamaie |
| 2008/0235965 A1 | 10/2008 | Jaiswal et al. |
| 2008/0267447 A1 | 10/2008 | Kelusky et al. |
| 2008/0273755 A1 | 11/2008 | Hildreth |
| 2009/0003686 A1 | 1/2009 | Gu |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0051648 A1 | 2/2009 | Shamaie et al. |
| 2009/0052785 A1 | 2/2009 | Shamaie |
| 2009/0079813 A1 | 3/2009 | Hildreth |
| 2010/0013905 A1 | 1/2010 | Kumar et al. |
| 2010/0060568 A1 | 3/2010 | Fisher et al. |
| 2010/0063813 A1 | 3/2010 | Richter et al. |
| 2010/0066821 A1 | 3/2010 | Rosener et al. |
| 2010/0090946 A1 | 4/2010 | Underkoffler et al. |
| 2010/0128062 A1 | 5/2010 | Kramer et al. |
| 2010/0131549 A1 | 5/2010 | Kramer et al. |
| 2010/0188328 A1 | 7/2010 | Dodge et al. |
| 2010/0207607 A1 | 8/2010 | Katsurahira et al. |
| 2010/0306713 A1 | 12/2010 | Geisner et al. |
| 2010/0315439 A1 | 12/2010 | Huang et al. |
| 2011/0025598 A1 | 2/2011 | Underkoffler et al. |
| 2011/0173632 A1 | 7/2011 | Arimilli et al. |
| 2012/0054671 A1 | 3/2012 | Thompson et al. |
| 2012/0200494 A1 | 8/2012 | Perski et al. |
| 2012/0206337 A1 | 8/2012 | Hildreth et al. |
| 2012/0229383 A1 | 9/2012 | Hamilton et al. |
| 2012/0239396 A1 | 9/2012 | Johnston et al. |
| 2014/0325373 A1 | 10/2014 | Kramer et al. |
| 2015/0077326 A1 | 3/2015 | Kramer et al. |

FOREIGN PATENT DOCUMENTS

| | | |
|---|---|---|
| WO | 2008134452 A2 | 11/2008 |
| WO | 2010030822 A1 | 3/2010 |

OTHER PUBLICATIONS

Bacon J., et al., "Using Events to Build Distributed Applications", Second International Workshop on Services in Distributed and Networked Environments, 1995, pp. 148-155.

European Search Report for Application No. EP09014670, dated Jan. 4, 2013, 20 pages.

Form PCT/ISA/210, PCT/US06/04497, "PCT International Search Report," 1 page.

Form PCT/ISA/210, PCT/US08/61457, "PCT International Search Report," 2 pages.

Form PCT/ISA/210, PCT/US09/39285, "PCT International Search Report," 2 pages.

Form PCT/ISA/220, PCT/US06/04497, "PCT Notification of Transmittal of the International Search Report and the Written Opinion of the International Searching Authority, or the Declaration," 1 page.

Form PCT/ISA/220, PCT/US08/61457, "PCT Notification of Transmittal of the International Search Report and the Written Opinion of the International Searching Authority, or the Declaration," 1 page.

Form PCT/ISA/220, PCT/US09/39285, "PCT Notification of Transmittal of the International Search Report and the Written Opinion of the International Searching Authority, or the Declaration," 1 page.

Form PCT/ISA/237, PCT/US06/04497, "PCT Written Opinion of the International Searching Authority," 3 pages.

Form PCT/ISA/237, PCT/US08/61457, "PCT Written Opinion of the International Searching Authority," 6 pages.

Form PCT/ISA/237, PCT/US09/39285, "PCT Written Opinion of the International Searching Authority," 6 pages.

Form/IB/373, PCT/US06/04497, "International Report on Patentability," 1 page.

International Search Report and Written Opinion for Application No. PCT/US2013/067129, dated Mar. 27, 2014, 5 pages.

International Search Report and Written Opinion for Application No. PCT/US2013/069725, dated Mar. 27, 2014, 5 pages.

Jiang H., et al., "Demis: A Dynamic Event Model for Interactive Systems", Proceedings of the Acm Symposium on Virtual Reality Software and Technology, 2002, pp. 97-104.

Johanson B., et al., "The Event Heap: A Coordination Infrastructure for Interactive Workspaces", Proceedings Fourth IEEE Workshop on Mobile Computing Systems and Applications, 2002, pp. 83-93.

Johanson B., et al., "The Interactive Workspaces Project: Experiences with Ubiquitous Computing Rooms", IEEE Pervasive Computing, 2002, vol. 1 (2), pp. 67-74.

Mansouri-Samani M., et al., "A Configurable Event Service for Distributed Systems", Third International Conference on Annapolis Configurable Distributed Systems, 1996, pp. 210-217.

Michael J Carey., et al., "The Architecture of the Exodus Extensible Dbms", Proceeding OODS, 1986, pp. 52-65.

Partial European Search Report for Application No. EP09014670, dated Aug. 3, 2012, 7 pages.

Partial European Search Report for Application No. EP10781229, dated Dec. 3, 2014, 6 pages.

(56) References Cited

OTHER PUBLICATIONS

Rubine D., "Specifying Gestures by Example", Computer Graphics, 1991, vol. 25 (4), pp. 329-337.
Supplementary European Search Report for Application No. EP06720525, dated Jul. 22, 2010, 6 pages.
Supplementary European Search Report for Application No. EP09728557, dated Sep. 29, 2014, 11 pages.
Supplementary European Search Report for Application No. EP09767774, dated Feb. 27, 2013, 11 pages.
Supplementary European Search Report for Application No. EP09812234, dated Sep. 6, 2011, 6 pages.
Supplementary European Search Report for Application No. EP09821219, dated Oct. 2, 2014, 8 pages.
Supplementary European Search Report for Application No. EP10772727, dated Nov. 26, 2012, 5 pages.
Supplementary European Search Report for Application No. EP10781229, dated Mar. 23, 2015, 11 pages.
Supplementary European Search Report for Application No. EP12802574, dated May 19, 2015, 6 pages.
Velipasalar S., et al., "Specifying, Interpreting and Detecting High-level, Spatio-Temporal Composite Events in Single and Multi-Camera Systems", Conference on Computer Vision and Pattern Recognition Workshop, 2006, pp. 110-110.
William A McCuskey., "On Automatic Design of Data Organization", American Federation of Information Processing Societies, 1970, pp. 187-199.

* cited by examiner (a) *fist*  (b) *ofp-closed*  (c) *ofp-open-left*  (d) *ofp-open-right*

(e) *open-hand*  (f) *palm-open-left*  (g) *palm-open-right*  (h) *victory*

(a) *open-hand*

(b) *ofp-open-left*

Depict pose with left hand as viewed from back p = pinkie
r = ring finger
m = middle finger
i = index finger
t = thumb ^ = curled non-thumb
> = curled thumb
| = straight finger or thumb pointed straight up
\ or / = straight finger or thumb pointing at angle
x = finger or thumb pointing into plane

| Pose name | p | r | m | i | t |
|---|---|---|---|---|---|
| | \multicolumn{5}{c}{Hand Pose} | | | | |
| fist | ^ | ^ | ^ | ^ | > |
| ofp-closed | ^ | ^ | ^ | \| | > |
| ofp-open-left | ^ | ^ | ^ | \| | - |
| ofp-open-right | ^ | ^ | ^ | \| | - |
| open hand | \ | / | \ | / | - |
| palm open left | \| | \| | \| | \| | - |
| palm open right | \| | \| | \| | \| | - |
| victory | ^ | ^ | \ | / | > |

FIG. 12

Add hand orientation to complete pose must specify two variables
1. palm direction (if hand were flat)
2. finger direction (if hand were flat)

| - | medial |
| + | lateral |
| x | anterior |
| * | posterior |
| ^ | cranial |
| v | caudal | orientation variables come after colon, e.g.:

^ ^ x | - : - x        x-y-z start position

^ ^ \ / > : * v        upside-down v

FIG. 13 gestures for spatial mapping application in kiosk

| ID | Label | Description | | Hand 1 | | Hand 2 |
|---|---|---|---|---|---|---|
| 1 | grabnav / pan & zoom | drive cursor in zoom and lock cursor to map for lateral or depth scrolling | VV-x^ or IIII-x^ to ^^^> | open hand or open palm pushing into screen transitions to fist, which can move in xy - or z plane | | |
| 2 | palette | prompts lens menu | ^^^|-x^ | ofp-open ceiling transitions to thumb click | | |
| 3 | victory | full rest out of lens selection | ^^V>:x^ | V-sign | | |
| 4 | frame-it | creates an instance of lens that can be resized | ^^^|-x^ | ofp-open hands with the index fingers parallel point upward toward the ceiling. | ^^^|-x^ | ofp-open hands with the index fingers parallel point upward toward the ceiling |
| 5 | cinematographer | change aspect ratio of lens, i.e. resize | ^^^|-x^ | ofp-open hands with the index finger pointing upward toward the ceiling. | ^^^|-x^ | ofp-open hands with the index fingers perpendicular to hand-1 index finger |

FIG. 14 gestures for media browser application in kiosk

| ID | Label | Description | Hand 1 | | Hand 2 | |
|---|---|---|---|---|---|---|
| 4 | frame-it | creates an instance of lens that can then be resized | ^^^\|-:x^ | ofp-open hands with the index fingers parallel point upward toward the ceiling. | ^^^\|-:x^ | ofp-open hands with the index fingers parallel point upward toward the ceiling |
| 5 | cinematographer | change aspect ratio of lens, i.e. resize | ^^^\|-:x^ | ofp-open hands with the index finger pointing upward toward the ceiling. | ^^^\|-:x^ | ofp-open hands with the index fingers perpendicular to hand-1 index finger |
| 6 | click L/R | click left/right to previous/next | ^^^\|-:x^ | Ofp-open followed by clicking thumb up | | |
| 7 | home/end | jump to first or last slide, reflecting direction of point | ^^^\|-:x^ or ^^^\|>:x^ | ofp-open or ofp-closed points to fist | ^^^\|>:x^ | fist |
| 8 | pushback | push slides into receding perspective, enabling rapid scrolling across slides | \|\|\|-:x^ | Push palm toward screen | | |
| 9 | jog dial | velocity-based scrolling through slides | ^^^\|-:x^ | ofp-open | ^^^\|>:x^ | ofp-closed |

FIG. 15 gestures for a suite including upload/pointer/rotate applications in kiosk

| ID | Label | Description | | Hand 1 | Hand 2 |
|---|---|---|---|---|---|
| 3 | victory | select application from suite menu | ^^\/>:x^ | V-sign | |
| 8 | pushback | navigate application choices in suite menu | IIII-:x^ | Push palm toward screen | |

FIG. 16

1. Depict pose with left hand as viewed from back p = pinkie finger
r = ring finger
m = middle finger
i = index finger
t = thumb

| ^ | = curled non-thumb |
| > | = curled thumb |
| \| | = straight finger or thumb pointed straight up |
| \ or / | = straight finger or thumb pointed at angle |
| - | = thumb pointing straight sideways |
| x | = finger or thumb pointing into plane |

| Pose name | p | r | m | i | t |
|---|---|---|---|---|---|
| | | | Hand Pose | | |
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x·y·z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIG. 22

2. Add hand orientation to complete pose must specify two variables:
   1. palm direction (if hand were flat)
   2. finger direction (if hand were flat)

| - | medial |
   | + | lateral |
   | x | anterior |
   | * | posterior |
   | ^ | cranial |
   | v | caudal | orientation variables come after colon, e.g..

^ ^ x | - : - x     =     x·y·z start position

^ ^ \ / > : * v     =     upside-down v

FIG. 23

3. Two-hand combos

| Hand 1 | Hand 2 | Pose |
   |---|---|---|
   | ^ ^ ^ ^ > : x ^ | ^ ^ ^ ^ > : x ^ | full stop |
   | ^ ^ ^ \| - : x - | ^ ^ ^ \| - : x ^ | snapshot |
   | \| \| \| \| \| : v x | \| \| \| \| \| : - x | rudder and throttle start position |

FIG. 24

4. Orientation blends

Achieve variable blending by enclosing pairs e.g..

| | | | | : (vx) (x^)            flat at 45 degrees pitch toward screen

^ ^ | | > : ( - ( - v ) ) x      two-finger point rolled medially to 22.5
                                    degrees (halfway between palm medial
                                    and palm rolled to 45 degrees)

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^^\|\|:-x | drop thumb to select | | |
| 3 | move spatially / zoom in / out | ^^x\|-:-x | rotate / translate | | |
| 4 | snapshot | ^^^\|-:x- | make square with 2 hands | ^^^\|-:x^ | make square with 2 hands |
| 5 | demarcate rectangular region | ^^^\|-:x- | make square then adjust size | ^^^\|-:x^ | make square then adjust size |
| 6 | clear the decks | \|\|\|\|:+x | sweep hand laterally | \|\|\|\|:-x | sweep hand medially |
| 7 | organize objects into a circle | ^^^\|-:-^ | look through circle of O.K. sign | | |
| 8 | two-finger point at objects | ^^\|\|-:-x | point | | |
| 9 | two-finger select object | ^^^\|\|:-x | drop thumb to select | | |
| 10 | mark start time | xxxxx:-^ | strike pose | | |
| 11 | mode change 1 | \|\|\|\|:-^ | strike pose-make "T" with two hands | \|\|\|\|:v- | strike pose-make "T" with two hands |
| 12 | mode change 11 | \|\|\|\|:-^ | strike pose - parallel hands | \|\|\|\|:-^ | strike pose - parallel hands |
| 13 | push back and slide workspace | \|\|\|\|-:x^ | push palm toward screen -- move sideways to find new regions | | |

FIG. 27A

| # | Action | Notation | Description |
|---|---|---|---|
| 14 | enter sub-application | \|\|\|\| : x ^ | strike pose |
| 15 | return from sub-application | \|\|\|\| : . ^ | strike pose |
| 16 | select option | ^ ^ ^ \| - : - x | medial roll |
| 17 | roll time forward/back | \|\|\|\| : v x | Yaw hand at elbow while keeping hand parallel to floor |
| 18 | stop time | \|\|\|\| : x ^ | strike pose |
| 19 | loop time | ^ ^ ^ \| - : x ^ | circular motion with "L" |
| 20 | demarcate irregular region | ^ ^ ^ \| - : v x | start with 2 finger tips together 1 hand holds start position. other hand traces out shape - select "click" for vertices |
| 21 | tag object | \| ^ ^ ^ > : - x | pinky-point at object then roll hand medially |
| 22 | group data streams | ^ ^ ^ \| - : v x | bring finger tips of two hands together / bring finger tips of two hands together |
| 23 | restore encapsulated workspace | \|\|\|\| : + x | sweep hand medially / sweep hand laterally |

FIG. 27B first quadword of every slaw

|  | 76543210 | 76543210 | 76543210 | 76543210 |
|---|---|---|---|---|
| length-follows: | 1xxxxxxx | xxxxxxxx | xxxxxxxx | xxxxxxxx |
| eight-byte length: | 11xxxxxx | xxxxxxxx | xxxxxxxx | xxxxxxxx |
|  |  |  |  |  |
| wee cons: | 01xxxxxx | xxxxxxxx | xxxxxxxx | xxxxxxxx |
| wee cons quadlen: | rrqqqqqq | qqqqqqqq | qqqqqqqq | qqqqqqqq |
| wee string: | 001xxxxx | xxxxxxxx | xxxxxxxx | xxxxxxxx |
| wee string quadlen: | rrrqqqqq | qqqqqqqq | qqqqqqqq | qqqqqqqq |
| wee list: | 0001xxxx | xxxxxxxx | xxxxxxxx | xxxxxxxx |
| wee list quadlen: | rrrrqqqq | qqqqqqqq | qqqqqqqq | qqqqqqqq |
|  |  |  |  |  |
| full string: | 1*100000 | 00000000 | 00000000 | 00000001 |
| full cons: | 1*100000 | 00000000 | 00000000 | 00000010 |
|  |  |  |  |  |
| full list: | 1*100000 | 00000000 | 00000000 | 00000011 |

(the penulti-MSB above is zero or one as the length is contained in the next one or two quadwords, i.e. if it's a four or eight byte length, per the 'eight-byte length' bit description second from top)

| numeric: | 00001xxx | xxxxxxxx | xxxxxxxx | xxxxxxxx |
|---|---|---|---|---|
|  |  |  |  |  |
| numeric float: | xxxxx1xx | xxxxxxxx | xxxxxxxx | xxxxxxxx |
| numeric complex: | xxxxxx1x | xxxxxxxx | xxxxxxxx | xxxxxxxx |
| numeric unsigned: | xxxxxxx1 | xxxxxxxx | xxxxxxxx | xxxxxxxx |
| numeric wide: | xxxxxxxx | 1xxxxxxx | xxxxxxxx | xxxxxxxx |
| numeric stumpy: | xxxxxxxx | x1xxxxxx | xxxxxxxx | xxxxxxxx |
| numeric reserved: | xxxxxxxx | xx1xxxxx | xxxxxxxx | xxxxxxxx |

FIG. 33B1

(wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

| | | | | |
|---|---|---|---|---|
| numeric 2-vector: | xxxxxxxx | xxx01xxx | xxxxxxxx | xxxxxxxx |
| numeric 3-vector: | xxxxxxxx | xxx10xxx | xxxxxxxx | xxxxxxxx |
| numeric 4-vector: | xxxxxxxx | xxx11xxx | xxxxxxxx | xxxxxxxx | for any numeric entity, array or not, a size-in-bytes-minus-one is stored in the last eight bits -- if a singleton, this describes the size of the data part; if an array, it's the size of a single element -- so:

| | | | | |
|---|---|---|---|---|
| num'c unit bsize mask: | 00001xxx | xxxxxxxx | xxxxxxxx | mmmmmmmm | and for arrays, there are these:

| | | | | |
|---|---|---|---|---|
| num'c breadth follows: | xxxxxxxx | xxxxx1xx | xxxxxxxx | xxxxxxxx |
| num'c 8-byte breadth: | xxxxxxxx | xxxxx11x | xxxxxxxx | xxxxxxxx |
| num'c wee breadth mask: | xxxxxxxx | xxxxx0mm | mmmmmmmm | xxxxxxxx |

FIG. 33B2

| Protein | Description | Hands | Events | Example |
|---|---|---|---|---|
| Blurt | A blurt is a direct command that is not parameterized. Examples include "undo," "go home," and "activate." It is a gesture with behavior similar to a keyboard button press. | One or two | Appear Repeat Vanish | descrips:<br>- spec<br>- blurt<br>ingests:<br>  clientid: my-id<br>  wordstamps: victory<br>  hands: one<br>  entrygripes: ^^\|/>:x^ |
| Displacement | A displacement gesture provides offset information relative to the starting point of the interaction. Applications can optionally provide a "linear detent" that creates a region around the starting point where the offset is considered to be zero. Doing so will help avoid a response to minor movements from the user. | One | Appear Move Vanish | descrips:<br>- spec<br>- displacement<br>ingests:<br>  clientid: my-id<br>  wordstamp: L<br>  entrygripes: '^^^\|-:x^'<br>  lineardetent: 40.0 |
| Pointing | A pointing gesture involves movement along with two distinct states called the "hardened" and "softened" states. These states are analagous to a button being "down" or "up" (equivalently, "pressed" or "unpressed"). Although we call this gesture "pointing" due to its original usage, it can be used in any situation where two states are needed, such as the example which requests a grab gesture. | One | Appear Move Harden Soften Vanish | descrips:<br>- spec<br>- pointing<br>ingests:<br>  clientid: my-id<br>  wordstamp: grab<br>  entrygripes: '1 1 1 1 -\| : x^'<br>  laxentrygripes: '1 1 1 1 -\| : x*'<br>  hardengripes: ^^^>:** |

FIG. 41A1

| Protein | Description | Hands | Events | Example |
|---|---|---|---|---|
| Proximity | A proximity gesture involves two hands with the proper shape moving within a pre-specified distance of each other. Optionally, an application can specify the direction of the axis between the hands that is required to trigger the gesture | Two | Appear Move Vanish | descrips:<br>- spec<br>- proximity<br>ingests:<br>clientid: my-id<br>wordstamp: goalposts<br>entrygripes: '^^^\|-:x^'<br>entrygripesB: '^^^\|-:x^'<br>entryminproximity: 0.0<br>entrymaxproximity: 1000.0<br>alignmentaxis: lvector [1.0, 0.0, 0.0]<br>alignmentleniency: 30.0 |
| Dynamic | Dynamic gestures are triggered, at least in part, by the motion of the hand. The exact behavior required and events generated depend on the kind of dynamic gesture requested | One or two | Varies | descrips:<br>- spec<br>- dynamic<br>ingests:<br>clientid: my-id<br>wordstamp: rps<br>gesture: rps |

FIG. 41A2

| Field Name | Description | Optional? | Relevant Gestures |
|---|---|---|---|
| clientid | arbitrary name that identifies the application | required | All Gestures |
| wordstamp | arbitrary name that identifies the gesture | required | All Gestures |
| repeatinterval | time (in seconds) to wait between repeat events for blurts | optional default: no repeat events | OneHandBlurt TwoHandBlurt |
| lineardetent | distance (in mm) from starting point where offset is still reported as zero | optional default: no detent | OneHandDisplacement |
| entryminproximity | minimum distance between hands to start gesture | optional default: no minimum distance | TwoHandBlurt TwoHandProximity |
| entrymaxproximity | maximum distance between hands to start gesture | optional default: 1 meter | TwoHandBlurt TwoHandProximity |
| idktime | time (in seconds) to ignore "I Don't Know" pose before ending gesture | optional default: 0.1s | All Gestures |
| alignmentaxis | direction of axis between hands required to start gesture | optional default: no axis requirement | TwoHandBlurt TwoHandProximity |
| alignmentleniency | maximum angle from the alignment axis that will still allow the gesture to start | optional default: 20 degrees | TwoHandBlurt TwoHandProximity |
| entrygripes | Set of gripes that must be seen to start a gesture | required | All Gestures |
| laxentrygripes | Set of gripes that will continue a gesture; the gripes specified are are in addition to those set by *entrygripes* | optional none | All Gestures |
| entrygripesB | Set of gripes that must be seen on the second hand to start a two-handed gesture | required for two-handed gestures | TwoHandBlurt TwoHandProximity |
| laxentrygripesB | Set of gripes that will continue a gesture for the second hand; the gripes specified are are in addition to those set by *laxentrygripesB* | optional none | TwoHandBlurt TwoHandProximity |
| hardengripes | Set of gripes that will cause a pointing gesture to transition from the "softened" to the "hardened" state; the state will return to the softened state when the shape matches entrygripes or laxentrygripes but not hardengripes | required for OneHandPointing | OneHandPointing |

FIG. 4IB

Blurt Spec Details

| OneHandBlurt | TwoHandBlurt |
|---|---|
| descrips:<br>- spec<br>- blurt<br>ingests:<br>  clientid: name --------- required<br>  wordstamp: name ------- required<br>  hands: one ------------ required<br>  entrygripes: gripes ---- required<br>  laxentrygripes: gripes - optional<br>  repeatinterval: time --- optional<br>  idktime: time ---------- optional | descrips:<br>- spec<br>- blurt<br>ingests:<br>  clientid: name ------------- required<br>  wordstamp: name ------------ required<br>  hands: two ----------------- required<br>  entrygripes: gripes -------- required<br>  laxentrygripes: gripes ------ optional<br>  entrygripesB: gripes -------- required<br>  laxentrygripesB: gripes ----- optional<br>  repeatinterval: time -------- optional<br>  idktime: time -------------- optional<br>  entryminproximity: distance - optional<br>  entrymaxproximity: distance - optional<br>  alignmentaxis: vector ------ optional<br>  alignmentleniency: degrees – optional |

Displacement Spec Details

| OneHandDisplacement |
|---|
| descrips:<br>- spec<br>- displacement<br>ingests:<br>  clientid: name --------- required<br>  wordstamp: name ------- required<br>  entrygripes: gripes ---- required<br>  laxentrygripes: gripes - optional<br>  lineardetent: distance - optional<br>  idktime: time ---------- optional |

FIG. 41C1

Pointing Spec Details

```
OneHandPointing descrips:
- spec
- pointing
ingests:
  clientid: name -------- required
  wordstamp: name -------- required
  entrygripes: gripes ---- required
  laxentrygripes: gripes - optional
  hardengripes: gripes --- required
```

Proximity Spec Details

```
TwoHandProximity descrips:
- spec
- proximity
ingests:
  clientid: name -------------- required
  wordstamp: name ------------ required
  hands: two ------------------ required
  entrygripes: gripes --------- required
  laxentrygripes: gripes ------ optional
  entrygripesB: gripes -------- required
  laxentrygripesB: gripes ----- optional
  idktime: time -------------- optional
  entryminproximity: distance - optional
  entrymaxproximity: distance - optional
  alignmentaxis: vector ------ optional
  alignmentleniency: degrees – optional
```

Dynamic Spec Details

```
Rock-Paper-Scissors descrips:
- spec
- dynamic
ingests:
  clientid: name -- required
  wordstamp: name - required
  gesture: rps ---- required
```

FIG. 41C2

Dynamic Spec Details

Reach-Grab-Pull descrips:
- spec
- dynamic
ingests:
 clientid: name ---- required
 wordstamp: name --- required
 gesture: reach ---- required
 reach-dir: vector - required

FIG. 41C3

| Protein | Description | Example |
|---|---|---|
| unspec | The *unspec* commands instructs hantenna to remove a particular spec (i.e., an existing request for recognition of a specific gesture). An application may want to *unspec* a gesture when there is a mode or context change that causes an existing gesture to no longer be useful. | descrips:<br>- unspec<br>ingests:<br>  clientid: my-id<br>  wordstamp: my-gesture |
| clearspec | The *clearspec* commands instructs hantenna to remove all existing specs (i.e., all existing requests for gesture recognition). It enables efficiency: issuing a *clearspec* command before an application exits avoids wasted processing by the gesture recognition module. | descrips:<br>- clearspec<br>ingests:<br>  clientid: my-id |
| list-specs | The *list-specs* command instructs hantenna to deposit a protein that describes all registered gesture specs. The *list-specs* message can make the request for a specific client or for all clients to get a full dump of all specs. To request a report of all specs for all clients either specify a client ID of "all" or omit the "clientid" field entirely. | descrips:<br>- list-specs<br>ingests:<br>  clientid: my-id |

FIG. 42

| Result | Protein | Notes |
|---|---|---|
| Success (clearspec) | descrips:<br>- clearspec-ack<br>- my-id<br>ingests:<br>  result: true<br>  clientid: my-id<br>  messages:<br>  - removed all specs for client (my-id) | The application that calls itself "my-id" issued a *clearspec* request, which was correctly parsed and executed by hantenna. The response is positive ("result: true") and includes a human-readable message explaining the result of a *clearspec* for "my-id". |
| Failure (blurt spec) | descrips:<br>- spec-ack<br>- my-id<br>ingests:<br>  result: false<br>  wordstamp: my-gesture<br>  messages:<br>  - bad hand selection for blurt<br>  - 'expected: one, onehanded, two, or twohanded'<br>  hands: three | The application that calls itself "my-id" issued a blurt spec. Hantenna received the request but found a problem in the specification because the application requested a three-handed blurt ("hands: three"), which does not exist. Hantenna responded with a failure notification ("result: false") and a pair of human-readable messages explaining what went wrong and what was expected (i.e., what would have worked). |

FIG. 43

| Field Name | Description |
|---|---|
| wordstamp | arbitrary name chosen by application that identifies the gesture |
| timestamp | time when the event was generated (represented as seconds from the epoch) |
| frame | frame index when event was detected |
| track | track ID - a unique integer that identifies the tracked object involved in the gesture (one handed gestures only) |
| trackA | track ID for the first hand - a unique integer that identifies the tracked object involved in the gesture (two handed gestures only) |
| trackB | track ID for the second hand - a unique integer that identifies the tracked object involved in the gesture (two handed gestures only) |
| pose | pose index for the hand involved in the gesture (one handed gestures only) |
| poseA | pose index for the first hand (two handed gestures only) |
| poseB | pose index for the second hand (two handed gestures only) |
| provenance | unique string that identifies this specific instance of the gesture |
| loc | 3D location of the hand (smoothed) |
| posA | 3D location of the first hand (two-handed gestures only) |
| posB | 3D location of the second hand (two-handed gestures only) |
| loc-raw | 3D location of the hand (unfiltered) |
| dloc | change in 3D location of the hand (smoothed) |
| dloc-raw | change in 3D location of the hand (unfiltered) |
| provenance | unique string that identifies this specific instance of the gesture |

FIG. 44A

| Index | Pose Name (pose names not limited to below) | Pose Example | Gripes |
|---|---|---|---|
| 0 | fist |  | ^^^^> |
| 1 | head | | — |
| 2 | ofp-closed (ofp = one finger point) |  | ^^^\|> |
| 3 | ofp-open-left |  | ^^^\|- |
| 4 | ofp-open-right |  | ^^^\|- |
| 5 | open-hand |  | VV- |
| 6 | pushback-left |  | \|\|\|\|- |
| 7 | pushback-right |  | \|\|\|\|- |
| 8 | victory |  | ^^V> |
FIG. 44B OneHandBlurt

| Appear | Repeat | Vanish |
|---|---|---|
| descrips:<br>- ob-event<br>- blurt<br>- appear<br>- my-id<br>ingests:<br>  wordstamp: my-gesture<br>  timestamp:<br>1346999886.1667991<br>  frame: 974<br>  track: 2<br>  provenance: gspk:2<br>  pose: 3 | descrips:<br>- ob-event<br>- blurt<br>- repeat<br>- my-id<br>ingests:<br>  wordstamp: my-gesture<br>  timestamp:<br>1346999887.1667251<br>  frame: 1004<br>  track: 2<br>  pose: 3<br>  provenance: gspk:2 | descrips:<br>- ob-event<br>- blurt<br>- vanish<br>- my-id<br>ingests:<br>  wordstamp: my-gesture<br>  timestamp:<br>1346999888.1661611<br>  frame: 1034<br>  track: 2<br>  provenance: gspk:2 |

TwoHandBlurt

| Appear | Repeat | Vanish |
|---|---|---|
| descrips:<br>- ob-event<br>- blurt<br>- appear<br>- my-id<br>ingests:<br>  wordstamp: my-two-handed-gesture<br>  timestamp:<br>1347000288.8563099<br>  frame: 13044<br>  trackA: 55<br>  trackB: 57<br>  poseA: 3<br>  poseB: 4<br>  provenance: gspk:55+57 | descrips:<br>- ob-event<br>- blurt<br>- repeat<br>- my-id<br>ingests:<br>  wordstamp: my-two-handed-gesture<br>  timestamp:<br>1347000289.8877599<br>  frame: 13075<br>  trackA: 55<br>  trackB: 57<br>  poseA: 3<br>  poseB: 4<br>  provenance: gspk:55+57 | descrips:<br>- ob-event<br>- blurt<br>- vanish<br>- my-id<br>ingests:<br>  wordstamp: my-two-handed-gesture<br>  timestamp:<br>1347000290.5529189<br>  frame: 13095<br>  trackA: 55<br>  trackB: 57<br>  provenance: gspk:55+57 |

FIG. 44C1

OneHandDisplacement

| Appear | Move | Vanish |
|---|---|---|
| descrips:<br>- ob-event<br>- displacement<br>- appear<br>- my-id<br>ingests:<br>  wordstamp: my-displacement-gesture<br>  timestamp: 1347039934.1689279<br>  frame: 972<br>  track: 23<br>  provenance: gspk:23<br>  pose: 4<br>  loc: lvector [-82.314, -113.220, 912.407] | descrips:<br>- ob-event<br>- displacement<br>- move<br>- my-id<br>ingests:<br>  wordstamp: my-displacement-gesture<br>  timestamp: 1347039934.9689431<br>  frame: 996<br>  track: 23<br>  provenance: gspk:23<br>  pose: 4<br>  loc: lvector [89.406, -133.453, 1012.113]<br>  established-loc: lvector [-82.314, -113.220, 912.407]<br>  linear-offset: lvector [131.721, 0.0, 59.705] | descrips:<br>- ob-event<br>- displacement<br>- vanish<br>- my-id<br>ingests:<br>  wordstamp: my-displacement-gesture<br>  timestamp: 1347039935.0048859<br>  frame: 997<br>  track: 23<br>  provenance: gspk:23 |

TwoHandProximity

| Appear | Move | Vanish |
|---|---|---|
| descrips:<br>- ob-event<br>- proximity<br>- appear<br>- my-id<br>ingests:<br>  wordstamp: my-proximity-gesture<br>  timestamp: 1347040081.4672339<br>  frame: 5386<br>  trackA: 51<br>  trackB: 53<br>  poseA: 3<br>  poseB: 4<br>  posA: lvector [-402.418, -90.179, 1045.531]<br>  posB: lvector [-64.488, -110.876, 855.400]<br>  provenance: gspk:51+53 | descrips:<br>- ob-event<br>- proximity<br>- move<br>- my-id<br>ingests:<br>  wordstamp: my-proximity-gesture<br>  timestamp: 1347040081.967185<br>  frame: 5401<br>  trackA: 51<br>  trackB: 53<br>  poseA: 3<br>  poseB: 4<br>  posA: lvector [-419.645, -122.194, 1076.436]<br>  posB: lvector [-60.902, -147.151, 884.014]<br>  provenance: gspk:51+53 | descrips:<br>- ob-event<br>- proximity<br>- vanish<br>- my-id<br>ingests:<br>  wordstamp: my-proximity-gesture<br>  timestamp: 1347040082.0028069<br>  frame: 5402<br>  trackA: 51<br>  trackB: 53<br>  provenance: gspk:51+53 |

FIG. 44C2

OneHandPointing

| Appear | Move | Harden | Soften | Vanish |
|---|---|---|---|---|
| descrips:<br>- ob-event<br>- pointing<br>- appear<br>- my-id<br>ingests:<br>  wordstamp: my-pointing-gesture<br>  timestamp: 1347040550.830955<br>  frame: 19451<br>  track: 164<br>  provenance: gspk:164<br>  pose: 7<br>  loc: !vector [93.098, -222.227, 1073.574] | descrips:<br>- ob-event<br>- pointing<br>- move<br>- my-id<br>ingests:<br>  wordstamp: my-pointing-gesture<br>  timestamp: 1347040552.0990119<br>  frame: 19489<br>  track: 164<br>  provenance: gspk:164<br>  pose: 5<br>  loc: !vector [20.407, -385.375, 1016.875]<br>  dloc: !vector [-0.024, -72.938, -37.368]<br>  loc-raw: !vector [12.554, -373.153, 992.226]<br>  dloc-raw: !vector [-17.532, -18.172, -64.433]<br>  hardened: false | descrips:<br>- ob-event<br>- pointing<br>- harden<br>- my-id<br>ingests:<br>  wordstamp: my-pointing-gesture<br>  timestamp: 1347040551.2629781<br>  frame: 19464<br>  track: 164<br>  provenance: gspk:164<br>  pose: 0<br>  loc: !vector [5.052, -37.268, 1024.512]<br>  loc-raw: !vector [1.235, -37.716, 1031.139] | descrips:<br>  ob-event<br>- pointing<br>- soften<br>- my-id<br>ingests:<br>  wordstamp: my-pointing-gesture<br>  timestamp: 1347040551.630806<br>  frame: 19475<br>  track: 164<br>  provenance: gspk:164<br>  pose: 7<br>  loc: !vector [5.324, -46.019, 1022.316]<br>  loc-raw: !vector [3.697, -49.029, 1020.206] | descrips:<br>- ob-event<br>- pointing<br>- vanish<br>- my-id<br>ingests:<br>  wordstamp: my-pointing-gesture<br>  timestamp: 1347040552.2989309<br>  frame: 19495<br>  track: 164<br>  provenance: gspk:164 |

FIG. 44C3

| Pump | Pump-Back | Finish | Vanish |
|---|---|---|---|
| descrips:<br>- ob-event<br>- rps<br>- pump<br>- my-id<br>ingests:<br>  timestamp:<br>1347041041.2479129<br>  wordstamp: rps<br>  track-id: 302<br>  provenance: gspk:302<br>  pump: 1 | descrips:<br>- ob-event<br>- rps<br>- pump-back<br>- my-id<br>ingests:<br>  timestamp:<br>1347041041.6480179<br>  wordstamp: rps<br>  track-id: 302<br>  provenance: gspk:302<br>  pump: 1 | descrips:<br>- ob-event<br>- rps<br>- finish<br>- my-id<br>ingests:<br>  timestamp:<br>1347041042.915525<br>  wordstamp: rps<br>  track-id: 302<br>  provenance: gspk:302<br>  pose: pushback-right<br>  pose-index: 7 | descrips:<br>- ob-event<br>- rps<br>- vanish<br>- my-id<br>ingests:<br>  wordstamp: rps<br>  track-id: 465<br>  provenance: gspk:465 |

FIG. 44C4

| Reached | Grab | Pulling | Pulled | Vanish |
|---|---|---|---|---|
| descrips:<br>- ob-event<br>- reach<br>- reached<br>- my-id<br>ingests:<br>wordstamp: my-reach<br>track-id: 302<br>provenance: gspk:302 | descrips:<br>- ob-event<br>- reach<br>- grab<br>- my-id<br>ingests:<br>wordstamp: my-reach<br>track-id: 302<br>provenance: gspk:302 | descrips:<br>- ob-event<br>- reach<br>- pulling<br>- my-id<br>ingests:<br>wordstamp: my-reach<br>track-id: 302<br>provenance: gspk:302<br>progress: 0.2 | descrips:<br>- ob-event<br>- reach<br>- pulled<br>- my-id<br>ingests:<br>wordstamp: my-reach<br>track-id: 302<br>provenance: gspk:302 | descrips:<br>- ob-event<br>- reach<br>- vanish<br>- my-id<br>ingests:<br>wordstamp: my-reach<br>track-id: 465<br>provenance: gspk:465 |

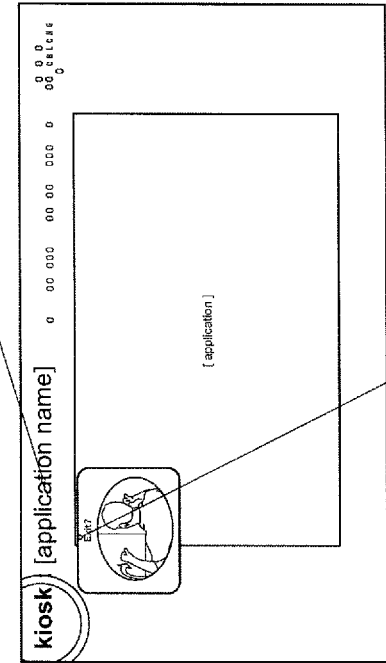
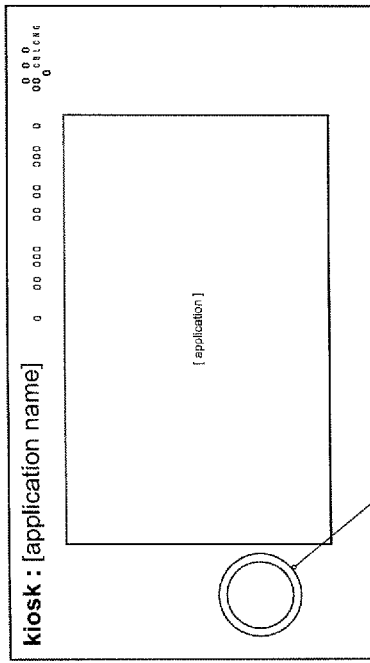
FIG. 46A

Kiosk and Application Figures
Airborne Beats Application - Description and Main Screen Airborne Beats is a simple audio sample sequencer that leverages the power of gesture-based interactions to expedite the speed of shift in transport and editing functions (i.e. pause, play, move, automate) to allow for a *floating* experience of music-making.

Main Screen

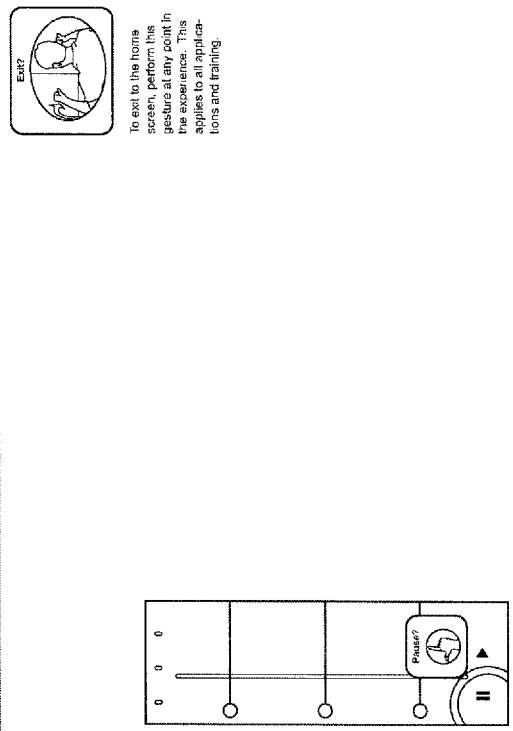

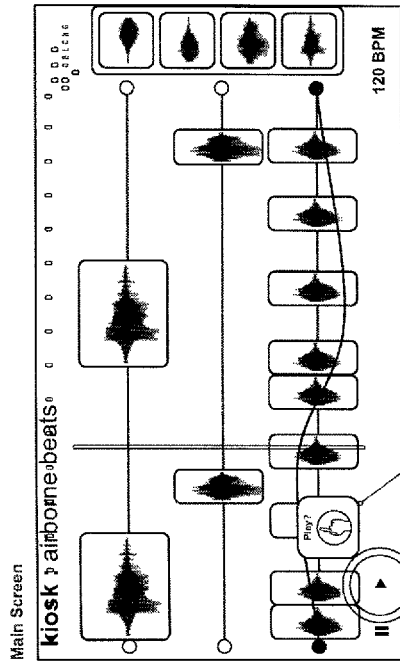

The Main Screen consists of the tracking area, which includes Oblong-branded metronome ticks at the quarter-note (beat) and sixteenth note subdivisions; the sample bank, which provides grip-and-drop functionality for samples into the tracking area; and the footer area which includes pause, play, move sample and automate volume options. In play mode, the application loops the bar continuously at variable BPM (beats per minute). Continuing work could allow for sample scrubbing and other features.

Floating tip would appear after a couple seconds and provide the gripe to perform play interaction.

Gesture does NOT necessarily need to be performed at this location, but can be conjured up anywhere to cause the project to play and pause.

Play mode had a toggle relationship with pause, and changes the color of the playhead.

*note: play or pause mode can be activated even while other other actions are being performed. This can be an aid in live performance.*

*FIG. 47A*

Kiosk and Application Figures
Terra Forma Application

Terra Forma is a terraforming application that utilizes the location of a user's right hand to draw blocky terrain. In build mode, the bulldozer tool draws terrain, where the hand's X and Z position determine area of impact on the grid, and the Y position determines the height of a land mass, which includes surrounding squares. The eye tool allows users to see what a terraforming interaction would do the land form, without actually committing the change. The mountain tool is used to control slope of new landmasses. Finally the rotate tool is used to rotate the grid on Y-axis, lazy-susan-style.

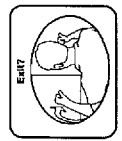

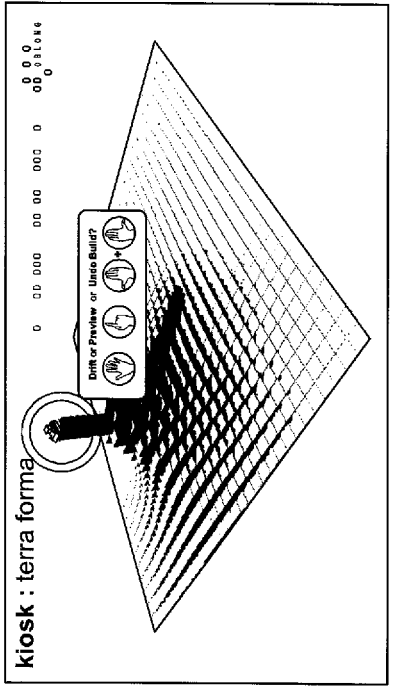

Preview mode  Preview landmasses before you destructively draw them.

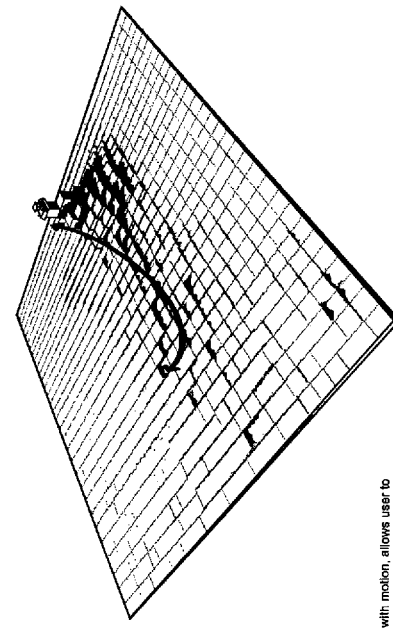

Build mode  Destructively draw landmasses with a high level of joy.

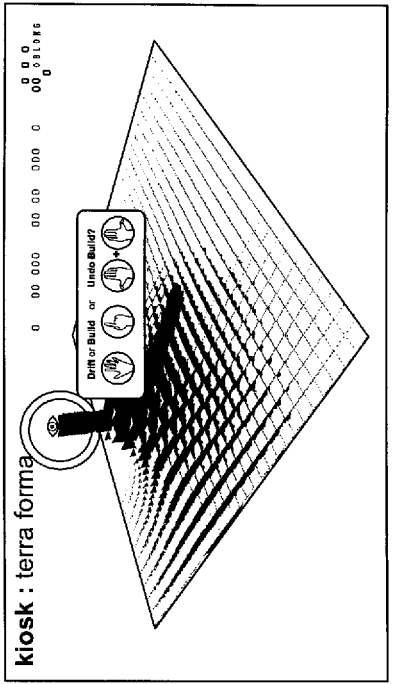

Drift  Passive pointer highlights cell, but does not affect elevation.

Undo gesture executes of one level of undo on build gestures. Upon opening this demo, it is not an option, as no past builds exist.

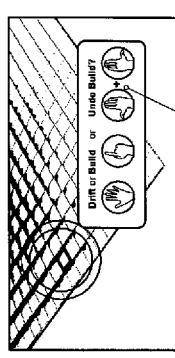

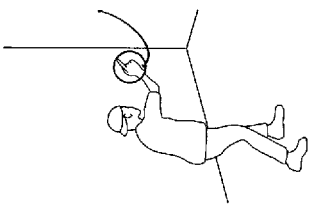

Continuous build: The build gesture, coupled with motion, allows user to destructively draw to one's content, be it ground level plateaus, peaks, or ranges.

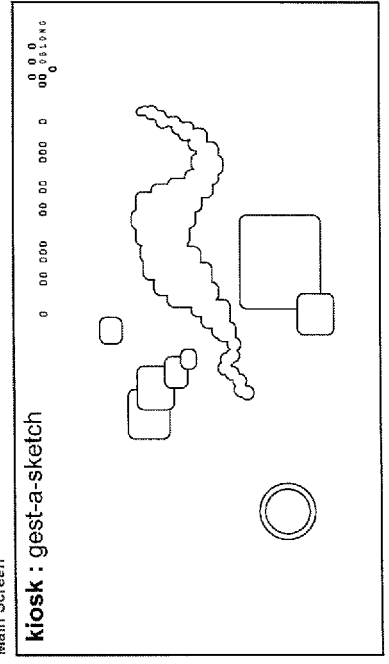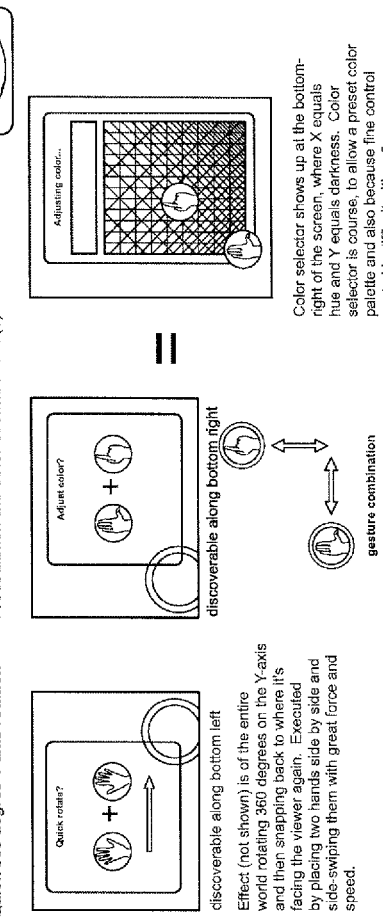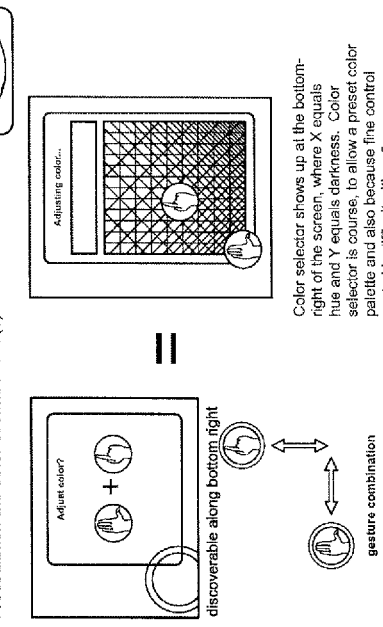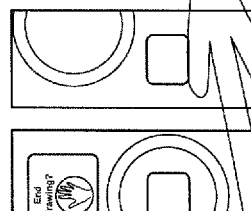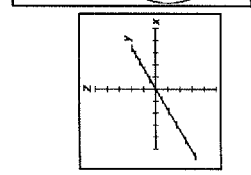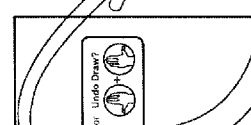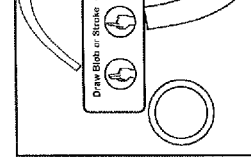
FIG. 49

| Description | Gripe Def String | Equivalence |
|---|---|---|
| Symbol Group () | "\|\|\|>" | "\|\|" AND "**\|\|>" |
| Symbol Group (,) | ",\|,\|,\|>" | "\|\|" AND "**\|\|>" |
| "1" = "\|" | "^^11>" | "^^\|\|>" AND "^^\|/>" |
| Negation (~) | "^^^^~" | "^^^^>" AND "^^^^\|" AND "^^^^x" |
| Negate a Symbol Group | "^^^^~x" | "^^^^>" AND "^^^^\|" |

PROCESSING TRACKING AND RECOGNITION DATA IN GESTURAL RECOGNITION SYSTEMS

RELATED APPLICATIONS

This application claims the benefit of U.S. Patent Application No. 61/719,109, filed Oct. 26, 2012.

This application claims the benefit of U.S. Patent Application No. 61/722,007, filed Nov. 2, 2012.

This application claims the benefit of U.S. Patent Application No. 61/725,449, filed Nov. 12, 2012.

This application claims the benefit of U.S. Patent Application No. 61/787,792, filed Mar. 15, 2013.

This application claims the benefit of U.S. Patent Application No. 61/785,053, filed Mar. 14, 2013.

This application claims the benefit of U.S. Patent Application No. 61/787,650, filed Mar. 15, 2013.

This application claims the benefit of U.S. Patent Application No. 61/747,940, filed Dec. 31, 2012.

This application is a continuation in part application of U.S. patent application Ser. No. 12/572,689 (now U.S. Pat. No. 8,866,740), U.S. patent application Ser. No. 12/572,698 (now U.S. Pat. No. 8,830,168), U.S. patent application Ser. Nos. 13/850,837, 12/417,252, 12/487,623, 12/553,845 (now U.S. Pat. No. 8,531,396), U.S. patent application Ser. No. 12/553,902 (now U.S. Pat. No. 8,537,111), U.S. patent application Ser. No. 12/553,929 (now U.S. Pat. No. 8,537,112), U.S. patent application Ser. Nos. 12/557,464, 12/579,340, 13/759,472, 12/579,372, 12/773,605, (now U.S. Pat. No. 8,681,098), U.S. patent application Ser. No. 12/773,667 (now U.S. Pat. No. 8,723,795), U.S. patent application Ser. Nos. 12/789,129, 12/789,262 (now U.S. Pat. No. 8,669,939), U.S. patent application Ser. No. 12/789,302 (now U.S. Pat. No. 8,665,213), U.S. patent application Ser. Nos. 13/430,509, 13/430,626 now U.S. Pat. No. 8,896,531), U.S. patent application Ser. Nos. 13/532,527, 13/532,605, 13/532,628, 13/888,174 (now U.S. Pat. No. 8,890,813), U.S. patent application Ser. Nos. 13/909,980, and 14/048,747.

TECHNICAL FIELD

The embodiments described herein relate generally to processing systems and, more specifically, to gestural recognition systems in Spatial Operating Environments (SOEs).

BACKGROUND

Conventional programming environments do not fully support multi-computer processing unit (CPU) and cross-network execution, or flexible sharing of data between large numbers of computing processes. These existing mechanisms all suffer from shortcomings that make it difficult to build multi-process and multi-machine applications, and that force users working in more than one programming language to jump through frustrating hoops. For example, conventional event frameworks are strongly typed, which makes them inflexible, privileges the assumptions of the systems vendor over the application programmer, and forms a mismatch with the facilities of increasingly popular dynamic languages. The conventional frameworks are also configured only to support point-to-point data transfers, and this makes coordinating the activity of more than a few distinct processes difficult or impossible. The conventional frameworks are also strongly dependent on particular local, in-memory data structures, which renders them unsuited for on-disk storage or transmission across a network.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 12 is a diagram of poses in a gesture vocabulary of the SOE, under an embodiment.

FIG. 13 is a diagram of orientation in a gesture vocabulary of the SOE, under an embodiment.

FIG. 14 is an example of commands of the SOE in the kiosk system used by the spatial mapping application, under an embodiment.

FIG. 15 is an example of commands of the SOE in the kiosk system used by the media browser application, under an embodiment.

FIG. 16 is an example of commands of the SOE in the kiosk system used by applications including upload, pointer, rotate, under an embodiment.

FIG. 22 is a diagram of poses in a gesture vocabulary, under an embodiment.

FIG. 23 is a diagram of orientation in a gesture vocabulary, under an embodiment.

FIG. 24 is a diagram of two hand combinations in a gesture vocabulary, under an embodiment.

FIGS. 27A and 27B show example commands, under an embodiment.

FIGS. 33B/1 and 33B/2 show a slaw header format, under an embodiment.

FIG. 41A (collectively FIGS. 41A1-41A2) is a protein specification table that includes five proteins to specify gestures, under an embodiment.

FIG. 41B is another protein specification table that describes field names included in the Gesture Specification Overview (FIG. 1A), under an embodiment.

FIG. 41C (collectively FIGS. 41C1-41C3) is an additional protein specification table that includes information of descrips and ingests of gesture specification proteins, under an embodiment.

FIG. 42 is a table that describes two proteins for non-spec commands, "unspec" and "clearspec," under an embodiment.

FIG. 43 is a table showing request acknowledgements, under an embodiment.

FIG. 44A is a table showing event message information, under an embodiment.

FIG. 44B is a table showing event message hand pose overview information, under an embodiment.

FIG. 44C (collectively FIGS. 44C1-44C5) is a table showing event message hand pose protein specs, under an embodiment.

FIG. 45 is an example "Home Screen," including feedback and cursor animations, provided by the kiosk to enable a user to efficiently navigate between applications of the application suite, under an embodiment.

FIG. 46A is an example application screen, including feedback and cursor graphics, under an embodiment.

FIG. 47A is an example main screen of the Airborne Beats application, under an embodiment.

FIG. 48A shows example screens of the Terra Form a application relating to Preview Mode and Build Mode, and also shows an example of drift, under an embodiment.

FIG. 48B shows example screens of the Terra Form a application relating to Rotation Mode and Slope Adjustment Mode, under an embodiment.

FIG. 49 shows an example Main screen of the Gest-a-Sketch application along with example screens showing functions including rotation, color selection, drawing, and other actions provided to a user, under an embodiment.

FIG. 52 shows a table that includes a summary of example gripe definition strings accepted by the hantenna, under an embodiment.

DETAILED DESCRIPTION

SOE Kiosk

Figure 1A:
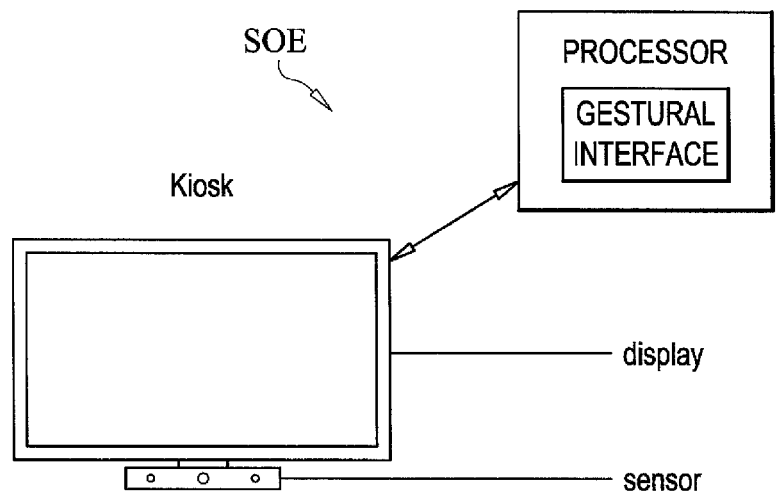
FIG. 1A is a block diagram of the SOE kiosk including a processor hosting the hand tracking and shape recognition component or application, a display and a sensor, under an embodiment.

Embodiments described herein provide a gestural interface that automatically recognizes a broad set of hand shapes and maintains high accuracy rates in tracking and recognizing gestures across a wide range of users. Embodiments provide real-time hand detection and tracking using data received from a sensor. The hand tracking and shape recognition gestural interface described herein enables or is a component of a Spatial Operating Environment (SOE) kiosk (also referred to as "kiosk" or "SOE kiosk"), in which a spatial operating environment (SOE) and its gestural interface operate within a reliable, markerless hand tracking system. This combination of an SOE with markerless gesture recognition provides functionalities incorporating novelties in tracking and classification of hand shapes, and developments in the design, execution, and purview of SOE applications.

As described in detail in the description herein and the Related Applications, all of which are incorporated herein by reference, an SOE enacts real-world geometries to enable such interface and interaction. For example, the SOE employs a spatially conformed display mesh that aligns physical space and virtual space such that the visual, aural, and haptic displays of a system exist within a "real-world" expanse. This entire area of its function is realized by the SOE in terms of a three-dimensional geometry. Pixels have a location in the world, in addition to resolution on a monitor, as the two-dimensional monitor itself has a size and orientation. In this scheme, real-world coordinates annotate properties. This descriptive capability covers all SOE participants. For example, devices such as wands and mobile units can be one of a number of realized input elements.

This authentic notion of space pervades the SOE. At every level, it provides access to its coordinate notation. As the location of an object (whether physical or virtual) can be expressed in terms of geometry, so then the spatial relationship between objects (whether physical or virtual) can be expressed in terms of geometry. (Again, any kind of input device can be included as a component of this relationship.) When a user points to an object on a screen, as noted in the Related Applications and the description herein, the SOE interprets an intersection calculation. The screen object reacts, responding to a user's operations. When the user perceives and responds to this causality, supplanted are old modes of computer interaction. The user acts understanding that within the SOE, the graphics are in the same room with her. The result is direct spatial manipulation. In this dynamic interface, inputs expand beyond the constraints of old methods. The SOE opens up the full volume of three-dimensional space and accepts diverse input elements.

Into this reconceived and richer computing space, the SOE brings recombinant networking, a new approach to interoperability. The Related Applications and the description herein describe that the SOE is a programming environment that sustains large-scale multi-process interoperation. The SOE comprises "plasma," an architecture that institutes at least efficient exchange of data between large numbers of processes, flexible data "typing" and structure, so that widely varying kinds and uses of data are supported, flexible mechanisms for data exchange (e.g., local memory, disk, network, etc.), all driven by substantially similar APIs, data exchange between processes written in different programming languages, and automatic maintenance of data caching and aggregate state to name a few. Regardless of technology stack or operating system, the SOE makes use of external data and operations, including legacy expressions. This includes integrating spatial data of relatively low-level quality from devices including but not limited to mobile units such as the iPhone. Such devices are also referred to as "edge" units.

Figure 1B:
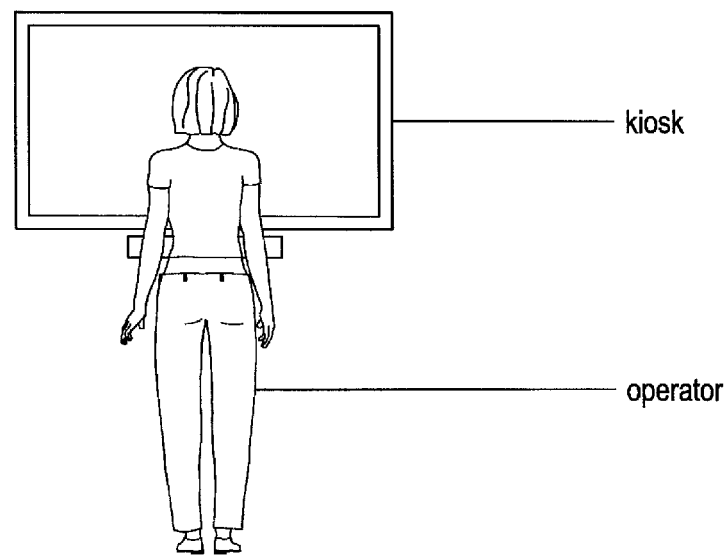
FIG. 1B shows a relationship between the SOE kiosk and an operator, under an embodiment.

FIG. 1A is a block diagram of the SOE kiosk including a processor hosting the gestural interface component or application that provides the vision-based interface using hand tracking and shape recognition, a display and a sensor, under an embodiment. FIG. 1B shows a relationship between the SOE kiosk and an operator, under an embodiment. The general term "kiosk" encompasses a variety of set-ups or configurations that use the markerless tracking and recognition processes described herein. These different installations include, for example, a processor coupled to a sensor and at least one display, and the tracking and recognition component or application running on the processor to provide the SOE integrating the vision pipeline. The SOE kiosk of an embodiment includes network capabilities, whether provided by coupled or connected devices such as a router or engaged through access such as wireless.

Tracking Systems & Processing

Embodiments described herein include means for processing the output of a hand tracking and shape recognition system. Such processing interprets tracking and recognition output and generates high-level gestural events for manipulation in a gestural control system not limited to an SOE and its applications. The embodiments herein also provide supplemental gestures to the gestural interface gestures described in one or more of the Related Applications. It also enables descriptive gripe definition strings.

The Related Applications disclose systems and methods for tracking and recognizing hand shapes. For example, the Related Applications include applications directed to a tracking and recognition system, also referred to as a "markerless" or "gloveless" system. A user provides data input as a "free" agent, without gloves, markers, or any such indicia, thereby enabling an embodiment of an SOE incorporating gestural interface and applications in a markerless setting. While one embodiment disclosed herein analyzes data of a markerless system, the description below continues a description of embodiments including but not limited to magnetic field tracking, optical tracking, optical tracking in conjunction with EMF tracking, and inertial tracking that includes at least infrared light sources.

Networked-Based Processing of Tracking Systems

As noted in one or more of the Related Applications, tracking and recognition systems, also referred to as a "vision pipeline," read data from a sensor and make the output available for processing in a gestural recognition interface. Processing includes but is not limited to parsing the registered gesture, identifying that gesture, and transferring to at least one application an event corresponding to the registered gesture.

The vision pipeline processes track data in a network-based system. The embodiment described herein is that of proteins and pools, also referred to as "libPlasma," herein and in one or more others of the Related Applications. Proteins and pools are mechanisms of a system of network-based data representation, transit and interchange. Using the proteins and pools the tracking and recognition system deposits data into a pool. Once the data is read or retrieved from the pool, the system analyzes depth frames to detect and track hands and recognize hand shapes, as described in detail in the Related Applications.

Spatial Operating Environment and its Occurrences

Gestural control is used to powerful effect in a Spatial Operating Environment, with additional components not limited to recombinant networking and spatially conformed display mesh. It provides interaction and control, not limited to spatial, of a computational system across multiple screens, multiple devices, and multiple users. In particular, "g-speak," referred to herein, is an application environment for development of such an install-ready SOE. It provides application programming interface (API) and run-time libraries, supporting an SOE of rich and tested capability as detailed in the Related Applications. Consequently, g-speak optimizes rapid deployment and full functionality of an SOE.

While an SOE developed with the g-speak platform is one embodiment, the SOE and its comprising tracking systems offer benefits not limited to such an embodiment. The panoply of operating systems and platforms create a need for flexibility in deployment of an SOE.

The embodiments described herein provide high-level gesture recognition regardless of platform that specifically supports gestural control where the full g-speak software developer kit (SDK) is not available. Furthermore, the description herein directly interprets the output of markerless tracking and recognition system, thereby bypassing the gripe translation step and the assumptions built in to the gripe protein format. Also, the description herein provides simple, unified access to pre-defined, dynamic gestures and utilities such as UX-focused track filtering.

Processing Track Data

As described in the Related Applications, the system of an embodiment converts the data of a markerless tracking system into gripes. Other embodiments, described herein, include a gesture recognition utility that provides high-level, event-based gesture recognition based on input from a markerless tracking and processing system, referred to herein as "hantenna." Hantenna is a utility using only libPlasma; that is, a system of networked-based data representation, transit and interchange described herein. It provides a way for applications for markerless tracking systems written in mechanisms not limited to Java, Processing, Javascript, Ruby, Clojure, or Objective C to rapidly achieve full gestural control. For example, Hantenna is not required to rely on g-speak libraries. Hantenna of an embodiment also directly processes the output of a markerless tracking system, and does not require as input the gripes proteins associated with other embodiments of an SOE.

Hantenna: Gripe Definition Strings

The Related Applications describe an input gesture language that defines a gesture vocabulary string, also referred to as a "gripe" or "gripe definition string." Relative to the input gesture language described in the Related Applications, the hantenna module accepts more descriptive gripe definition strings to make it easier to specify the correct set of hand poses for different gestures. FIG. 52 shows a table that includes a summary of example gripe definition strings accepted by the hantenna, under an embodiment. The hantenna module also accepts but is not limited to the gripe definition as documented in one or more of the Related Applications as follows:

||||-:x^=vertical palm shape as used in the gesture documented as "pushback;" x|-:=three-finger-fly where any pinky, ring finger, and orientation comprise acceptable input.

The new forms of gripe definition strings include "symbol groups" and "negation," both of which reduce or avoid the need to specify multiple gripe strings. For example, instead of the input:

"||||-:x^" AND "||||:x^", the system of an embodiment supports the following input:

"|||||-:x^" OR "|,|,|,|,|-:x^".

The thumb is represented in two symbols ("|" and "-"). The spaces (or commas) are used as finger delimiters, and the set of symbols between the spaces become options. In this example, there are no symbol groups for orientation though that is possible as well so the embodiment is not so limited.

The gloveless pipeline uses the expanded set of gripe symbols to distinguish tight versus spread fingers. For example:

^^||>:x^=vertical two-finger-point with the thumb wrapped;

^^V>:x^=vertical "victory" with the index and middle fingers separated in a V.

While an embodiment of a markerless tracking and recognition system may not emit ^^||>, the distinction is maintained because the system of one or more alternative embodiments may or may not emit this gripe string. The system of an embodiment does emit both ||||- and VV- for those gestures described in the Related Applications referenced above as, respectively, pushback versus open-hand. To include both possibilities, hantenna interprets the symbol "|" as "|V". In other words:

"1111-"="|V|V|V|V-"="||||-" AND "|||/-" AND "|||\" AND . . . AND "\\\\-".

In practice, the pipeline does not emit all of these possibilities, but it is advised to treat "||||-" and "VV-" the same and the string "1111-" enables this possibility. Additionally, hantenna understands symbol negation by prefixing a symbol or a symbol group with a character "~". The character "~" is used instead of "!" because bash has issues with "!". Nevertheless, it can be useful to deposit gesture specs from a terminal.

By way of example:
"^^^~-"="^^^~-
"=", ^, ^, ^,|>x".

In all cases, a fist is described with thumb in any position except sticking out. As before, negation also applies to the orientation portion of a gripe:
"^V>:x~v"=victory with palm facing forward and fingers pointing up, left, or right (but not down).

Hantenna: libPlasma

Pools

Hantenna of an embodiment includes numerous pools. For example, Hantenna includes use of an Input pool (default: gloveless), and hand, track and shape data from a markerless tracking system is deposited into this pool and read by hantenna. Hantenna also includes an Output pool (default: gestures), and gestural events such as appear, move, repeat, and vanish are deposited into this pool and read by gesture-aware applications. Hantenna of an embodiment includes a Configuration pool (default: hantenna), and applications specify new gestures and configure hantenna by depositing proteins into the configuration pool. Hantenna also provides feedback in the form of acknowledgement proteins in this pool but is not so limited.

Protein Specification

As described above, applications communicate with hantenna via protein messages sent and received in different pools (in the present embodiment referred to as "hantenna" and "gestures"). Below are specifications for proteins implemented by hantenna. As described in detail herein, the proteins implemented by hantena include but are not limited to Help, Gesture Specification, Non-Spec Command, Specification Acknowledgement, Event, Startup, Shutdown, and Heartbeat Proteins.

The Help Protein includes a high-level help message in response to receipt of a message that is not interpretable. The Gesture Specification Protein includes a request sent by an application to hantenna to initiate detection of a gesture, also referred to as a "gesture spec" or "spec." The Non-Spec Command Protein includes a command sent by an application to hantenna to request a change other than recognition of a new gesture. The Specification Acknowledgement Protein includes a response sent by hantenna to an application that provides information about the success or failure of a gesture spec, and is also referred to as a "spec ack" or just "ack." The Event Protein of an embodiment includes a message sent by hantenna to an application that reflects a status change in a gesture that hantenna is monitoring. The Startup Protein includes a message sent by hantenna to an application that reflects a status change in a gesture that hantenna is monitoring. The Heartbeat Protein includes a periodic status message from hantenna to let applications know that hantenna continues to execute. Each protein is described in further detail below.

Help Protein

When hantenna receives a message that it is unable to interrupt, it responds with a high-level help message as follows:
descrips:
hantenna-help
high-level-help-for-hantenna
'{spec}'
'{blurt|displacement|pointing|proximity|dynamic}'
ingests:
clientid: Str (def=default)—identifies a client
wordstamp: Str—identifies a spec
hands: Str—{one, two, onehanded, twohanded}
entrygripes: Str list—gripes to start gesture
laxentrygripes: Str list—more gripes to continue gesture
entrygripesB: Str list—gripes for second hand
laxentrygripesB: Str list—more gripes to continue second hand
hardengripes: Str list—gripes to harden the gesture
repeatinterval: float64—time until blurt reports again (seconds)
lineardetent: float64—min distance before displacement starts (mm)
entryminproximity: float64—min distance between hands to start (mm)
entrymaxproximity: float64 (def=1000)—max distance between hands to start (mm)
idktime: float64 (def=0.1)—time allowed for unknown hand shape before ending (seconds)
alignmentaxis: Vect—direction of axis connecting two hands
alignmentleniency: float64 (def=20)—angle threshold to passes alignment test (degrees)

Gesture Specification Protein

FIG. 41A is a protein specification table that includes five (5) proteins used to specify gestures, under an embodiment. The proteins include, but are not limited to blurt, displacement, pointing, proximity, and dynamic. FIG. 41B is another protein specification table that describes field names included in the Gesture Specification Overview (FIG. 41A), under an embodiment. FIG. 41C is an additional protein specification table that includes information of descrips and ingests of gesture specification proteins, under an embodiment.

Non-Spec Commands Protein

An application can remove gestures with these non-spec proteins. FIG. 42 is a table that describes two proteins for non-spec commands, "unspec" and "clearspec," under an embodiment.

The "unspec" command instructs hantenna to remove a particular spec (i.e., an existing request for recognition of a specific gesture). An application may want to "unspec" a gesture when there is a mode or context change that causes an existing gesture to no longer be useful, for example.

The "clearspec" command instructs hantenna to remove all existing specs (i.e., all existing requests for gesture recognition). This command enables efficiency by issuing a "clearspec" command before an application exits avoids wasted processing by the gesture recognition module.

Specification Acknowledgement Protein

The gesture recognition model of an embodiment responds to requests with an acknowledgement ("ack") to notify the application if the request worked or if there was a problem. The response of an embodiment includes a boolean "result" field that makes it easy to check for success/failure as well as a human-readable list of messages. FIG. 43 is a table showing request acknowledgements, under an embodiment.

Event Protein

An event protein indicates a status change in a gesture that hantenna is monitoring. FIG. 44A is a table showing event message information, under an embodiment. FIG. 44B is a table showing event message hand pose overview information, under an embodiment. FIG. 44C is a table showing event message hand pose protein specs, under an embodiment. FIGS. 44A, 44B and 44C are collectively referred to herein as "FIG. 44."

With reference to FIG. 44C, the event message hand pose protein specs include at least one of the following, but the embodiment is not so limited: OneHandBlurt, TwoHandBlurt, OneHandDisplacement, TwoHandProximity, OneHandPointing, Rock-Paper-Scissors, and Reach-Grab-Pull. The Rock-Paper-Scissors (RPS) dynamic gesture is an implementation of the RPS game. The user "pumps" their first forward twice, and on the third pump can select rock (fist), paper (open-hand or pushback), or scissors (victory). When detected, hantenna will send a "pump" event for each forward motion and a "pump-back" event at the end of each return (backward) motion. If the interaction completes successfully, a "finish" event will be generated that comprises the name and index of the final pose, which indicates the user's choice (rock, paper, or scissors). If the interaction ends early, a "vanish" event is generated.

The Reach-Grab-Pull ("Reach") dynamic gesture implements an interaction that allows a user to reach a particular direction, grab an offscreen element, and pull it back in to view. For example, there may be menus hidden to the left and/or right of the main screen that the user can access by pulling onscreen. The Reach gesture spec includes a reach direction ("reach-dir") that defines the direction along which the user must reach and then pull. The implementation checks that both the hand orientation and the movement approximately matches this direction. The reach motion is performed with an open hand (1111-) while the grab is a closed fist (^^^>). All of the events of an embodiment occur at most once per interaction except for "pulling", which is sent once per frame with a progress value based on the pull distance. When the pull distance reaches 100%, a "pulled" event will be sent and the interaction ends.

Startup Message Protein

The startup message notifies existing clients that hantenna is executing. Generally, the pipeline will be executing before any applications start, but in some cases it is useful to know that a new hantenna was launched. Applications re-submit their gesture specs to maintain detection and event reporting.

The startup message includes the hantenna version so it can also trigger conditional behavior in the application if a gesture spec changes from one version of hantenna to another version. An example startup message of an embodiment is as follows:
 descrips:
 hantenna-startup
 ingests:
 time: 1348530502.6174691
 version: 'x.y'

Shutdown Message Protein

The shutdown message notifies existing clients that hantenna is ending. An example shutdown message of an embodiment is as follows:
 descrips:
 hantenna-shutdown
 ingests:
 time: 1348530532.6174691
 version: 'x.y'

Heartbeat Message Protein

Hantenna of an embodiment maintains a timer associated with each client ID and removes the processor and all gestures for a specific client after a pre-specified period of time (e.g., 24 hours, etc.). This behavior ensures that hantenna does not spend too much time detecting gestures for clients that have disappeared. A well-behaved application sends a "clearspec" message before exiting to avoid such unnecessary processing, but network errors or other issues in the client may lead to orphaned gesture specs.

Any message from a client resets the internal timer, but the embodiment is not so limited. The heartbeat message of an embodiment is a message that has no effects other than to inform hantenna that a client is still active. Thus the heartbeat message is always safe to send, and long-running applications should ensure that a heartbeat or some other message is sent at least once every pre-specified period of time (e.g., 24 hours) to avoid premature removal of a client's gesture specs.

Hantenna of an embodiment sends a processor-expired message when it automatically removes a client's gesture specs. Further, Hantenna checks for expired processors when there is a new frame from ghost, but the embodiment is not so limited. Thus no processors expire in the absence of input from the pipeline since hantenna is sitting dormant regardless of how many gesture specs have been registered.

There is no heartbeat message generated by hantenna, but the embodiment is not so limited. There is also no explicit ping message, but a client of an embodiment checks for hantenna by sending a "help" or a "list-specs" message and looking for the appropriate response protein. The response proteins of an embodiment include a "heartbeat" protein, a "heartbeat-ack" protein, and a "processor-expired" protein, to name a few, but are not so limited. Each of the response proteins is described in detail herein.

The "heartbeat" protein of an embodiment only makes use of the descrips section of the protein but is not necessarily so limited. The first descrip identifies the message as a heartbeat, while the second descrip specifies the client ID. An example is as follows:
 descrips:
 heartbeat
 my-id
 ingests:

A "heartbeat-ack" protein is only sent when a heartbeat references a non-existent client. An example is as follows:
 descrips:
 heartbeat-ack
 my-id
 ingests:
 result: false
 clientid: my-id
 messages:
  unknown client ID (my-id)

When the gesture specs and associated processor are removed for a client, hantenna generates a message, an example of which follows:
 descrips:
 processor-expired
 my-id
 ingests:
 clientid: my-id
 time-last-activity: 1348100357.21

As described herein, the above protein specification provides documentation of type or by example. All protein types noted herein may be expressed via command line or script, as reflected in the following example:
 p-deposit -d spec -d blurt -i hands:onehanded entrygripes: "^^V>:x^"-i wordstamp:victory hantenna
or,
 poke -slaw "{descrips: [spec,blurt], ingests: {hands: onehanded, entrygripes: ['^^V>,:x^'], wordstamp: victory}}" hantenna or, in C++ code,
```
Hose *h=Pool::Participate ("tcp://pipeline-machine/han-
    tenna");
h->Deposit (Protein (Slaw::List ("spec", "blurt"),
    Slaw::Map ("hands", "onehanded",
        "entrygripes", "^^V>:x^",
        "wordstamp", "victory")));
```

Kiosk and Applications

Kiosk and Applications of a Markerless SOE

The Related Applications describe installations of a tracking and markerless system, of a variety of set-ups or configurations, also referred to as a "kiosk." Different kiosk installations include but are not limited to, for example, a sensor, display, and computer executing the SOE integrating the vision pipeline and applications. A kiosk user can manipulate applications that run on the kiosk. These applications may be implemented via the "hantenna" processing approach described herein.

Kiosk for a Windows Machine

Figure 45:
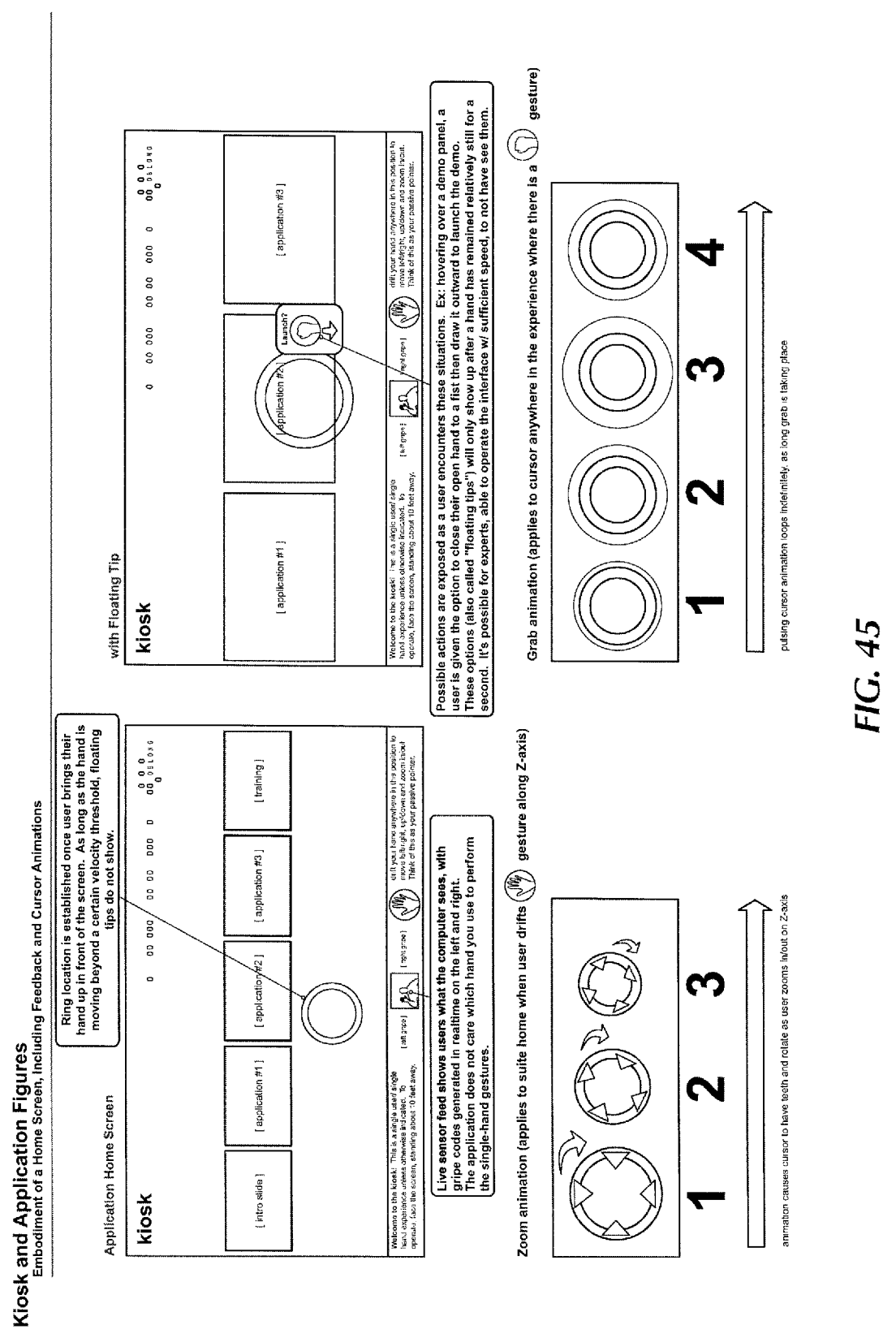

A kiosk integrating applications can operate on a Windows machine under the description herein. The kiosk and applications work with both Kinect sensors and open NI IR sensors, but are not so limited. Under this embodiment a kiosk is configured so the operator effectively uses its applications and the SOE not limited to the gestural interface. FIG. 45 is an example "Home Screen," including feedback and cursor animations, provided by the kiosk to enable a user to efficiently navigate between applications of the application suite, under an embodiment.

Application Suite for a Windows Kiosk, Including Home Screen

Figure 46B:
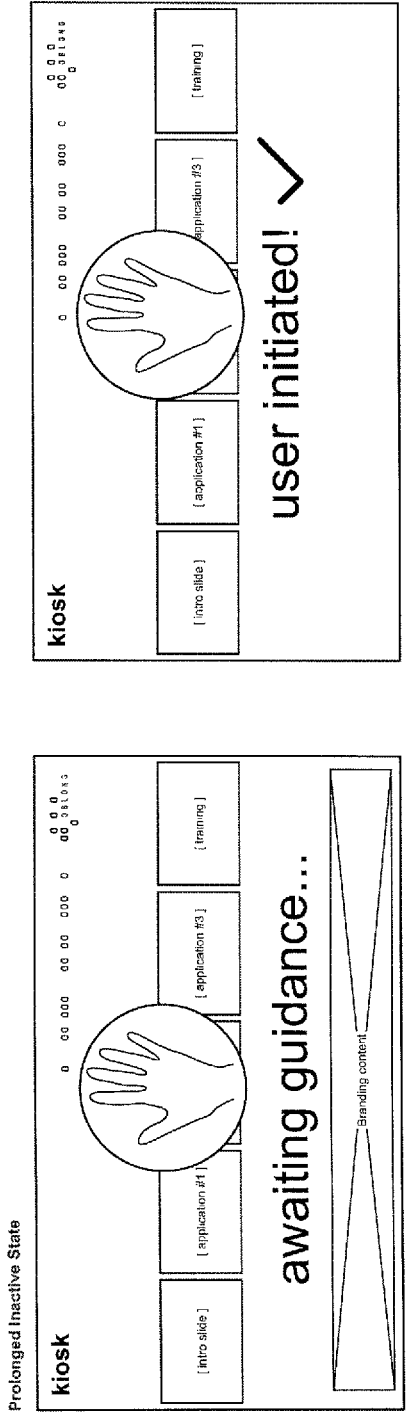
FIG. 46B is an example application suite screen, including feedback, under an embodiment.

A series of applications of an embodiment implement the processing described herein. These applications include Plasma dependencies alone and function in the Windows operating system, but are not so limited. FIG. 46A is an example application screen, including feedback and cursor graphics, under an embodiment. FIG. 46B is an example application suite screen, including feedback, under an embodiment.

Figure 47B:
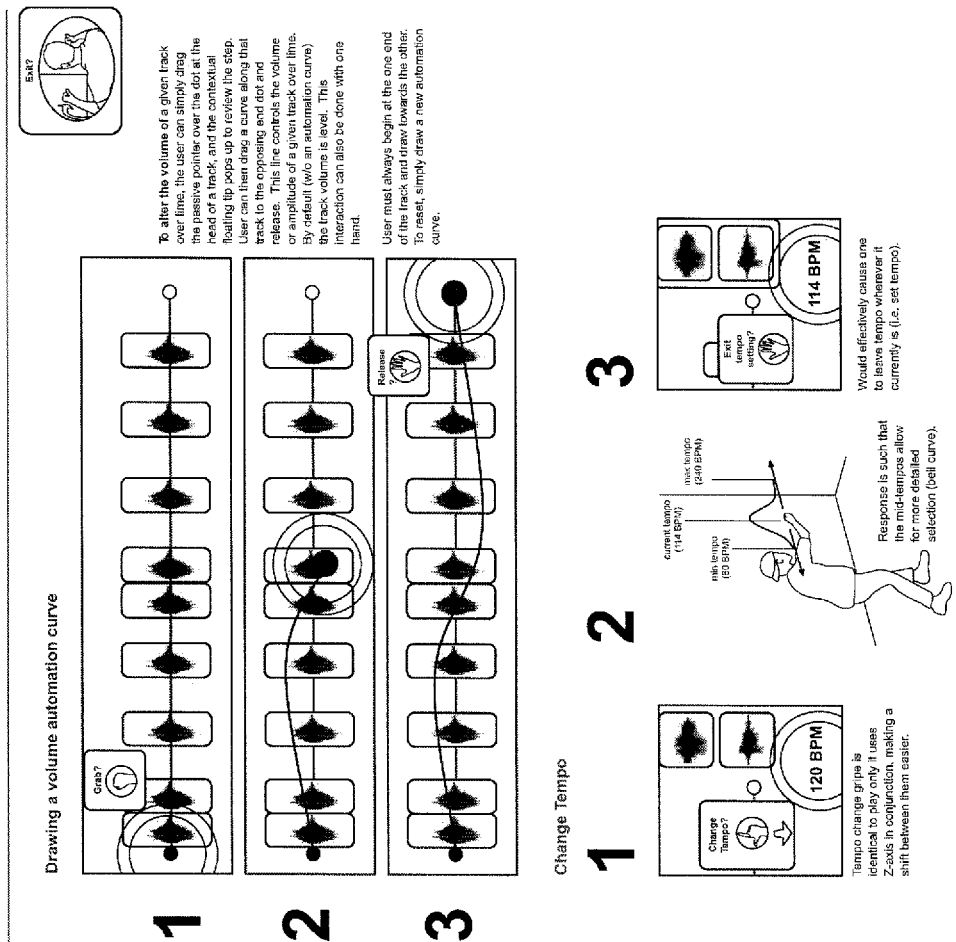
FIG. 47B shows example screens of the Airborne Beats application relating to sampling functions and gestures, under an embodiment.
Figure 47C:
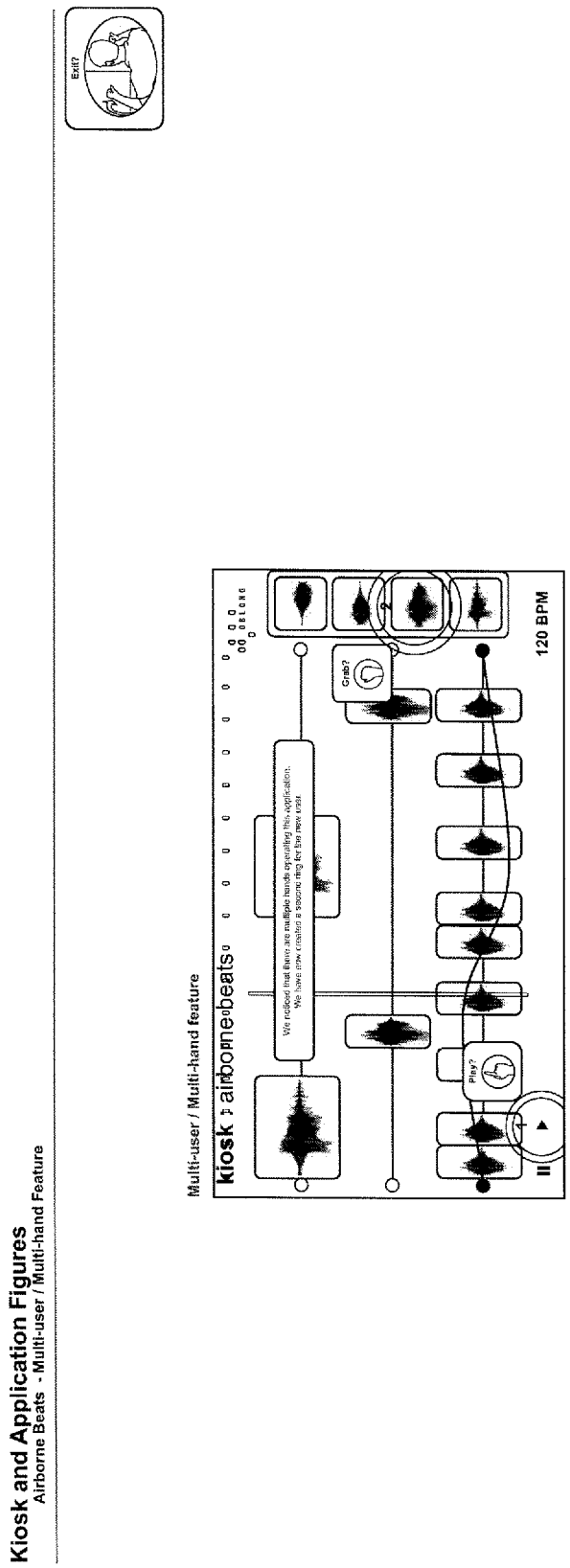
FIG. 47C shows an example screen of the Airborne Beats application relating to multi-user/multi-hand features, under an embodiment.

The kiosk applications of an embodiment include an application or group of applications referred to herein as the Airborne Beats application. Airborne Beats includes an audio sample sequencer that leverages the power of gesture-based interactions to expedite the speed of shift in transport and editing functions (i.e. pause, play, move, automate) to allow for a floating experience of music-making. FIG. 47A is an example main screen of the Airborne Beats application, under an embodiment: FIG. 47B shows example screens of the Airborne Beats application relating to sampling functions and gestures, under an embodiment. FIG. 47C shows an example screen of the Airborne Beats application relating to multi-user/multi-hand features, under an embodiment.

The kiosk applications of an embodiment include an application or group of applications referred to herein as the Terra Form a application, or Terra Beats application. The Terra Form a application includes a terraforming application that uses the location of a user's right hand to draw blocky terrain. FIG. 48A shows example screens of the Terra Form a application relating to Preview Mode and Build Mode, and also shows an example of drift, under an embodiment. In build mode, the bulldozer tool draws terrain, where the hand's X and Z position determine an area of impact on the grid, and the Y position determines the height of a land mass, which includes surrounding squares. The Terra Form a application includes various tools by which the user interacts with the application. The tools include, for example, an eye tool, a mountain tool, and a rotate tool, but are not so limited.

Figure 48B:
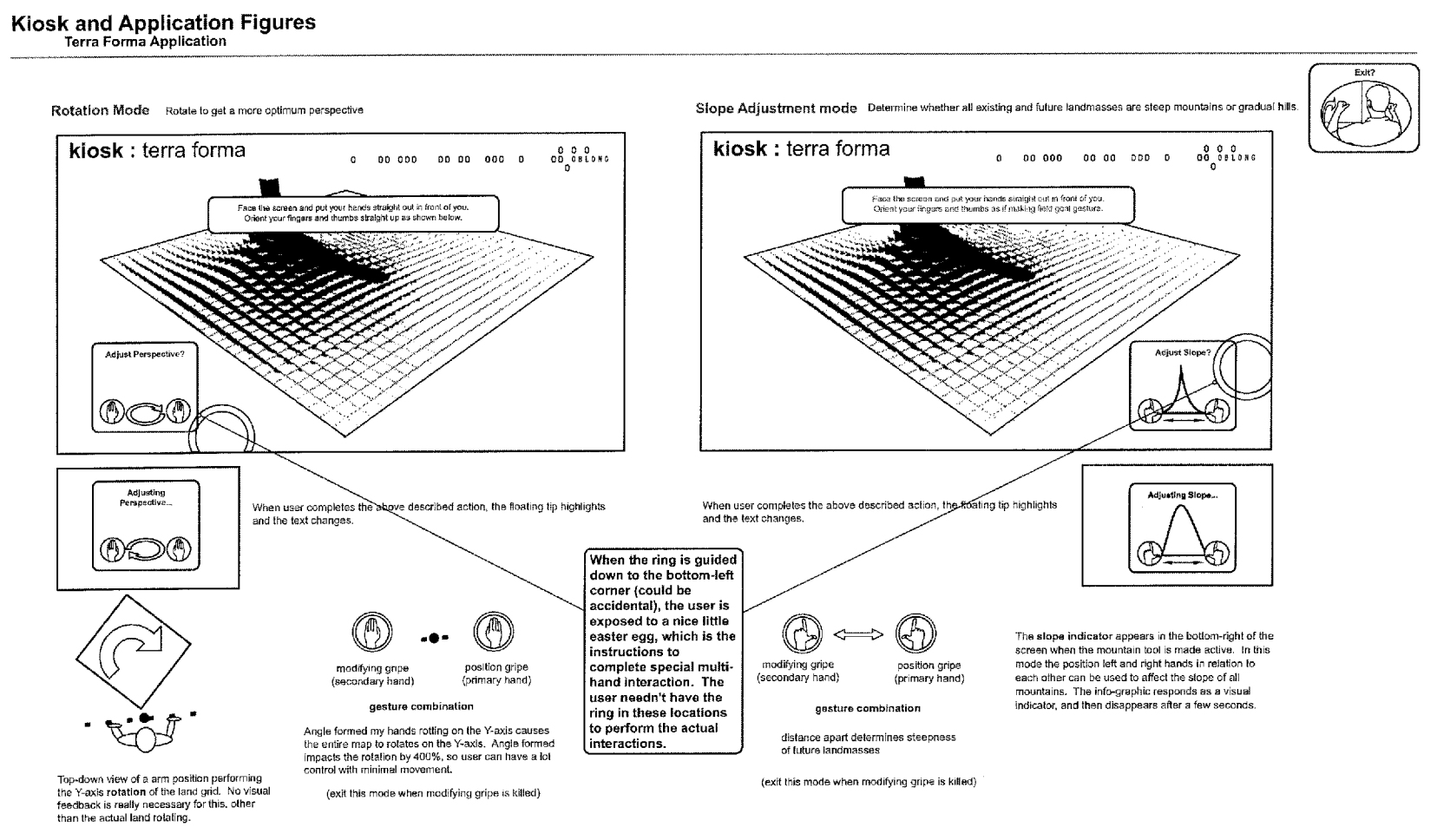

The eye tool of an embodiment, allows users to see or preview the results of a terraforming interaction on the land form, without actually committing the change. The mountain tool of an embodiment is used to control slope of new landmasses but is not so limited. Additionally, the rotate tool of an embodiment is used to rotate the grid on Y-axis, lazy Susan style, but is not so limited. FIG. 48B shows example screens of the Terra Form a application relating to Rotation Mode and Slope Adjustment Mode, under an embodiment.

The kiosk applications of an embodiment include an application or group of applications referred to herein as the Gest-a-Sketch application. The Gest-a-Sketch application is a drawing tool that leverages the X and Y hand position for sketching a two-dimensional (2D) form, where the Z-axis is used to dynamically affect the thickness of lines or the size of panels, depending on their choice, but the embodiment is not so limited. The Gest-a-Sketch application provides utility that includes but is not limited to drawing vector-based forms, which would be overly complicated using conventional 2D editors. Additionally, Gest-a-Sketch is configured to be fun, to engage the user to take advantage of the Z-axis to affect the 2D forms. FIG. 49 shows an example Main screen of the Gest-a-Sketch application along with example screens showing functions including rotation, color selection, drawing, and other actions provided to a user, under an embodiment.

The kiosk applications of an embodiment include an application or group of applications referred to herein as the Training application. The Training application of an embodiment provides an interface for training users on common gripe gestures. The Training application includes but is not limited to three modes: Two Hands, Right Hand, and Left Hand modes. A match is indicated by a border of a first color (e.g., green, etc.), whereas a border of a second color (e.g., red, etc.) represents an incorrect gripe. In Two Hands mode, a match of both gripes result in the next desired gestures being provided. In a single hand mode only one match is used. The total time elapsed restarts at each iteration, and the training screen runs continuously until the user exits the screen via the "victory" gesture, which is also referred to herein as the "peace-out" gesture.

Figure 50:
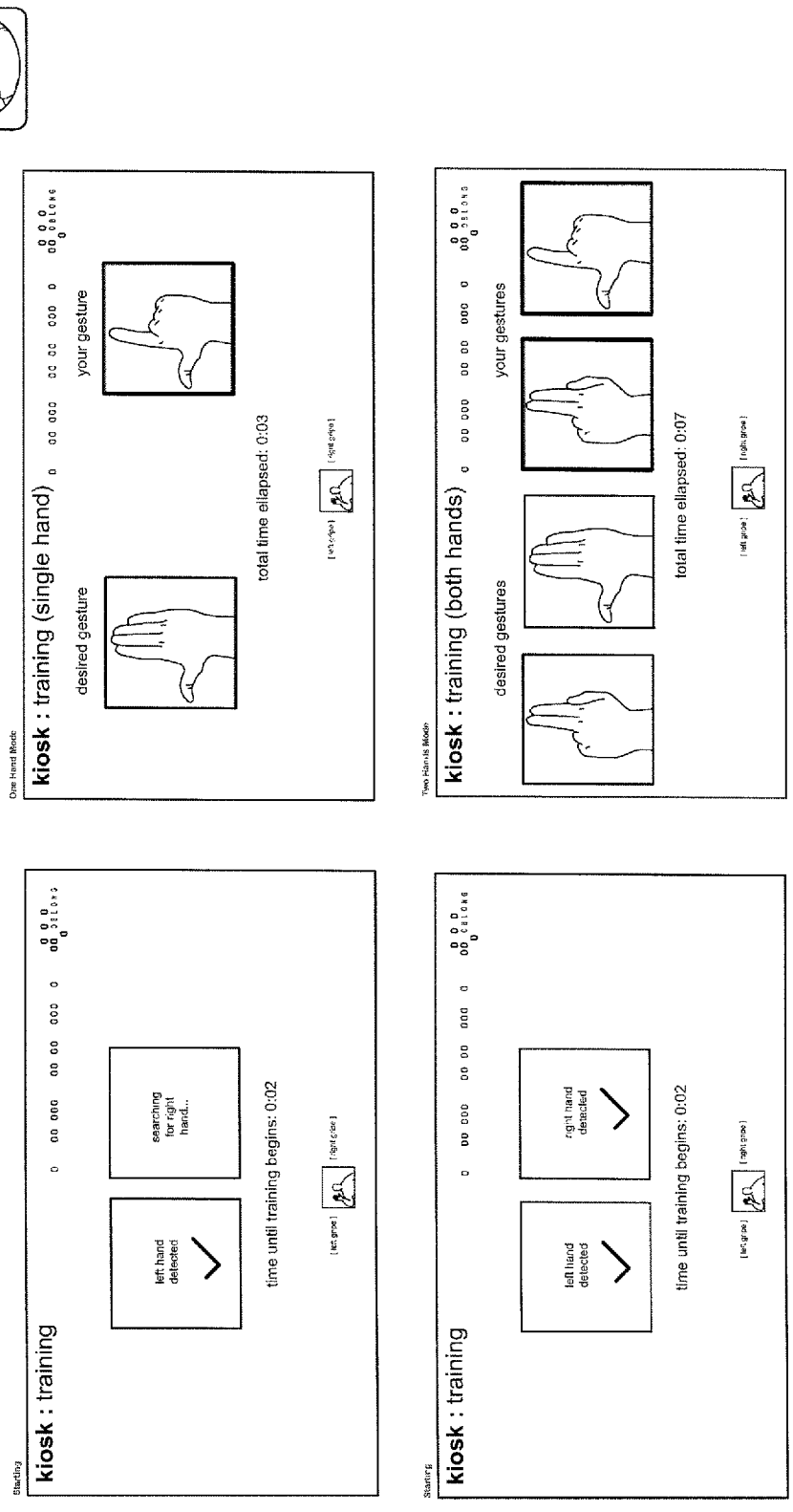
FIG. 50 shows example screens of two modes of the Training application, under an embodiment.

FIG. 50 shows example screens of two modes of the Training application, under an embodiment. A first mode includes the Single Hand (e.g., right hand) mode, and the example screens (shown in the top panels) include a starting screen and a training screen of the Single Hand mode. A second mode includes the Two Hands mode, and the example screens (shown in the bottom panels) include a starting screen and a training screen of the Two Hands mode.

Airborne Beats: Example of Application Data Input

As described above, FIGS. 47A-47C show aspects of an audio sampler application. In particular, FIG. 47A is an example main screen of the Airborne Beats application, FIG. 47B shows example screens of the Airborne Beats application relating to sampling functions and gestures, and FIG. 47C shows an example screen of the Airborne Beats application relating to multi-user/multi-hand features, under an embodiment. The audio sampler application includes gripe and gesture sequence implementations that include but are not limited to Sample Interactions, Automation Interactions, Play/Pause Interactions, and Change Tempo Interactions to name a few. Each of these interactions is described in detail below.

The Sample Interactions of an embodiment include but are not limited to Sample grab, Sample drag, and Sample release interactions. The Sample grab interaction of an embodiment comprises drifting an open hand (VV-) over a sample and then grabbing with that hand by closing it to a first (^^^>). The Sample release interaction of an embodiment comprises transitioning from a sample grab state (see "Sample Grab" herein) to releasing by opening the closed hand that was performing the grabbing/dragging.

The Sample drag interaction of an embodiment comprises, while the hand is grabbing a sample (see "Sample Grab" herein), moving the hand along the x- and y-axis to reposition it on the timeline. The sample position is quantized to a grid, so that dragging the sample to places that correspond to sub-divisions of a beat is made simpler.

The Automatic Interactions of an embodiment include but are not limited to Automation curve anchor grab, Automation curve draw, and Automation curve anchor release. Automation curve anchor grab of an embodiment comprises drifting an open hand (VV-) over the start or end of a sample track and, at this point, an automation curve anchor can be grabbed by closing the hand into a fist (^^^>), to initiate the (re)drawing of a curve. Automation curve draw comprises, once the anchor is grabbed, moving the closed hand to the opposing end of a track, drawing a curve that controls the amplitude of that particular track over time. Automation curve anchor release comprises, after dragging a closed hand to the opposing side of a track, effectively dragging an automation curve along the way, opening the hand to confirm the automation curve.

The Play/Pause Interactions of an embodiment include but are not limited to functionality to Play audio and Pause audio. The Play audio—(^^^|>) functionality comprises positioning the hand vertically, palm-normal towards the screen, then raising the thumb and index finger to point straight up, while curling the remaining fingers downward. This gesture causes sound to play, as the playhead advances forward. The playhead returns to the beginning (i.e. loops) once it reaches or determines the end of the tracks. It is noted that the application of an embodiment sees the thumb straight up (|) and thumb curled (>) as being the same in an embodiment, and therefore, FIG. 47A included herein depicts the thumb straight up though the gripe is (^^^|->). The Pause audio functionality comprises, from the play position described herein, dropping the thumb from the play position to a point where it forms an approximately 90-degree angle relative to the index finger (^^^|-).

The Change tempo interaction (^V>) of an embodiment comprises forming a "V" with the index and middle finger and moving the hand towards and away from the screen. The closer the hand is to the screen, the faster the tempo, and the farther the hand is from the screen, the slower the tempo.

The audio sampler application, in addition to the interactions described above, includes a Corner gesture hinting interaction. The Corner gesture hinting interaction comprises moving the hand to an area that corresponds to the bottom corner of a screen that includes read-outs for play/pause or tempo. This results in feedback explaining the necessary gesture to perform these functions.

The audio sampler application also includes a Navigation/Reset interaction. The Navigation/Reset interaction comprises moving the hand to the top-left (to quit out of the application) or the top-right (to reset the application). Holding the hand in this position confirms the action.

Application Design and Implementation

As with the applications described in Application No. 61/655,423 and the Related Applications the applications described herein reflect particular attributes selected to benefit user experience, control, and function, but the embodiments are not limited to these attributes. These attributes include, for example, robust gestural control so, unlike other gesture interfaces that restrict users to shallow and brittle movements, the gestures of the applications described herein leverage z-axis interactions. The attributes of an embodiment also include multi-hand gestures, as well as a hand-ambiguous user interface (UI) such that the applications do not restrict user input to only left or right hand but instead recognizes two hands.

Figure 51:
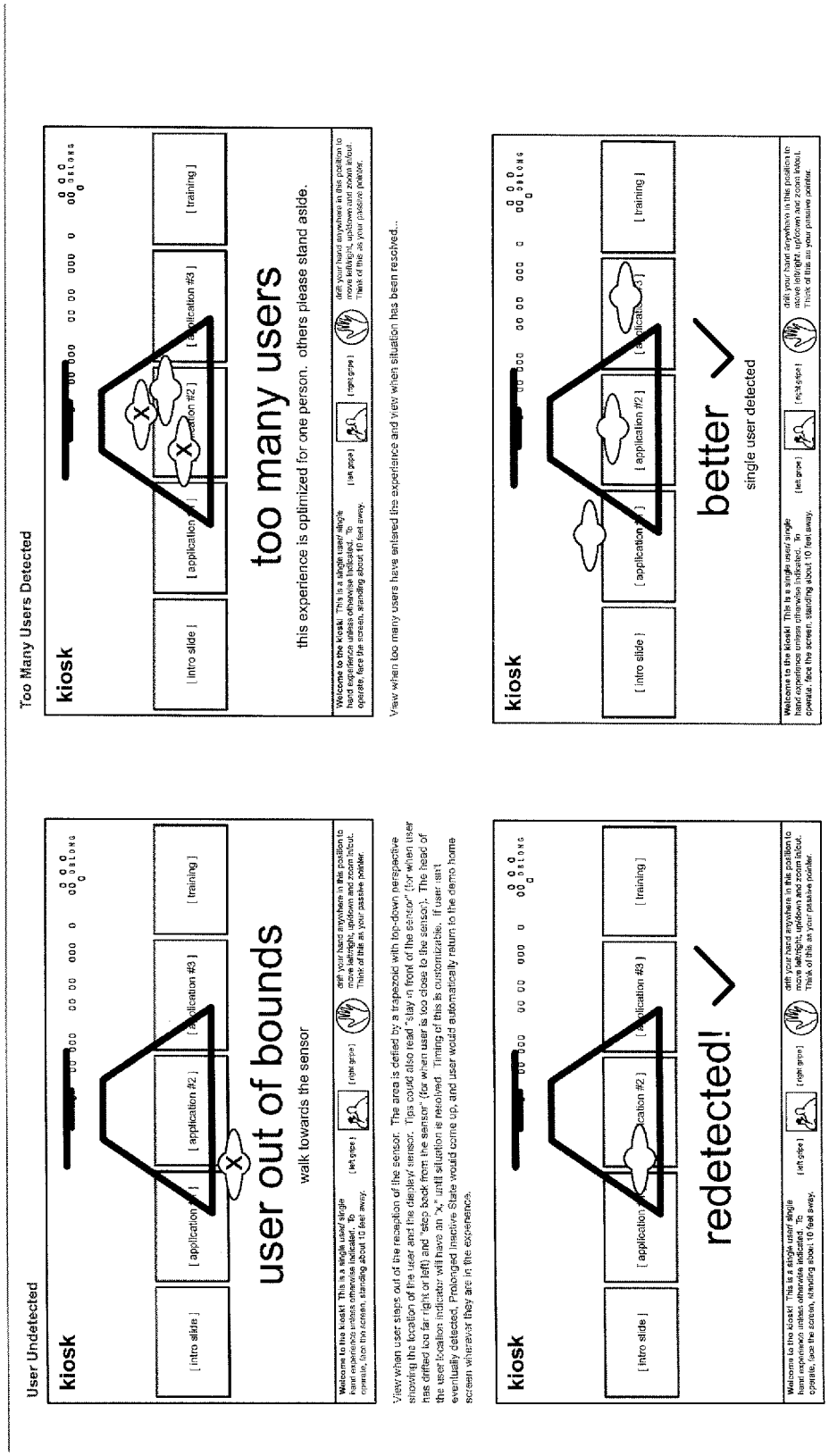
FIG. 51 shows example screens of spatial feedback presented to a user by the application, under an embodiment.

Furthermore, the attributes include providing user spatial feedback to keep users within the experience, to create a positive experience, and to support effective use of the application. The spatial feedback of an embodiment includes, but is not limited to, a "bounding box" graphic displayed on screen to indicate when user input is outside sensor range. FIG. 51 shows example screens of spatial feedback presented to a user by the application, under an embodiment. The examples of spatial feedback include, for example, feedback indicating a single user is detected, and feedback indicating the system has detected too many users. The spatial feedback also includes information relating to a user's proximity to the sensor (e.g., "walk towards the sensor").

Additionally, the attributes include providing user screen feedback. The application of an embodiment provides graphic feedback on user gestures, thereby making the user of application interpretation. FIG. 47A is an example main screen of the Airborne Beats application showing user screen feedback, under an embodiment.

Strategic gesture design is also a component of the application in that the applications design gestures to function. The gestures are implemented in an embodiment so that users can leverage function properly, efficiently, and robustly as possible. FIG. 47B shows example screens of the Airborne Beats application relating to sampling functions and gestures, and the Change Tempo function is but one example of strategic gesture design, under an embodiment.

SOE Kiosk

The Related Applications referenced herein include descriptions of systems and methods for gesture-based control, which in some embodiments provide markerless gesture recognition, and in other embodiments identify users' hands in the form of glove or gloves with certain indicia. The SOE kiosk system provides a markerless setting in which gestures are tracked and detected in a gloveless, indicia-free system, providing unusual finger detection and latency, as an example. The SOE includes at least a gestural input/output, a network-based data representation, transit, and interchange, and a spatially conformed display mesh. In scope the SOE resembles an operating system as it is a complete application and development platform. It assumes, though, a perspective enacting design and function that extend beyond traditional computing systems. Enriched, capabilities include a gestural interface, where a user interacts with a system that tracks and interprets hand poses, gestures, and motions.

As stated above, the SOE kiosk described herein provides the robust approach of the SOE within a self-contained markerless setting. A user engages the SOE as a "free" agent, without gloves, markers, or any such indicia, nor does it require space modifications such as installation of screens, cameras, or emitters. The only requirement is proximity to the system that detects, tracks, and responds to hand shapes and other input elements. The system, comprising representative sensors combined with the markerless tracking system, as described in detail herein, provides pose recognition within a pre-specified range (e.g., between one and three meters, etc.). The SOE kiosk system therefore provides flexibility in portability and installation but embodiments are not so limited.

As described in detail herein, FIG. 1A is a block diagram of the SOE kiosk including a processor hosting the gestural interface component or application that provides the vision-based interface using hand tracking and shape recognition, a display and a sensor, under an embodiment. FIG. 1B shows a relationship between the SOE kiosk and an operator, under an embodiment. The general term "kiosk" encompasses a variety of set-ups or configurations that use the markerless tracking and recognition processes described herein. These different installations include, for example, a processor coupled to a sensor and at least one display, and the tracking and recognition component or application running on the processor to provide the SOE integrating the vision pipeline. The SOE kiosk of an embodiment includes network capabilities, whether provided by coupled or connected devices such as a router or engaged through access such as wireless.

Figure 2:
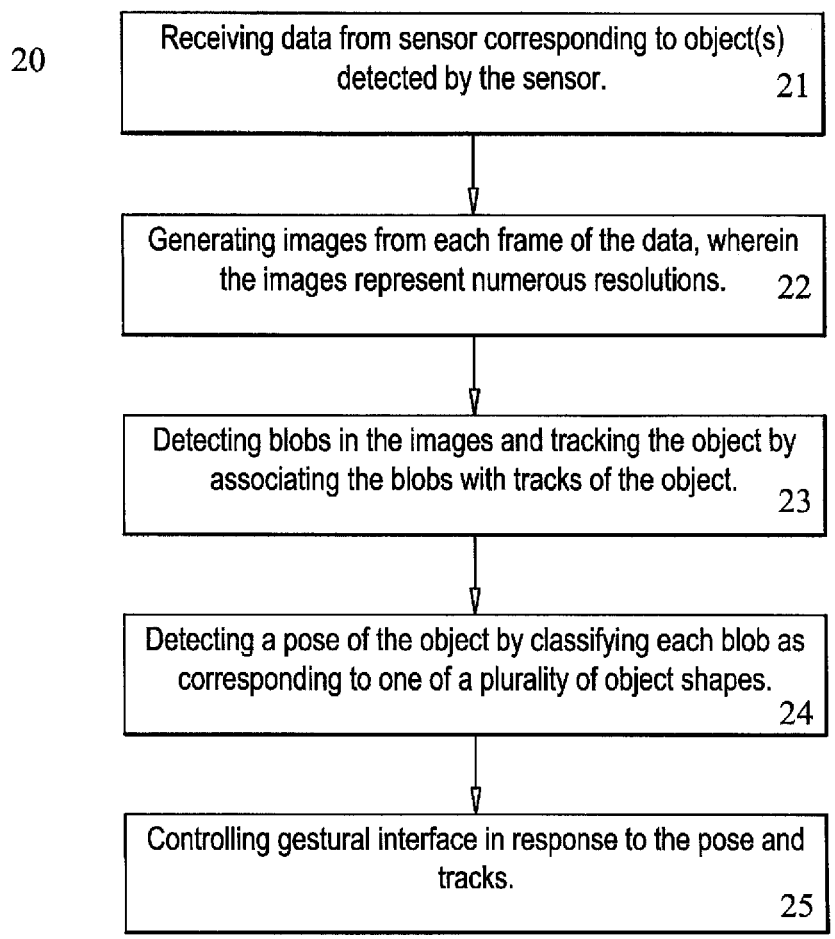
FIG. 2 is a flow diagram of operation of the vision-based interface performing hand or object tracking and shape recognition, under an embodiment.

FIG. 2 is a flow diagram of operation of the gestural or vision-based interface performing hand or object tracking and shape recognition 20, under an embodiment. The vision-based interface receives data from a sensor 21, and the data corresponds to an object detected by the sensor. The interface generates images from each frame of the data 22, and the images represent numerous resolutions. The interface detects blobs in the images and tracks the object by associating the blobs with tracks of the object 23. A blob is a region of a digital image in which some properties (e.g., brightness, color, depth, etc.) are constant or vary within a prescribed range of value, such that all point in a blob can be considered in some sense to be similar to each other. The interface detects a pose of the object by classifying each blob as corresponding to one of a number of object shapes 24. The interface controls a gestural interface in response to the pose and the tracks 25.

Figure 3:
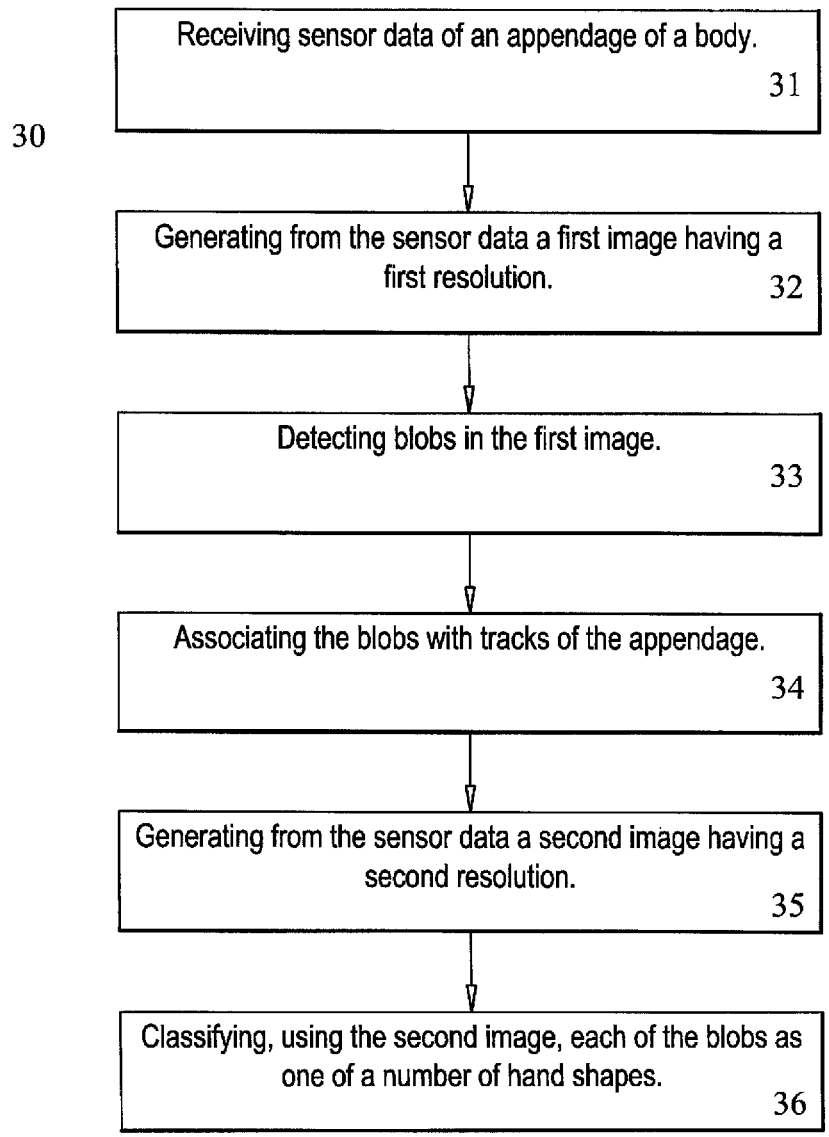
FIG. 3 is a flow diagram for performing hand or object tracking and shape recognition, under an embodiment.

FIG. 3 is a flow diagram for performing hand or object tracking and shape recognition 30, under an embodiment. The object tracking and shape recognition is used in a vision-based gestural interface, for example, but is not so limited. The tracking and recognition comprises receiving sensor data of an appendage of a body 31. The tracking and recognition comprises generating from the sensor data a first image having a first resolution 32. The tracking and recognition comprises detecting blobs in the first image 33. The tracking and recognition comprises associating the blobs with tracks of the appendage 34. The tracking and recognition comprises generating from the sensor data a second image having a second resolution 35. The tracking and recognition comprises using the second image to classify each of the blobs as one of a number of hand shapes 36.

Example embodiments of the SOE kiosk hardware configurations follow, but the embodiments are not limited to these example configurations. The SOE kiosk of an example embodiment is an iMac-based kiosk comprising a 27" version of the Apple iMac with an Asus Xtion Pro, and a sensor is affixed to the top of the iMac. A Tenba case includes the iMac, sensor, and accessories including keyboard, mouse, power cable, and power strip.

The SOE kiosk of another example embodiment is a portable mini-kiosk comprising a 30" screen with relatively small form-factor personal computer (PC). As screen and stand are separate from the processor, this set-up supports both landscape and portrait orientations in display.

The SOE kiosk of an additional example embodiment comprises a display that is a 50" 1920×1080 television or monitor accepting DVI or HDMI input, a sensor (e.g., Asus Xtion Pro Live, Asus Xtion Pro, Microsoft Kinect, Microsoft Kinect for Windows, Panasonic D-Imager, SoftKinetic DS311, Tyzx G3 EVS, etc.), and a computer or process comprising a relatively small form-factor PC running a quad-core CPU and an NVIDIA NVS 420 GPU.

As described above, embodiments of the SOE kiosk include as a sensor the Microsoft Kinect sensor, but the embodiments are not so limited. The Kinect sensor of an embodiment generally includes a camera, an infrared (IR) emitter, a microphone, and an accelerometer. More specifically, the Kinect includes a color VGA camera, or RGB camera, that stores three-channel data in a 1280×960 resolution. Also included is an IR emitter and an IR depth sensor. The emitter emits infrared light beams and the depth sensor reads the IR beams reflected back to the sensor. The reflected beams are converted into depth information measuring the distance between an object and the sensor, which enables the capture of a depth image.

The Kinect also includes a multi-array microphone, which contains four microphones for capturing sound. Because there are four microphones, it is possible to record audio as well as find the location of the sound source and the direction of the audio wave. Further included in the sensor is a 3-axis accelerometer configured for a 2G range, where G represents the acceleration due to gravity. The accelerometer can be used to determine the current orientation of the Kinect.

Low-cost depth cameras create new opportunities for robust and ubiquitous vision-based interfaces. While much research has focused on full-body pose estimation and the interpretation of gross body movement, this work investigates skeleton-free hand detection, tracking, and shape classification. Embodiments described herein provide a rich and reliable gestural interface by developing methods that recognize a broad set of hand shapes and which maintain high accuracy rates across a wide range of users. Embodiments provide real-time hand detection and tracking using depth data from the Microsoft Kinect, as an example, but are not so limited. Quantitative shape recognition results are presented for eight hand shapes collected from 16 users and physical configuration and interface design issues are presented that help boost reliability and overall user experience.

Hand tracking, gesture recognition, and vision-based interfaces have a long history within the computer vision community (e.g., the put-that-there system published in 1980 (e.g., R. A. Bolt. Put-that-there: Voice and gesture at the graphics interface. Conference on Computer Graphics and Interactive Techniques, 1980 ("Bolt"))). The interested reader is directed to one of the many survey papers covering the broader field (e.g., A. Erol, G. Bebis, M. Nicolescu, R. Boyle, and X. Twombly. Vision-based hand pose estimation: A review. Computer Vision and Image Understanding, 108: 52-73, 2007 ("Erol et al."); S. Mitra and T. Acharya. Gesture recognition: A survey. IEEE Transactions on Systems, Man and Cybernetics—Part C, 37(3):311-324, 2007 ("Mitra et al."); X. Zabulis, H. Baltzakis, and A. Argyros. Vision-based hand gesture recognition for human-computer interaction. The Universal Access Handbook, pages 34.1-34.30, 2009 ("Zabulis et al."); T. B. Moeslund and E. Granum. A survey of computer vision-based human motion capture. Computer Vision and Image Understanding, 81:231-268, 2001 ("Moeslund-1 et al."); T. B. Moeslund, A. Hilton, and V. Kruger. A survey of advances in vision-based human motion capture and analysis. Computer Vision and Image Understanding, 104:90-126, 2006 ("Moeslund-2 et al.")).

The work of Plagemann et al. presents a method for detecting and classifying body parts such as the head, hands, and feet directly from depth images (e.g., C. Plagemann, V. Ganaphthi, D. Koller, and S. Thrun. Real-time identification and localization of body parts from depth images. IEEE International Conference on Robotics and Automation (ICRA), 2010 ("Plagemann et al.")). They equate these body parts with geodesic extrema, which are detected by locating connected meshes in the depth image and then iteratively finding mesh points that maximize the geodesic distance to the previous set of points. The process is seeded by either using the centroid of the mesh or by locating the two farthest points. The approach presented herein is conceptually similar but it does not require a pre-specified bounding box to ignore clutter. Furthermore, Plagemann et al. used a learned classifier to identify extrema as a valid head, hand, or foot, whereas our method makes use of a higher-resolution depth sensor and recognizes extrema as one of several different hand shapes.

Shwarz et al. extend the work of Plagemann et al. by detecting additional body parts and fitting a full-body skeleton to the mesh (e.g., L. A. Schwarz, A. Mkhitaryan, D. Mateus, and N. Navab. Estimating human 3d pose from time-of-flight images based on geodesic distances and optical flow. Automatic Face and Gesture Recognition, pages 700-706, 2011 ("Shwarz et al.")). They also incorporate optical flow information to help compensate for self-occlusions. The relationship to the embodiments presented herein, however, is similar to that of Plagemann et al. in that Shwarz et al. make use of global information to calculate geodesic distance which will likely reduce reliability in cluttered scenes, and they do not try to detect finger configurations or recognize overall hand shape.

Shotton et al. developed a method for directly classifying depth points as different body parts using a randomized decision forest (e.g., L. Breiman. Random forests. Machine Learning, 45(1):5-32, 2001 ("Breiman")) trained on the distance between the query point and others in a local neighborhood (e.g., J. Shotton, A. Fitzgibbon, M. Cook, T. Sharp, M. Finocchio, R. Moore, A. Kipman, and A. Blake. Real-time human pose recognition in parts from a single depth image. IEEE Conf on Computer Vision and Pattern Recognition, 2011 ("Shotton et al.")). Their goal was to provide higher-level information to a real-time skeleton tracking system and so they recognize 31 different body parts, which goes well beyond just the head, hands, and feet. The approach described herein also uses randomized decision forests because of their low classification overhead and the model's intrinsic ability to handle multi-class problems. Embodiments described herein train the forest to recognize several different hand shapes, but do not detect non-hand body parts.

In vision-based interfaces, as noted herein, hand tracking is often used to support user interactions such as cursor control, 3D navigation, recognition of dynamic gestures, and consistent focus and user identity. Although many sophisticated algorithms have been developed for robust tracking in cluttered, visually noisy scenes (e.g., J. Deutscher, A. Blake, and I. Reid. Articulated body motion capture by annealed particle filtering. Computer Vision and Pattern Recognition, pages 126-133, 2000 ("Deutscher et al."); A. Argyros and M. Lourakis. Vision-based interpretation of hand gestures for remote control of a computer mouse. Computer Vision in HCI, pages 40-51, 2006. 1 ("Argyros et al.")), long-duration tracking and hand detection for track initialization remain challenging tasks. Embodiments described herein build a reliable, markerless hand tracking system that supports the creation of gestural interfaces based on hand shape, pose, and motion. Such an interface requires low-latency hand tracking and accurate shape classification, which together allow for timely feedback and a seamless user experience.

Embodiments described herein make use of depth information from a single camera for local segmentation and hand detection. Accurate, per-pixel depth data significantly reduces the problem of foreground/background segmentation in a way that is largely independent of visual complexity. Embodiments therefore build body-part detectors and tracking systems based on the 3D structure of the human body rather than on secondary properties such as local texture and color, which typically exhibit a much higher degree of variation across different users and environments (See, Shotton et al., Plagemann et al.).

Embodiments provide markerless hand tracking and hand shape recognition as the foundation for a vision-based user interface. As such, it is not strictly necessary to identify and track the user's entire body, and, in fact, it is not assumed that the full body (or even the full upper body) is visible. Instead, embodiments envision situations that only allow for limited visibility such as a seated user where a desk occludes part of the user's arm so that the hand is not observably connected to the rest of the body. Such scenarios arise quite naturally in real-world environments where a user may rest their elbow on their chair's arm or where desktop clutter like an open laptop may occlude the lower portions of the camera's view.

Figure 4:
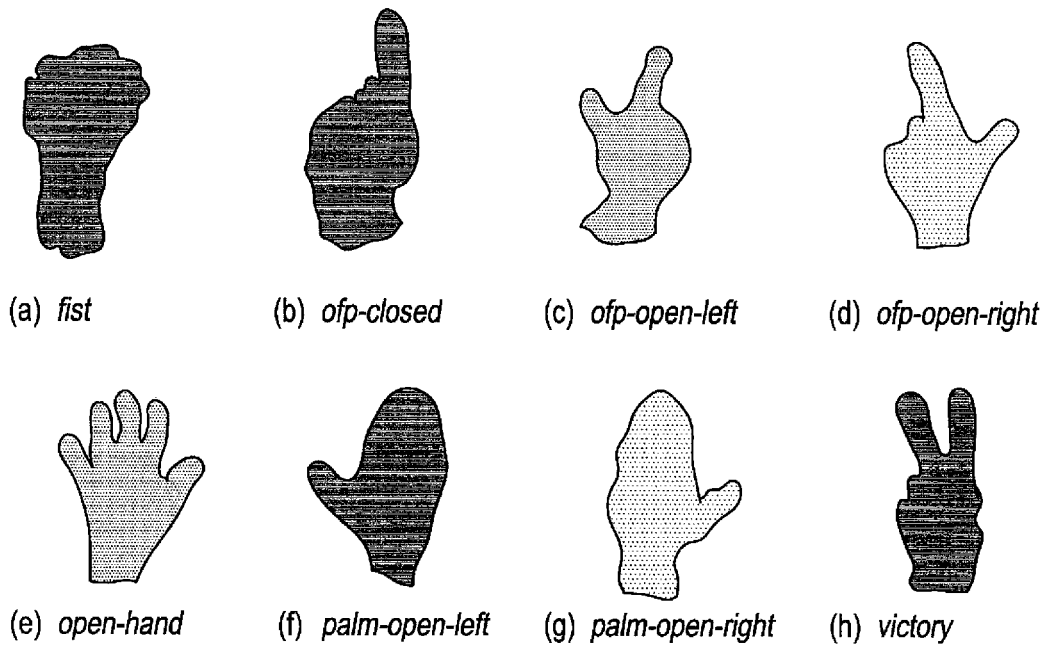
FIG. 4 depicts eight hand shapes used in hand tracking and shape recognition, under an embodiment.

FIG. 4 depicts eight hand shapes used in hand tracking and shape recognition, under an embodiment. Pose names that end in -left or -right are specific to that hand, while open and closed refer to whether the thumb is extended or tucked in to the palm. The acronym "ofp" represents "one finger point" and corresponds to the outstretched index finger.

The initial set of eight poses of an embodiment provides a range of useful interactions while maintaining relatively strong visual distinctiveness. For example, the combination of open-hand and fist may be used to move a cursor and then grab or select an object. Similarly, the palm-open pose can be used to activate and expose more information (by "pushing" a graphical representation back in space) and then scrolling through the data with lateral hand motions.

Other sets of hand shapes are broader but also require much more accurate and complete information about the finger configuration. For example, the American Sign Language (ASL) finger-spelling alphabet includes a much richer set of hand poses that covers 26 letters plus the digits zero through nine. These hand shapes make use of subtle finger cues, however, which can be difficult to discern for both the user and especially for the vision system.

Figure 5:
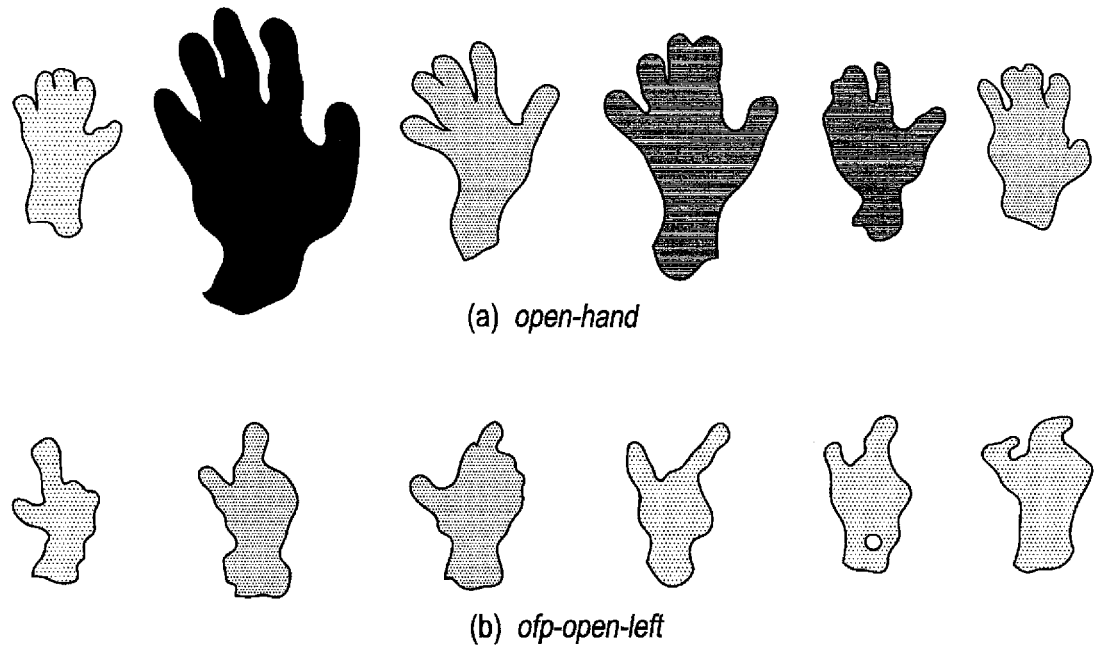
FIG. 5 shows sample images showing variation across users for the same hand shape category.

Despite the fact that the gesture set of an embodiment is configured to be visually distinct, a large range of variation was seen within each shape class. FIG. 5 shows sample images showing variation across users for the same hand shape category. Although a more accurate, higher-resolution depth sensor would reduce some of the intra-class differences, the primary causes are the intrinsic variations across people's hands and the perspective and occlusion effects caused by only using a single point of view. Physical hand variations were observed in overall size, finger width, ratio of finger length to palm size, joint ranges, flexibility, and finger control. For example, in the palm-open pose, some users would naturally extend their thumb so that it was nearly perpendicular to their palm and index finger, while other users expressed discomfort when trying to move their thumb beyond 45 degrees. Similarly, variation was seen during a single interaction as, for example, a user might start an palm-open gesture with their fingers tightly pressed together but then relax their fingers as the gesture proceeded, thus blurring the distinction between palm-open and open-hand. Additionally, the SOE kiosk system can estimate the pointing angle of the hand within the plane parallel to the camera's sensor (i.e., the xy-plane assuming a camera looking down the z-axis). By using the fingertip, it notes a real (two-dimensional) pointing angle.

The central contribution of embodiments herein is the design and implementation of a real-time vision interface that works reliably across different users despite wide variations in hand shape and mechanics. The approach of an embodiment is based on an efficient, skeleton-free hand detection and tracking algorithm that uses per-frame local extrema detection combined with fast hand shape classification, and a quantitative evaluation of the methods herein provide a hand shape recognition rate of more than 97% on previously unseen users.

Detection and tracking of embodiments herein are based on the idea that hands correspond to extrema in terms of geodesic distance from the center of a user's body mass. This assumption is violated when, for example, a user stands with arms akimbo, but such body poses preclude valid interactions with the interface, and so these low-level false negatives do not correspond to high-level false negatives. Since embodiments are to be robust to clutter without requiring a pre-specified bounding box to limit the processing volume, the approach of those embodiments avoids computing global geodesic distance and instead takes a simpler, local approach. Specifically, extrema candidates are found by directly detecting local, directional peaks in the depth image and then extract spatially connected components as potential hands.

The core detection and tracking of embodiments is performed for each depth frame after subsampling from the input resolution of 640×480 down to 80×60. Hand shape analysis, however, is performed at a higher resolution as described herein. The downsampled depth image is computed using a robust approach that ignores zero values, which correspond to missing depth data, and that preserves edges. Since the depth readings essentially represent mass in the scene, it is desirable to avoid averaging disparate depth values which would otherwise lead to "hallucinated" mass at an intermediate depth.

Local peaks are detected in the 80×60 depth image by searching for pixels that extend farther than their spatial neighbors in any of the four cardinal directions (up, down, left, and right). This heuristic provides a low false negative rate even at the expense of many false positives. In other words, embodiments do not want to miss a real hand, but may include multiple detections or other objects since they will be filtered out at a later stage.

Figure 7:
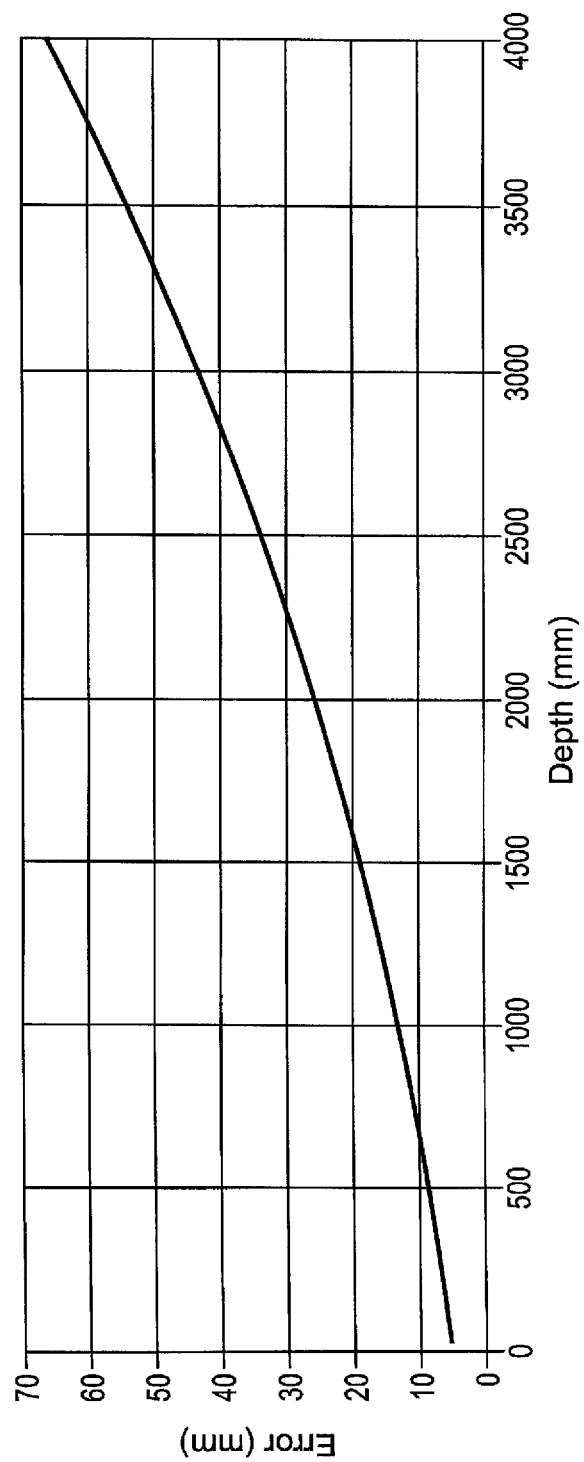
FIG. 7 shows a plot of the estimated minimum depth ambiguity as a function of depth based on the metric distance between adjacent raw sensor readings, under an embodiment.

Each peak pixel becomes the seed for a connected component ("blob") bounded by the maximum hand size, which is taken to be 300 mm plus a depth-dependent slack value that represents expected depth error. For the Microsoft Kinect, the depth error corresponds to the physical distance represented by two adjacent raw sensor readings (see FIG. 7 which shows a plot of the estimated minimum depth ambiguity as a function of depth based on the metric distance between adjacent raw sensor readings). In other words, the slack value accounts for the fact that searching for a depth difference of 10 mm at a distance of 2000 mm is not reasonable since the representational accuracy at that depth is only 25 mm The algorithm of an embodiment estimates a potential hand center for each blob by finding the pixel that is farthest from the blob's border, which can be computed efficiently using the distance transform. It then further prunes the blob using a palm radius of 200 mm with the goal of including hand pixels while excluding the forearm and other body parts. Finally, low-level processing concludes by searching the outer boundary for depth pixels that "extend" the blob, defined as those pixels adjacent to the blob that have a similar depth. The algorithm of an embodiment analyzes the extension pixels looking for a single region that is small relative to the boundary length, and it prunes blobs that have a very large or disconnected extension region. The extension region is assumed to correspond to the wrist in a valid hand blob and is used to estimate orientation in much the same way that Plagemann et al. use geodesic backtrack points (see, Plagemann et al.).

The blobs are then sent to the tracking module, which associates blobs in the current frame with existing tracks. Each blob/track pair is scored according to the minimum distance between the blob's centroid and the track's trajectory bounded by its current velocity. In addition, there may be overlapping blobs due to low-level ambiguity, and so the tracking module enforces the implied mutual exclusion. The blobs are associated with tracks in a globally optimal way by minimizing the total score across all of the matches. A score threshold of 250 mm is used to prevent extremely poor matches, and thus some blobs and/or tracks may go unmatched.

After the main track extension, the remaining unmatched blobs are compared to the tracks and added as secondary blobs if they are in close spatial proximity. In this way, multiple blobs can be associated with a single track, since a single hand may occasionally be observed as several separate components. A scenario that leads to disjoint observations is when a user is wearing a large, shiny ring that foils the Kinect's analysis of the projected structured light. In these cases, the finger with the ring may be visually separated from the hand since there will be no depth data covering the ring itself. Since the absence of a finger can completely change the interpretation of a hand's shape, it becomes vitally important to associate the finger blob with the track.

The tracking module then uses any remaining blobs to seed new tracks and to prune old tracks that go several frames without any visual evidence of the corresponding object.

Regarding hand shape recognition, the 80×60 depth image used for blob extraction and tracking provides in some cases insufficient information for shape analysis. Instead, hand pose recognition makes use of the 320×240 depth image, a Quarter Video Graphics Array (QVGA) display resolution. The QVGA mode describes the size or resolution of the image in pixels. An embodiment makes a determination as to which QVGA pixels correspond to each track. These pixels are identified by seeding a connected component search at each QVGA pixel within a small depth distance from its corresponding 80×60 pixel. The algorithm of an embodiment also re-estimates the hand center using the QVGA pixels to provide a more sensitive 3D position estimate for cursor control and other continuous, position-based interactions.

An embodiment uses randomized decision forests (see, Breiman) to classify each blob as one of the eight modeled hand shapes. Each forest is an ensemble of decision trees and the final classification (or distribution over classes) is computed by merging the results across all of the trees. A single decision tree can easily overfit its training data so the trees are randomized to increase variance and reduce the composite error. Randomization takes two forms: (1) each tree is learned on a bootstrap sample from the full training data set, and (2) the nodes in the trees optimize over a small, randomly selected number of features. Randomized decision forests have several appealing properties useful for real-time hand shape classification: they are extremely fast at runtime, they automatically perform feature selection, they intrinsically support multi-class classification, and they can be easily parallelized.

Methods of an embodiment make use of three different kinds of image features to characterize segmented hand patches. Set A includes global image statistics such as the percentage of pixels covered by the blob contour, the number of fingertips detected, the mean angle from the blob's centroid to the fingertips, and the mean angle of the fingertips themselves. It also includes all seven independent Flusser-Suk moments (e.g., J. Flusser and T. Suk. Rotation moment invariants for recognition of symmetric objects. IEEE Transactions on Image Processing, 15:3784-3790, 2006 ("Flusser et al.")).

Fingertips are detected from each blob's contour by searching for regions of high positive curvature. Curvature is estimated by looking at the angle between the vectors formed by a contour point $C_i$ and its k-neighbors $C_{i-k}$ and $C_{i+k}$ sampled with appropriate wrap-around. The algorithm of an embodiment uses high curvature at two scales and modulates the value of k depending on the depth of the blob so that k is roughly 30 mm for the first scale and approximately 50 mm from the query point for the second scale.

Figure 8:
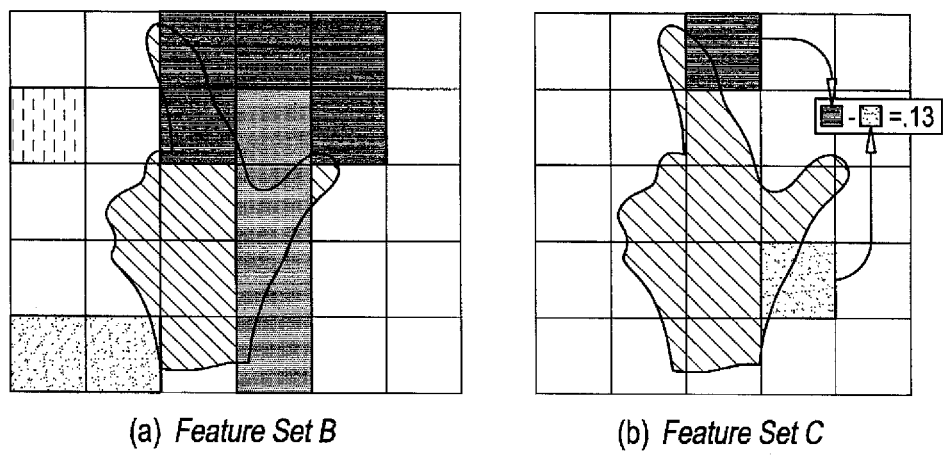
FIG. 8 shows features extracted for (a) Set B showing four rectangles and (b) Set C showing the difference in mean depth between one pair of grid cells, under an embodiment.

Feature Set B is made up of the number of pixels covered by every possible rectangle within the blob's bounding box normalized by its total size. To ensure scale-invariance, each blob image is subsampled down to a 5×5 grid meaning that there are 225 rectangles and thus 225 descriptors in Set B (see FIG. 8 which shows features extracted for (a) Set B showing four rectangles and (b) Set C showing the difference in mean depth between one pair of grid cells).

Feature Set C uses the same grid as Set B but instead of looking at coverage within different rectangles, it comprises the difference between the mean depth for each pair of individual cells. Since there are 25 cells on a 5×5 grid, there are 300 descriptors in Set C. Feature Set D combines all of the features from sets A, B, and C leading to 536 total features.

As described herein, the blob extraction algorithm attempts to estimate each blob's wrist location by search for extension pixels. If such a region is found, it is used to estimate orientation based on the vector connecting the center of the extension region to the centroid of the blob. By rotating the QVGA image patch by the inverse of this angle, many blobs can be transformed to have a canonical orientation before any descriptors are computed. This process improves classification accuracy by providing a level of rotation invariance. Orientation cannot be estimated for all blobs, however. For example if the arm is pointed directly at the camera then the blob will not have any extension pixels. In these cases, descriptors are computed on the untransformed blob image.

Figure 6A:
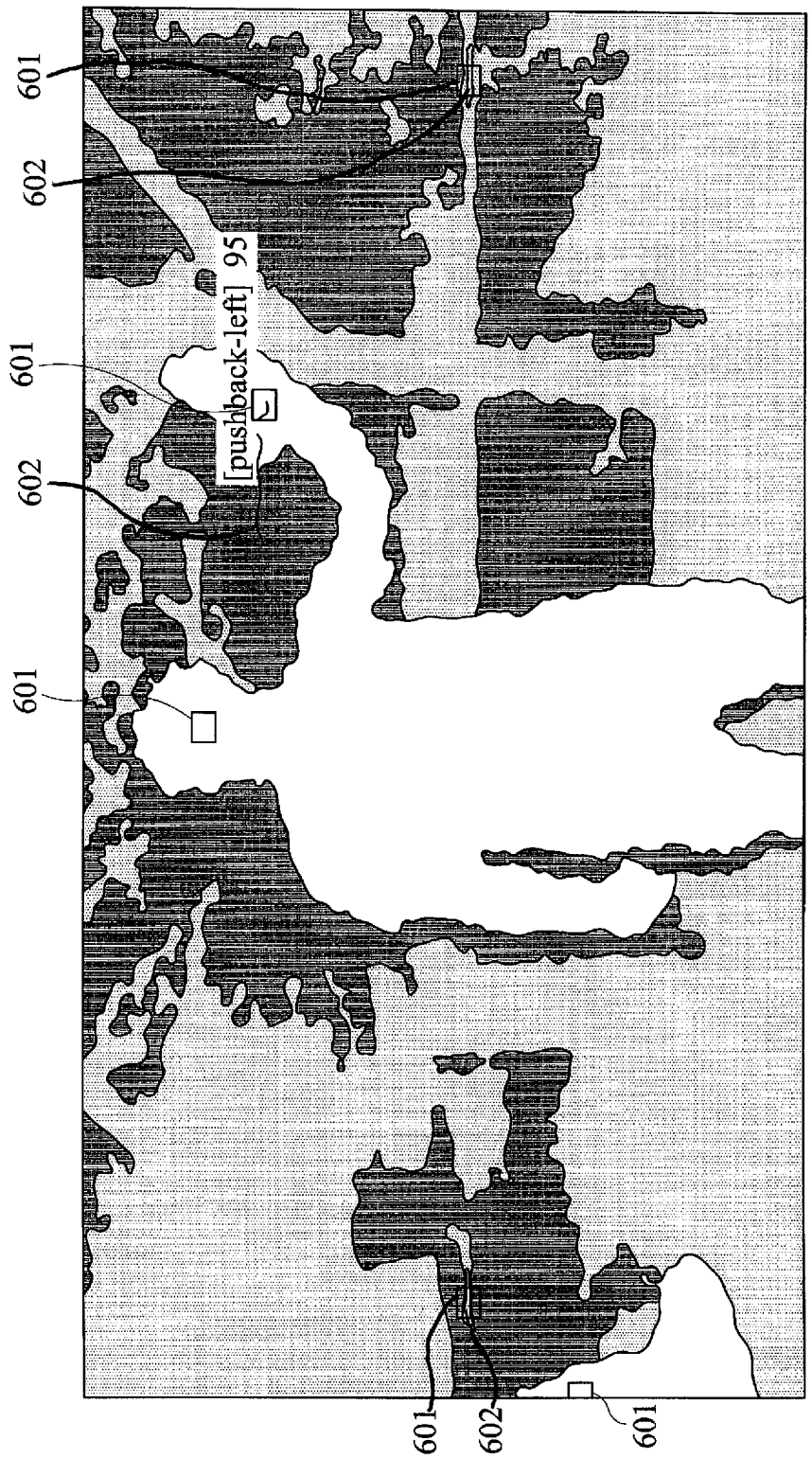
FIGS. 6A, 6B, and 6C (collectively FIG. 6) show sample frames showing pseudo-color depth images along with tracking results, track history, and recognition results along with a confidence value, under an embodiment.
Figure 6B:
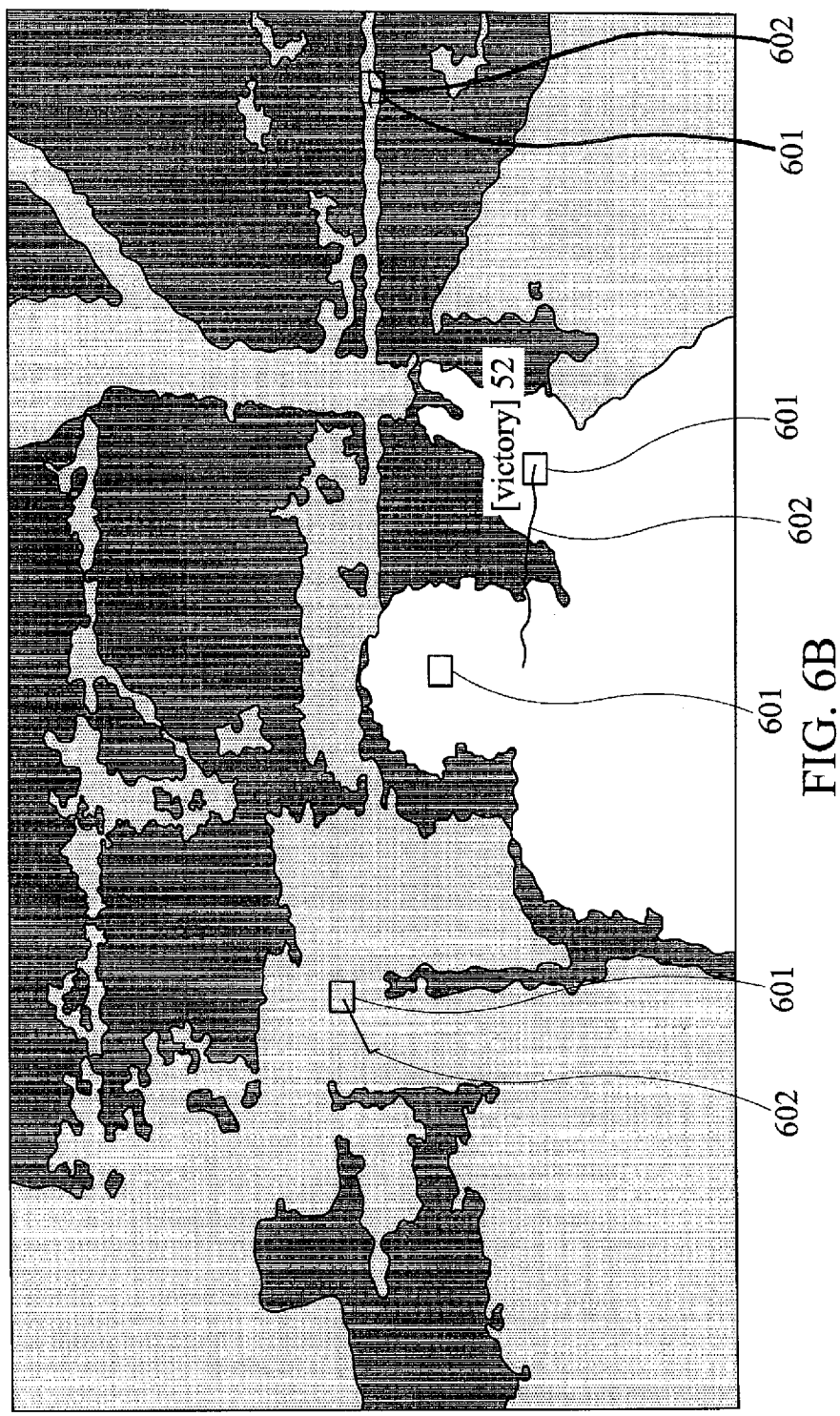
Figure 6C:
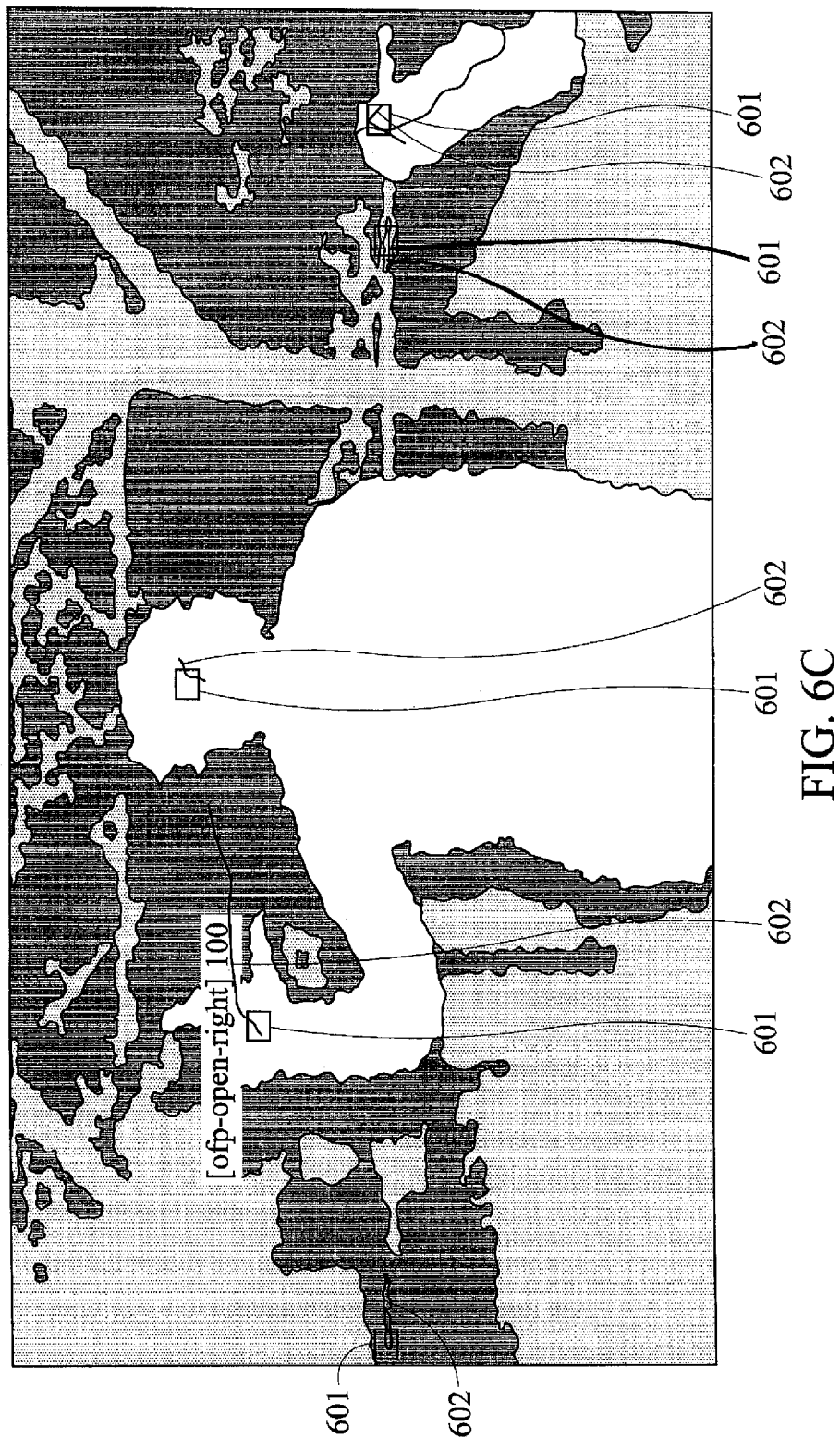

To evaluate the embodiments herein for real-time hand tracking and shape recognition, sample videos were recorded from 16 subjects (FIGS. 6A, 6B, and 6C (collectively FIG. 6)) show three sample frames showing pseudo-color depth images along with tracking results 601, track history 602, and recognition results (text labels) along with a confidence value). The videos were captured at a resolution of 640×480 at 30 Hz using a Microsoft Kinect, which estimates per-pixel depth using an approach based on structured light. Each subject contributed eight video segments corresponding to the eight hand shapes depicted in FIG. 4. The segmentation and tracking algorithm described herein ran on these videos with a modified post-process that saved the closest QVGA blob images to disk. Thus the training examples were automatically extracted from the videos using the same algorithm used in the online version. The only manual intervention was the removal of a small number of tracking errors that would otherwise contaminate the training set. For example, at the beginning of a few videos the system saved blobs corresponding to the user's head before locking on to their hand.

Some of the hand poses are specific to either the left or right hand (e.g., palm-open-left) whereas others are very similar for both hands (e.g., victory). Poses in the second set were included in the training data twice, once without any transformation and once after reflection around the vertical axis. Through qualitative experiments with the live, interactive system, it was found that the inclusion of the reflected examples led to a noticeable improvement in recognition performance.

The 16 subjects included four females and 12 males ranging from 25 to 40 years old and between 160 and 188 cm tall. Including the reflected versions, each person contributed between 1,898 and 9,625 examples across the eight hand poses leading to a total of 93,336 labeled examples. The initial evaluation used standard cross-validation to estimate generalization performance. Extremely low error rates were found, but the implied performance did not reliably predict the experience of new users with the live system who saw relatively poor classification rates.

An interpretation is that cross-validation was over-estimating performance because the random partitions included examples from each user in both the training and test sets. Since the training examples were extracted from videos, there is a high degree of temporal correlation and thus the test partitions were not indicative of generalization performance. In order to run more meaningful experiments with valid estimates of cross-user error, a switch was made to instead use a leave-one-user-out approach. Under this evaluation scheme, each combination of a model and feature set was trained on data from 15 subjects and evaluated the resulting classifier on the unseen 16th subject. This process was repeated 16 times with each iteration using data from a different subject as the test set.

Figure 9:
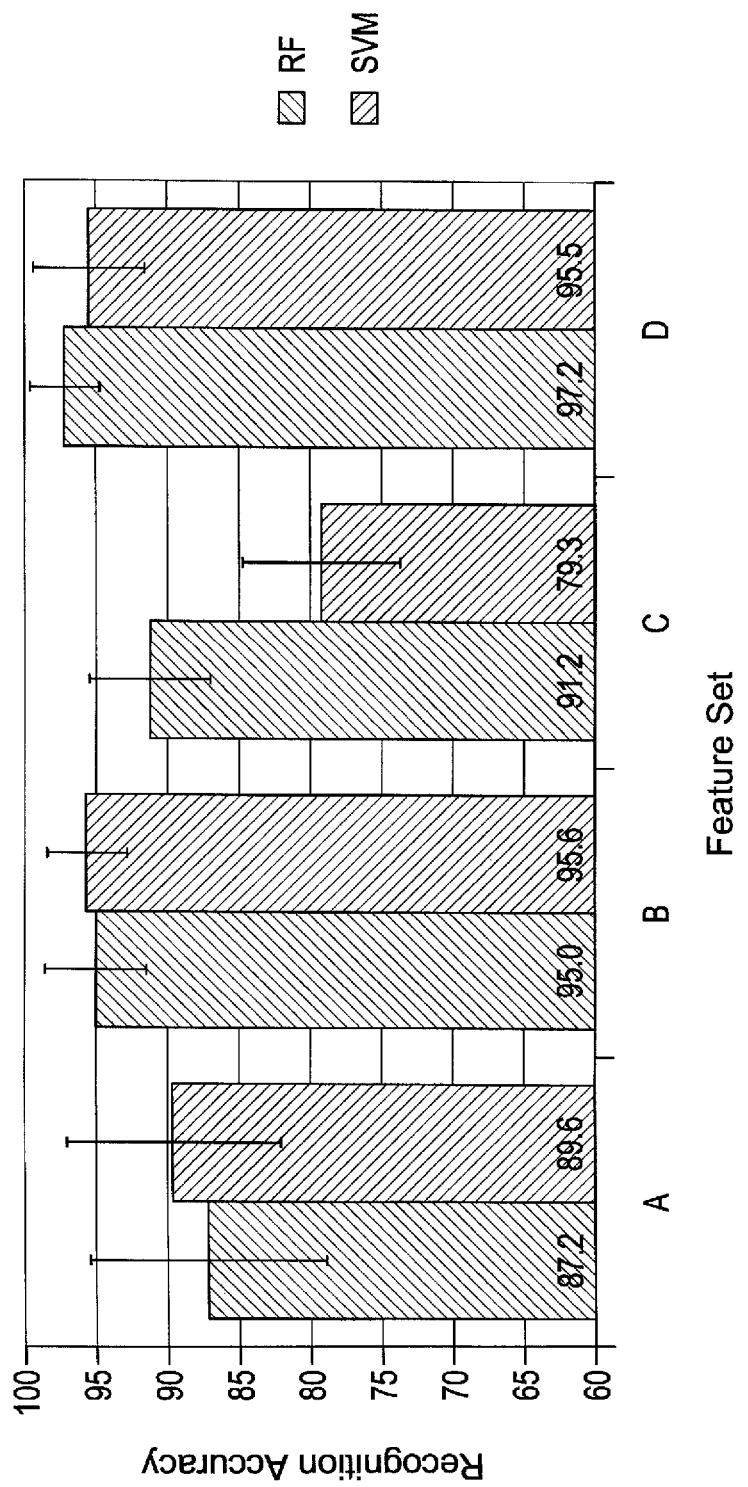
FIG. 9 is a plot of a comparison of hand shape recognition accuracy for randomized decision forest (RF) and support vector machine (SVM) classifiers over four feature sets, under an embodiment.

FIG. 9 plots a comparison of hand shape recognition accuracy for randomized decision forest (RF) and support vector machine (SVM) classifiers over four feature sets, where feature set A uses global statistics, feature set B uses normalized occupancy rates in different rectangles, feature set C uses depth differences between points, and feature set D combines sets A, B, and C. FIG. 9 therefore presents the average recognition rate for both the randomized decision forest (RF) and support vector machine (SVM) models. The SVM was trained with LIBSVM (e.g., C. C. Chang and C. J. Lin. LIBSVM: A library for support vector machines. ACM Transactions on Intelligent Systems and Technology, 2:27:1-27:27, 2011 ("Chang et al.")) and used a radial basis function kernel with parameters selected to maximize accuracy based on the results of a small search over a subset of the data. Both the RF and SVM were tested with the four feature sets described herein.

The best results were achieved with the RF model using Feature Set D (RF-D). This combination led to a mean cross-user accuracy rate of 97.2% with standard deviation of 2.42. The worst performance for any subject under RF-D was 92.8%, while six subjects saw greater than 99% accuracy rates. For comparison, the best performance using an SVM was with Feature Set B, which gave a mean accuracy rate of 95.6%, standard deviation of 2.73, and worst case of 89.0%.

Figure 10:
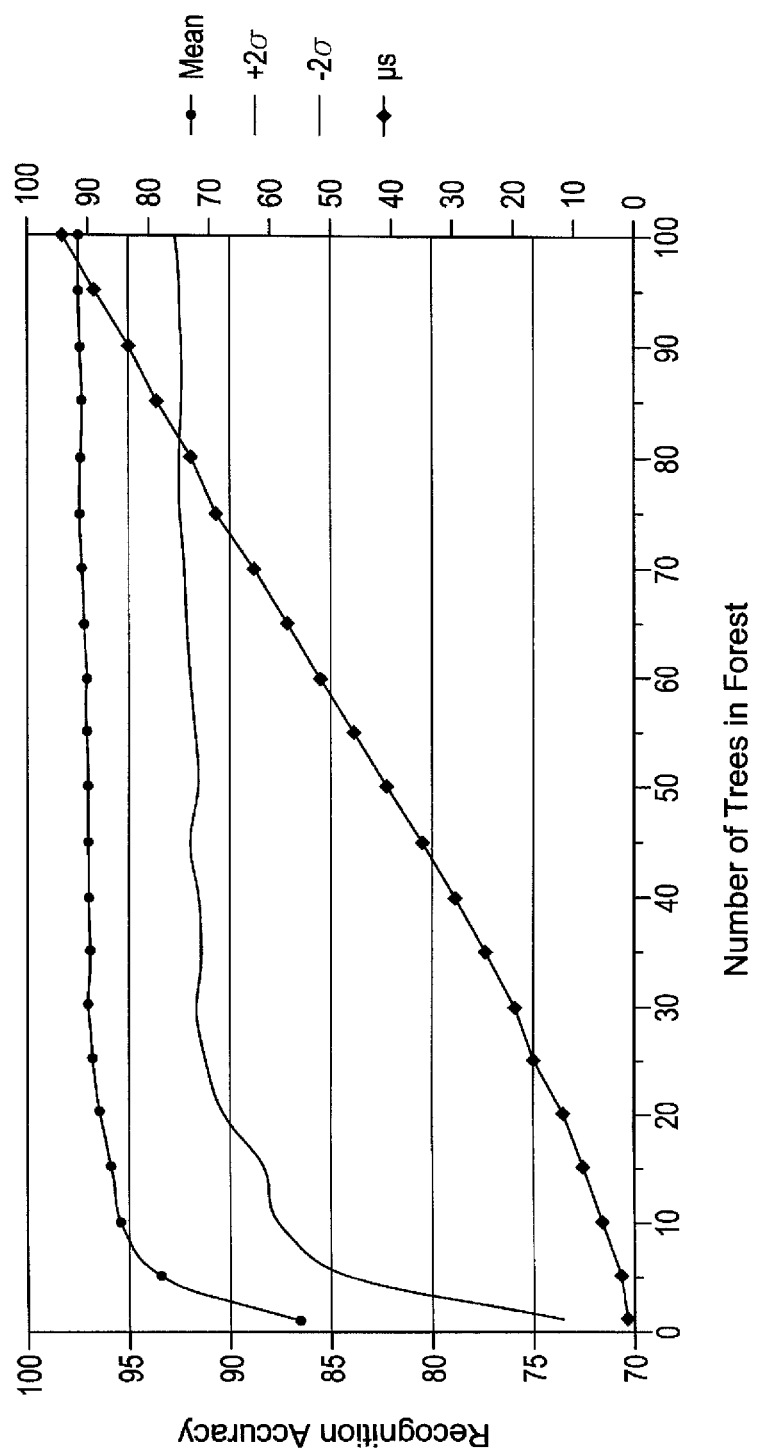
FIG. 10 is a plot of a comparison of hand shape recognition accuracy using different numbers of trees in the randomized decision forest, under an embodiment.

The RF results presented in FIG. 9 are based on forests with 100 trees. Each tree was learned with a maximum depth of 30 and no pruning. At each split node, the number of random features selected was set to the square root of the total number of descriptors. The ensemble classifier evaluates input data by merging the results across all of the random trees, and thus runtime is proportional to the number of trees. In a real-time system, especially when latency matters, a natural question is how classification accuracy changes as the number of trees in the forest is reduced. FIG. 10 presents a comparison of hand shape recognition accuracy using different numbers of trees in the randomized decision forest. The graph shows mean accuracy and $\pm 2\sigma$ lines depicting an approximate 95% confidence interval (blue circles, left axis) along with the mean time to classify a single example (green diamonds, right axis). FIG. 10 shows that for the hand shape classification problem, recognition accuracy is stable down to 30 trees where it only drops from 97.2% to 96.9%. Even with 20 trees, mean cross-user accuracy is only reduced to 96.4%, although below this point, performance begins to drop more dramatically. On the test machine used, an average classification speed seen was 93.3 μs per example with 100 trees but only 20.1 μs with 30 trees.

Although higher accuracy rates might be desirable, the interpretation of informal reports and observation of users working with the interactive system of an embodiment is that the current accuracy rate of 97.2% is sufficient for a positive user experience. An error rate of nearly 3% means that, on average, the system of an embodiment can misclassify the user's pose roughly once every 30 frames, though such a uniform distribution is not expected in practice since the errors are unlikely to be independent. It is thought that the errors will clump but also that many of them will be masked during real use due to several important factors. First, the live system can use temporal consistency to avoid random, short-duration errors. Second, cooperative users will adapt to the system if there is sufficient feedback and if only minor behavioral changes are needed. And third, the user interface can be configured to minimize the impact of easily confused hand poses.

A good example of adapting the interface arises with the pushback interaction based on the palm-open pose. A typical use of this interaction allows users to view more of their workspace by pushing the graphical representation farther back into the screen. Users may also be able to pan to different areas of the workspace or scroll through different object (e.g., movies, images, or merchandise). Scrolling leads to relatively long interactions and so users often relax their fingers so that palm-open begins to look like open-hand even though their intent did not changed. An embodiment implemented a simple perception tweak that prevents open-hand from disrupting the pushback interaction, even if open-hand leads to a distinct interaction in other situations. Essentially, both poses are allowed to continue the interaction even though only palm-open can initiate it. Furthermore, classification confidence is pooled between the two poses to account for the transitional poses between them.

Experimentation was also performed with physical changes to the interface and workspace. For example, a noticeable improvement was seen in user experience when the depth camera was mounted below the primary screen rather than above it. This difference likely stems from a tendency of users to relax and lower their hands rather than raise them due to basic body mechanics and gravity. With a bottom-mounted camera, a slightly angled or lowered hand provides a better view of the hand shape, whereas the view from a top-mounted camera will degrade. Similarly, advantage can be taken of users' natural tendency to stand farther from larger screens. Since the Kinect and many other depth cameras have a minimum sensing distance in the 30-80 cm range, users can be encouraged to maintain a functional distance with as few explicit reminders and warning messages as possible. The interface of an embodiment does provide a visual indication when an interaction approaches the near sensing plane or the edge of the camera's field of view, but implicit, natural cues like screen size are much preferred.

As described herein, other markerless research has focused on skeleton systems. As an SOE expression, the kiosk system described herein focuses on tracking and detection of finger and hands, in contrast to conventional markerless systems. The human hand represents an optimal input candidate in the SOE. Nimble and dexterous, its configurations make full use of the system's volume. Furthermore, a key value of the SOE is the user's conviction of causality. In contrast to conventional systems in which the gesture vocabulary is flat or static primarily, the kiosk system of an embodiment achieves spatial manipulation with dynamic and sequential gestures incorporating movement along the depth dimension.

Figure 11:
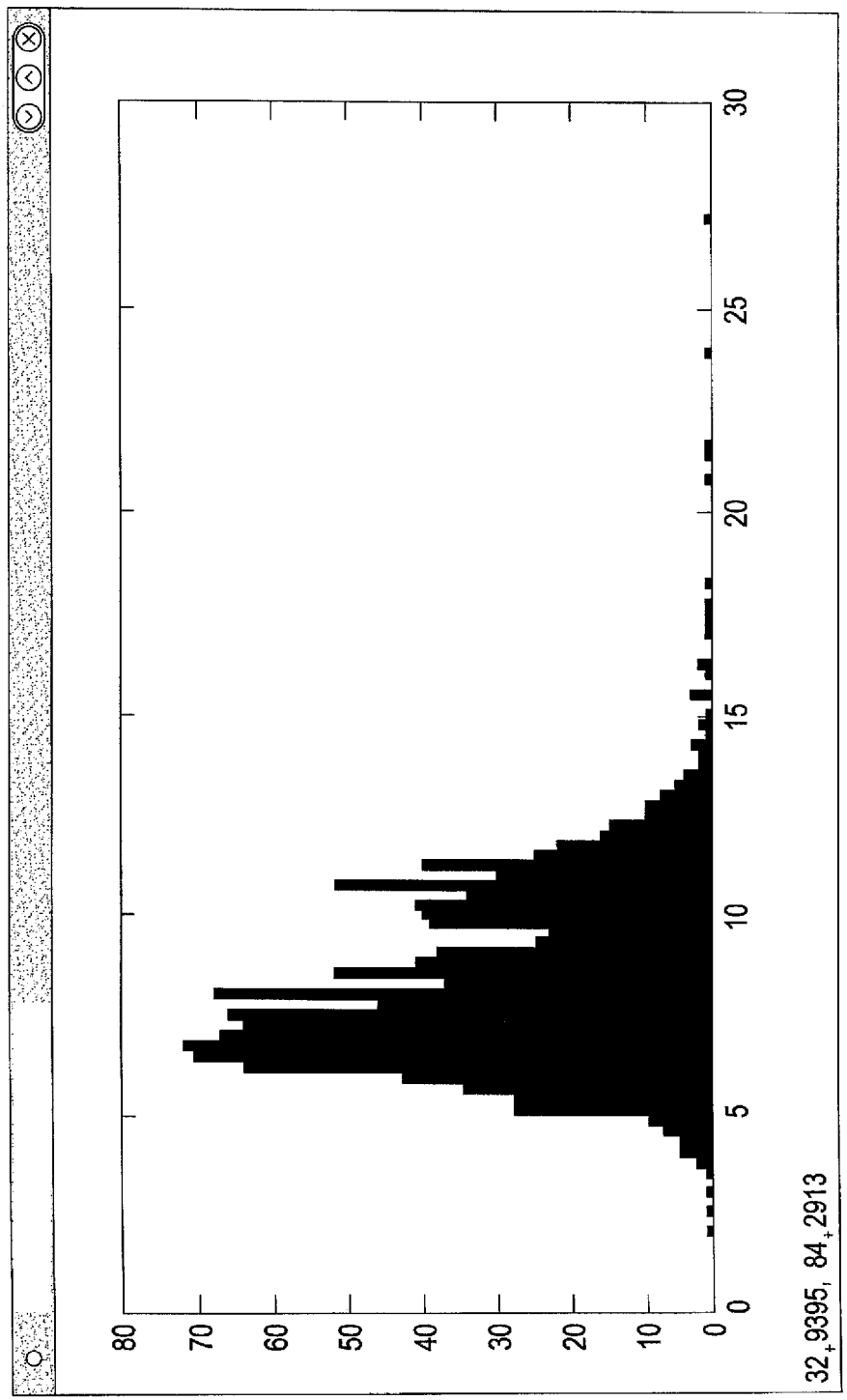
FIG. 11 is a histogram of the processing time results (latency) for each frame using the tracking and detecting component implemented in the kiosk system, under an embodiment.

In a characterization of latency, processing algorithms add approximately 10 milliseconds (ms) of latency with experiments showing a range from 2 to 30 ms (e.g., mean approximately 8.5 ms, standard deviation approximately 2.5 ms, minimum approximately 2 ms, maximum approximately 27 ms) depending on scene complexity. Experiments with embodiments reflected representative scenarios (e.g., one user, no clutter; one user with clutter; two users, no clutter). Results were estimated from 1,287 frames of data, in a typical hardware set-up (Quad Core Xeon E5506 running at 2.13 Ghz.). FIG. 11 is a histogram of the processing time results (latency) for each frame using the tracking and detecting component implemented in the kiosk system, under an embodiment. Results do not include hardware latency, defined as time between capture on the camera and transfer to the computer. Results also do not include acquisition latency, defined as time to acquire the depth data from the driver and into the first pool, because this latter value depends on driver implementation, and experiments were staged on the slower of the two drivers supported in kiosk development. The achieved latency of an embodiment for processing hand shapes is novel, and translates to interactive latencies of within one video frame in a typical interactive display system. This combination of accurate hand recognition and low-latency provides the seamless experience necessary for the SOE.

Gestures of a SOE in a Kiosk

The Related Applications describe an input gesture language, and define a gesture vocabulary string, referenced here, and illustrated in the figures herein. For example, FIG. 12 shows a diagram of poses in a gesture vocabulary of the SOE, under an embodiment. FIG. 13 shows a diagram of orientation in a gesture vocabulary of the SOE, under an embodiment. The markerless system recognizes at least the following gestures, but is not limited to these gestures:

1. GrabNav, Pan/Zoom: In a dynamic sequence, an open hand (VV-:x^) or open palm (||||-:x^) pushes along the x-axis and then transitions to a fist (^^^^>).

2. Palette: A one-finger-point-open pointing upward toward ceiling (ofp-open, ^^^|->:x^, gun, L) transitions to a thumb click.
3. Victory: A static gesture (^^V>:x^).
4. Goal-Post/Frame-It: Two ofp-open hands with the index fingers parallel point upward toward the ceiling (^^^|->:x^) and (^^^|-:x^).
5. Cinematographer: In a two-handed gesture, one ofp-open points with index finger pointing upward (^^^|-:x^). The second hand, also in ofp-open, is rotated, such that the index fingers are perpendicular to each other (^^^|-:x^).
6. Click left/right: In a sequential gesture, an ofp-open (^^^|-:x^) is completed by closing thumb (i.e., snapping thumb "closed" toward palm).
7. Home/End: In a two-handed sequential gesture, either opf-open (^^^|-:x^) or of p-closed (^^^|>:x^) points at fist (^^^^>x^) with both hands along a horizontal axis.
8. Pushback: U.S. patent application Ser. No. 12/553,845 delineates the pushback gesture. In the kiosk implementation, an open palm (|||-:x^) pushes into the z-axis and then traverses the horizontal axis.
9. Jog Dial: In this continuous, two-handed gesture, one hand is a base and the second a shuttle. The base hand is ofp-open pose (^^^|-:x^), the shuttle hand of p-closed pose (^^^|>:x^).

These gestures are implemented as described in detail herein and as shown in FIGS. 14-16. The Spatial Mapping application includes gestures 1 through 5 above, and FIG. 14 is an example of commands of the SOE in the kiosk system used by the spatial mapping application, under an embodiment. The Media Browser application includes gestures 4 through 9 above, and FIG. 15 is an example of commands of the SOE in the kiosk system used by the media browser application, under an embodiment. The Edge Application Suite, Upload/Pointer/Rotate, includes gestures 3 and 8 above, and FIG. 16 is an example of commands of the SOE in the kiosk system used by applications including upload, pointer, rotate, under an embodiment.

Applications

Applications are described herein as examples of applications that realize the SOE approach within the particularities of the markerless setting, but embodiments of the SOE kiosk are not limited to only these applications. Implementing the SOE in a markerless setting, these applications achieve novel work and reflect different capabilities and priorities. The applications of an embodiment include Spatial Mapping, Media Browser, Rotate, Upload, and Pointer. The Spatial Mapping application enables robust manipulation of complex data sets including integration of external data sets. The Media Browser application enables fluid, intuitive control of light footprint presentations. The Rotate, Upload and Pointer applications comprise an iOS suite of applications that enable seamless navigation between kiosk applications. To provide low barrier to entry in terms of installation, portability, and free agency, the kiosk works with reduced sensing resources. The Kinect sensor described in detail herein, for example, provides frame rate of 30 Hz; a system described in the Related Applications comprises in an embodiment gloves read by a Vicon camera, is characterized by 100 Hz. Within this constraint, the kiosk achieves low-latency and reliable pose recognition with its tracking and detecting system.

The SOE applications presented herein are examples only and do not limit the embodiments to particular applications, but instead serve to express the novelty of the SOE. Specifically, the SOE applications structure allocation of the spatial environment and render appropriately how the user fills the geometrical space of the SOE. Stated in terms of user value, the SOE applications then achieve a seamless, comfortable implementation, where the user fully makes use of the volume of the SOE. Similarly, the SOE applications structure visual elements and feedback on screen—certainly for appropriate visual presence and, more fundamentally for the SOE, for a spatial manipulation that connects user gesture and system response.

The SOE applications described herein sustain the user's experience of direct spatial manipulation; her engagement with three-dimensional space; and her conviction of a shared space with graphics. So that the user manipulates data as she and graphics were in the same space, the SOE applications deploy techniques described below including but not limited to broad gestures; speed threshold; dimension-constrained gestures; and falloff.

In regard to architecture, the SOE applications of an embodiment leverage fully the interoperability approach of the SOE. The SOE applications display data regardless of technology stack/operating system and, similarly, make use of low-level data from edge devices (e.g., iPhone, etc.), for example. To connect an edge device to a SOE, the user downloads the relevant g-speak application. The description herein describes functionality provided by the g-speak pointer application, which is a representative example, without limiting the g-speak applications for the iOS or any other client.

As described in the Related Applications, regardless of input device, the SOE accepts events deposited by proteins into its pool architecture. Similarly, the SOE kiosk integrates data from iOS devices using the proteins and pool architecture. The applications described herein leverage feedback built into the kiosk stack. When a user's gesture moves beyond the range of the sensor at the left and right edges, as well as top and bottom, the system can signal with a shaded bar along the relevant edge. For design reasons, the applications provide feedback for movement beyond the left, right, and top edge.

Applications—Spatial Mapping

The Spatial Mapping application (also referred to herein as "s-mapping" or "s-map") provides navigation and data visualization functions, allowing users to view, layer, and manipulate large data sets. Working within the SOE built on a real-world geometry, s-map brings to bear assets suited to spatial data rendering. With this SOE framework, spatial mapping provides three-dimensional manipulation of large datasets. As it synchronizes data expression with interface, the user's interaction of robust data becomes more intuitive and impactful. Such rendering pertains to a range of data sets as described herein. The descriptions herein invoke a geospatial construct (the scenario used in the application's development).

The Spatial Mapping application provides a combination of approaches to how the user interacts with spatial data. As a baseline, it emphasizes a particular perception of control. This application directly maps a user's movements to spatial movement: effected is a one-to-one correlation, a useful apprehension and control where stable manipulation is desired. Direct data location, a key value in any scenario, can be particularly useful for an operator, for example, of a geospatial map. At the same time, s-map makes available rapid navigation features, where a user quickly moves through large data sets. So that the effects of her input are multiplied, the Spatial Mapping application correlates input to acceleration through spatial data. In its provision of gestures for stable manipulation and rapid navigation, s-mapping takes into account not only user motion and comfort, but also function. As described herein, the Spatial Mapping application corresponds the gesture to the kind of work the user undertakes. The SOE therefore provides a seamless throughput from user to data. The user's manipulations are the data commands themselves.

Filtering

The Spatial Mapping application of an embodiment opens displaying its home image such as, in the example used throughout this description, a map of earth. When the user presents the input hand element, the tracking and detection pipeline provides gesture data. The application additionally filters this data to provide users with a high-degree of precision and expressiveness while making the various actions in the system easy and enjoyable to perform. Raw spatial movements are passed through a first-order, low-pass filter before being applied to any interface elements they are driving.

With interactions such as the map navigation gesture where the user's physical movements directly drive the logical movements of the digital map, unintended motion or noise can make getting to a desired location difficult or impossible. Sources of noise include the natural trembling of the user's hand, error due to low-fidelity tracking sensors, and artifacts of the algorithms used in tracking the user's motion. The filtering of an embodiment comprises adaptive filtering that counters these sources of noise, and this filtering is used in analog-type gestures including but not limited to the grab navigation, frame-it, and vertical menu gestures to name a few.

Figure 17A:
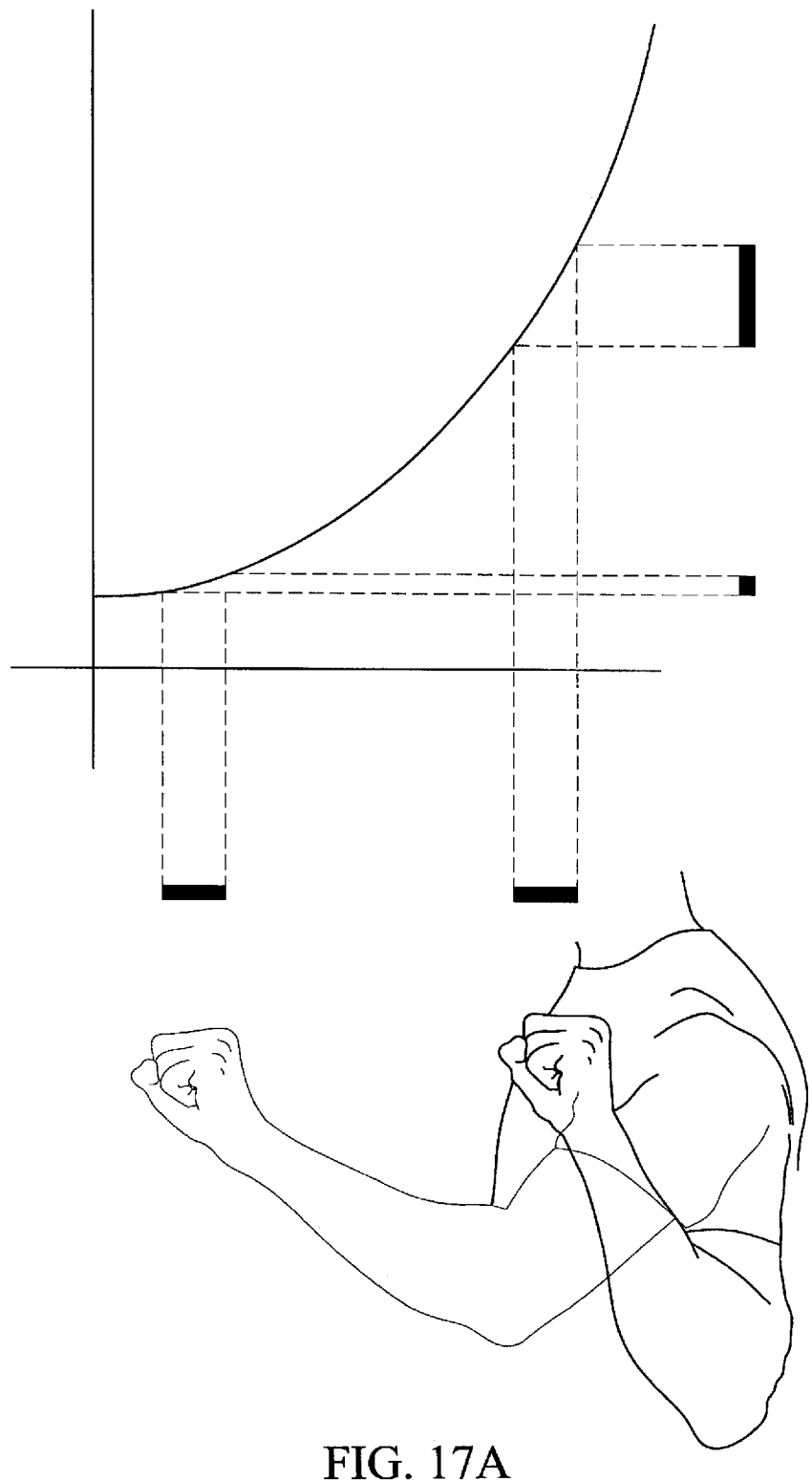
FIG. 17A shows the exponential mapping of hand displacement to zoom exacerbating the noise the further the user moves his hand.
Figure 17B:
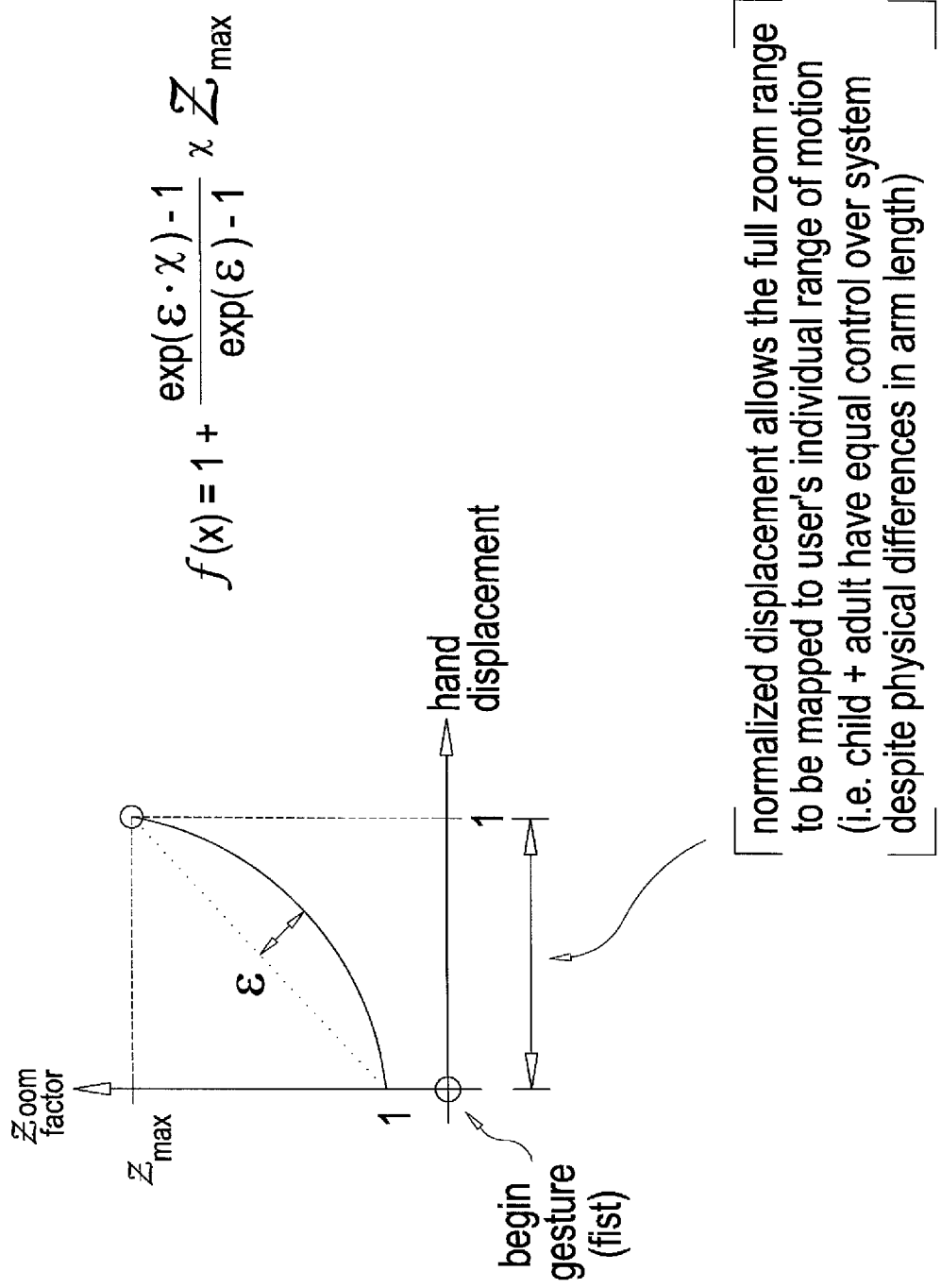
FIG. 17B shows a plot of zoom factor (Z) (Y-axis) versus hand displacement (X-axis) for positive hand displacements (pulling towards user) using a representative adaptive filter function, under an embodiment.

Considering the grab gesture as an example using the adaptive filtering of an embodiment, FIG. 17A shows the exponential mapping of hand displacement to zoom exacerbating the noise the further the user moves his hand. To counter this effect, the strength of the filter is changed adaptively (e.g., increased, decreased) in an embodiment in proportion to the user's displacement. FIG. 17B shows a plot of zoom factor (Z) (Y-axis) versus hand displacement (X-axis) for positive hand displacements (pulling towards user) using a representative adaptive filter function, under an embodiment. The representative adaptive filter function of an example is as follows, but is not so limited:

$$f(x) = 1 + \frac{\exp(\varepsilon \cdot x) - 1}{\exp(\varepsilon) - 1} \times Z\max$$

The variable $\varepsilon$ represents eccentricity of the filter function curve, the variable x represents range of motion, and Zmax represents the maximum zoom. The normalized displacement allows the full zoom range to be mapped to the user's individual range of motion so that regardless of user, each has equal control over the system despite physical differences in body parameters (e.g., arm length, etc.). For negative hand displacements (pushing away), the zoom factor (Z) is calculated as follows:

$$Z = \frac{1}{f(\|x\|)}$$

Figure 17G:
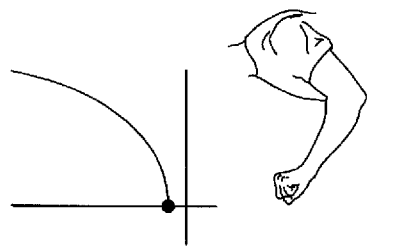
FIG. 17G shows that the direct mapping of hand displacement ensures that the user may always return to the position and zoom at which they started the gesture, under an embodiment.
Figure 17F:
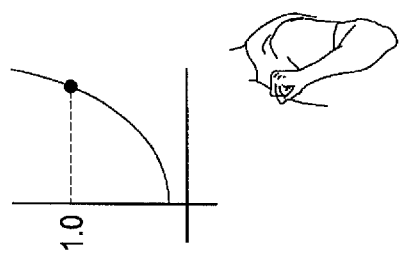
FIG. 17F shows that the exponential mapping of hand displacement to zoom level as the open palm drives the on-screen cursor to target an area on a map display allows the user to reach greater distances from a comfortable physical range of motion, under an embodiment.
Figure 17E:
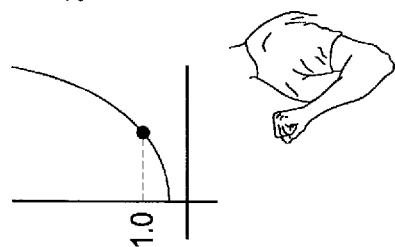
FIG. 17E shows the exponential mapping of hand displacement to zoom during panning and zooming (may occur simultaneously) of the map, under an embodiment.
Figure 17D:
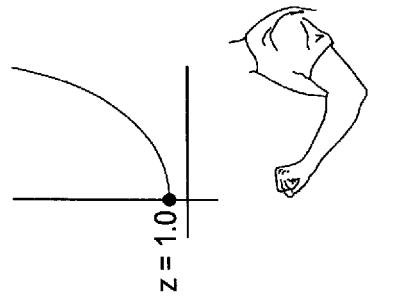
FIG. 17D shows the exponential mapping of hand displacement to zoom corresponding to clenching the hand into a fist to initialize the pan/zoom gesture, under an embodiment.
Figure 17C:
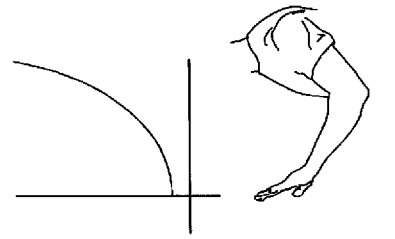
FIG. 17C shows the exponential mapping of hand displacement to zoom as the open palm drives the on-screen cursor to target an area on a map display, under an embodiment.

Considering the grab gesture example in detail further, FIG. 17C shows the exponential mapping of hand displacement to zoom as the open palm drives the on-screen cursor to target an area on a map display, under an embodiment. FIG. 17D shows the exponential mapping of hand displacement to zoom corresponding to clenching the hand into a fist to initialize the pan/zoom gesture, under an embodiment. The displacement is measured from the position where the fist first appears.

FIG. 17E shows the exponential mapping of hand displacement to zoom during panning and zooming (may occur simultaneously) of the map, under an embodiment. The initial hand displacement of an embodiment produces a relatively shallow amount of zoom, and this forgiveness zone allows for a more stable way to navigate the map at a fixed zoom level.

FIG. 17F shows that the exponential mapping of hand displacement to zoom level as the open palm drives the on-screen cursor to target an area on a map display allows the user to reach greater distances from a comfortable physical range of motion, under an embodiment. FIG. 17G shows that the direct mapping of hand displacement ensures that the user may always return to the position and zoom at which they started the gesture, under an embodiment.

Navigating Data Sets

The user can navigate this home image, and subsequent graphics, with a sequence of gestures two-fold in effect. This sequence is referred to with terms including grab/nav and pan/zoom. Throughout the Spatial Mapping application, the "V" gesture (^V>:x^) initiates a full reset. The map zooms back to its "home" display (the whole earth, for example, in the geospatial example begun above).

First, the user "grabs" the map. An open hand (VV-:x^) or open palm (||||-:x^) moves a cursor across the lateral plane to target an area. A transition to a fist (^^^>:x^):x^) then locks the cursor to the map. The user now can "drag" the map: the fist traversing the frontal plane, mapped to the image frame, moves the map. In a function analogous to pushback (comments below), pan/zoom correlates movement along the depth dimension to other logical transformations.

In the pan/zoom sequence, the user pushes the fist (^^^>: x^) toward the screen to effect a zoom: the visible area of the map is scaled as to display a larger data region. Throughout the gesture motion, data frame display is tied to zoom level. Data frames that most clearly depict the current zoom level stream in and replace those too large or too small as the map zooms. Similarly, as the user pulls the fist away from the screen, the map scales towards the area indicated, displaying a progressively smaller data region. Additionally, the user may pan the visible area of the map by displacing the fist within the frontal plane, parallel with the map. Lateral fist movements pan the map to the right and left while vertical fist movements pan up and down.

The sensing environment of the kiosk, limited, would misinterpret this transition from open hand to fist. As the user rapidly traverses the lateral plane, the sensor interprets the palm, blurred, as a fist. To secure functionality, the Spatial Mapping application incorporates a speed threshold into the gesture. Rapid movement does not trigger detection of fist, and its subsequent feedback. Instead, the embodiment uses intentional engagement: if a certain speed is exceeded in lateral movement, the application interprets the movement as continued. It does not jump into "fist" recognition.

The fist gesture is a broad gesture that works within the precision field of the sensor. At the same time it provides a visceral design effect sought with grab: the user "secures" or "locks" her dataspace location. Even with a sensor such as the Kinect described herein, which does not allow pixel-accurate detection, the user is able to select map areas accurately.

As a tool for manipulating large data sets, s-mapping juxtaposes this lock step with nimble movement. Working with extensive data sets, the user needs to push through broad ranges. The user with a map of the earth might jump from the earth level, to country, state, and city.

Direct mapping would compromise this sweep through data. Therefore, the gesture space of the system of an embodiment limits the range of the gesture. Furthermore, the tolerances of the user limit the gesture range of an embodiment. Typically, a user moves her hands comfortably only within a limited distance. Imprecision encroaches upon her gesture, destabilizing input.

Conforming gestures to usability parameters is a key principle and design execution of the SOE. For robust navigation through large data sets, the application uses "falloff," a technique of non-linear mapping of input to output. It provides an acceleration component as the user zooms in or out of a data range.

The system measures displacement from the position where the fist first appears. Since it remembers the origin of z-displacement, the user can return to the position where she started her zoom gesture. While the application supports simultaneous pan and zoom, initial hand offset yields a limited effect. This buffer zone affords stable navigation at a fixed zoom level.

The application exponentially maps z-displacement of the hand to zoom as described in detail herein. In its effect, the mapping application recalls a key functionality of pushback, whereby the user quickly procures context within a large dataset. The Related Applications contextualize and describe the gesture in detail. Pushback relates movement along the depth dimension to translation of the dataspace along the horizontal axis. The user's movement along the depth dimension triggers a z-axis displacement of the data frame and its lateral neighbors (i.e., frames to the left and right). In s-map, the map remains spatially fixed and the user's movement is mapped to the logical zoom level, or "altitude factor." As stated, panning and zooming can occur simultaneously in the application. Components such as "dead space" and glyph feedback, which do not figure in s-map, are included in the media browser application described later in this document.

Layering Data Sets

The second provision of s-map is its visualization of multiple data sets. With the proliferation of complex, large data sets, the navigation of individual ranges is followed effectively by the question of their juxtaposition. The application combines access to data sets with their fluid layering.

The Related Applications describe how the SOE is a new programming environment. A departure from traditional interoperation computing, it integrates manifold and fundamentally different processes. It supports exchange despite differences in data type and structure, as well as programming language. In the mapping application, the user then can access and control data layers from disparate sources and systems. For example, a geospatial iteration may access a city-state map from a commercial mapping vendor; personnel data from its own legacy system; and warehouse assets from a vendor's system. Data can be stored locally or accessed over the network.

The application incorporates a "lens" feature to access this data. Other terms for this feature include but are not limited to "fluoroscope." When laid onto a section of map, the lens renders data for that area. In a manner suggested by "lens" label, the area selected is seen through the data lens. The data sets appear on the left side of the display in a panel (referred to as "pane," "palette," "drawer," and other similar terms). S-map's design emphasizes the background map: the visual drawer only is present when in use. This is in keeping with the SOE emphasis on graphics as manipulation, and its demotion of persistent menus that might interfere with a clean spatial experience.

The gesture that pulls up this side menu mirrors workflow. First, an ofp-open (^^^|-x^) triggers a vertical menu to display on the left side of the screen. The call is ambidextrous, summoned by the left or right hand. Then, vertical motion moves within selections, and finally, a click with the thumb or ratchet-rotation of the wrist fixes the selection. When moving up or down for selection, only the y-axis contributes to interface response. Incidental x- and z-components of the hand motion make no contribution. This lock to a single axis is an important usability technique employed often in SOE applications.

This design reflects two principles of the system of an embodiment. Aligning with workflow, the sequence is designed to correlate with how the user would use the gestures. Second, their one-dimensional aspect allows extended use of that dimension. While the SOE opens up three dimensions, it strategically uses the components of its geometry to frame efficient input and create a positive user experience.

During this selection process, as throughout the program, the user can reset in two ways. As noted herein, the "V" gesture (^^V>:x^) yields a full reset. The map zooms back to its "home" display (the whole earth, for example, in the geospatial example begun above. Any persistent lenses fade away and delete themselves. The fist gesture accomplishes a "local" reset: if the user has zoomed in on an area, the map retains this telescoped expression. However, by forming the fist gesture, the lens will fade away and delete itself upon escaping the gesture. In both the "V" and fist reset, the system retains memory of the lens selection, even as physical instances of the lens dissipate. The user framing a lens after reset creates an instance of the lens type last selected.

The fist gesture, as described herein, is the "grab" function in navigation. With this gesture recall, the interface maintains a clean and simple feel. However, the application again designs around user tolerances. When forming a fist, one user practice not only curls the finger closed, but then also drops the hand. Since the application deploys direct mapping, and the fist gesture "grabs" the map, the dropping hand yanks the map to the floor. Again, a speed threshold is incorporated into the gesture: a user exceeding a certain speed does not trigger grab. Instead the system interprets the fist as reset.

Layering Data Sets—Overlaying

After selecting a data set, the user creates and uses a layer in three ways: (1) moving it throughout the map; (2) resizing the lens; and (3) expanding it to redefine the map. To engage these actions, the user instantiates a lens. Again following workflow, the gesture after selection builds on its configuration of either left or right opf-open hand. To render the selected lens, the second hand is raised in "frame-it" (appearing like a goal-post). It uses two ofp-open hands with the index fingers parallel and pointing toward the ceiling (^^^|-:x^) and (^^^|:x^). The gesture segues cleanly from the palette menu gesture, easily extending it.

This data lens now can be repositioned. As described herein, as the user moves it, the lens projects data for the area over which it is layered. The user may grow or shrink the size of the lens, by spreading her hands along the lateral base of her "frame" (i.e., along the x-axis, parallel to the imaginary line through her outstretched thumbs). The default fluoroscope expression is a square, whose area grows or shrinks with resizing. The user can change the aspect ratio by rotating "frame-it" ninety degrees. In function, this "cinematographer" gesture (^^^|-:x^) and (^^^|-:x-) is equivalent to "frame-it." Feature-wise, though, the user can set aspect ratio by resizing the rectangle formed by his hands.

This "frame-it"—as a follow-up gesture—is more advanced, and is leveraged fully by a "pro" user, who optimizes for both feature and presentation. The SOE gestural interface is a collection of presentation assets: gestures are dramatic when performed sharply and expressing full-volume when possible. The user can swing this cinematographer frame in a big arc, and so emphasize the lens overlay. The rich gestural interface also lets the user fine-tune his gestures as he learns the tolerances of the system. With these sharp or dramatic gestures, he can optimize his input.

The fluoroscope can engage the screen and express its data in a number of ways. Three example methods by which the fluoroscope engages the screen and so expresses its data are as follows:

(1) For the data layer to subsume the entire screen (shifting into "fullscreen" mode), the user spreads his hands. Beyond a threshold distance, the lens shifts into fullscreen mode where it subsumes the entire screen.

(2) To fix the data layer to the map, the user pushes the lens "onto" the map; i.e. pushing toward the screen. The user, for example, can assign the lens to a particular area, such as a geographic region. As the user moves the map around, the lens remains fixed to its assigned area.

(3) To fix the data layer to the display, the user pulls the lens toward him. The lens, affixed to the display, floats above the background image. As the user moves the map around, the map reveals data when moved underneath the lens.

This pushing or pulling snaps the lens onto, respectively, the map or the display. The sequence from resizing to snapping is an illustration of how the application uses the building blocks of the SOE geometry. As with lens selection (when gestures expressed/constrained within one dimension called up the palette), lens resizing also occurs within one plane, i.e. frontal. The z-axis then is used for the snap motion.

These gestures for data layering are designed around user practice for two reasons. First, when a user "frames" a lens, the embodiment considers how quickly the user wants to slide his hands together/apart. The comfortable and expressive range of motion is measured in terms of actual space. To reflect how far the body wants to move, the application can be adjusted or adapted per user, per gesture. In addition to enhancing the user experience, this approach is output agnostic. The size of the screen does not affect the gesture expression. This decoupling, where the user's movement is constant, facilitates porting the application.

As the user selects and implements lenses, overlay can incorporate transparency. Topology data is an example of a lens that makes use of transparency. The system composites lenses on top of the base map and other layers, incorporating transparency as appropriate.

Edge Devices

As an SOE agent, s-map allows the option of incorporating low-level data from edge devices (as defined in "Context" above). This includes but is not limited to "pointer" functionality, where the application makes use of inertial data from a device. The device, an example of which is an iPhone, comprises the downloaded g-speak pointer application for the iOS client. Pointing the phone at the screen, and holding a finger down, any user within the SOE area can track a cursor across the display.

Applications—Media Browser

The media browser is built to provide easy use and access. It reflects the organic adaptability of the SOE: while its engineering enables dynamic control of complex data sets, its approach naturally distills in simpler expressions. A complete SOE development space, the kiosk supports applications suitable for a range of users and operational needs. Here, the browser allows intuitive navigation of a media deck.

On initiation, the application opens to a home slide with a gripe "mirror" in the upper right hand area. A system feedback element, this mirror is a small window that indicates detected input. The information is anonymized, the system collecting, displaying, or storing no information particular to users outside of depth. The mirror displays both depth information and gripe string. The feedback includes two benefits. First, the application indicates engagement, signaling to the user the system is active. Second, the minor works as an on-the-spot debugging mechanism for input. With the input feedback, the user can see what the system interprets her as doing.

Non-Scrolling Gestures/Function

At its start no one gesture is required to initiate action under an embodiment. The user can provide input as necessary to his function, which include but are not limited to the following: previous/next, where the user "clicks" left or right to proceed through the slides one-by-one; home/end, where the user jumps to first or last slide; overview, where the user can view all slides in a grid display and select; velocity-based scrolling, where the user rapidly scrolls through a lateral slide display.

The inventory herein lists gestures by name and correlating function, and then describes the system input. To proceed through the slides one-by-one, the user "clicks" left/right for previous/next.

The gesture is a two-part sequence. The first component is ofp-open (^^^|-:x^); its orientation indicates direction: pointing up with the left hand moves left, to the previous slide; pointing up with the right hand moves right, to the next slide; pointing left or right (with the index finger parallel to the ground) moves in the direction of the point.

The application provides visual feedback on the user's input. This first part of the gesture prompts oscillating arrows. Appearing on the relevant side of the screen, the arrows indicate the direction the browser will move, as defined by the user's orientation input. The second part of the gesture "clicks" in that direction by closing the thumb (^^^||:x^ or ^^^|>:x^). Visual feedback is also provided including, but not limited to, arrows that darken slightly to indicate possible movement, and a red block that flashes to indicate user is at either end of slide deck.

To jump to the first or last slide, the user points to his fist, both hands along a horizontal axis. The system accepts pointing either open (^^^|-:x^) or closed (^^^|>:x^). The pointing direction determines direction. Pointing left (toward left fist) jumps to first slide. Pointing right (toward right fist) jumps to last slide.

With the overview function, the browser displays all slides in a grid. To enter overview, the user points both hands in the cinematographer gesture. Either cinematographer or goal post exits the user from overview, back to the last displayed slide. Pushback lets the user scroll across slides and select a different one to display in the sequential horizontal deck.

Scrolling Gestures/Functions—Pushback

The scrolling function of the browser enables a user to rapidly and precisely traverse the horizontal collection of slides that is the deck. Two gestures—pushback and jog-dial—enact capabilities analogous to scrolling. Their descriptions herein include comments on how the media browser application allocates space, on behalf of the user, and correlates user movement to graphics display.

The Related Applications describe how pushback structures user interaction with quantized—"detented"—spaces. By associating parameter-control with the spatial dimension, it lets the user acquire rapid context. Specifically, in the media browser, the slides comprising elements of the data set are coplanar and arranged laterally. The data space includes a single natural detent in the z-direction and a plurality of x-detents. Pushback links these two.

The pushback schema divides the depth dimension into two zones. The "dead" zone is the half space farther from the display; the "active" zone is that closer to the display. Along the horizontal plane, to the left and right of the visible slide are its coplanar data frames, regularly spaced.

The user, when on a slide, forms an open palm (||||-:x^). The system, registering that point in space, displays a reticle comprising two concentric glyphs. The smaller inner glyph indicates the hand is in the dead zone. The glyph grows and shrinks as the user moves his hand forward and back in the dead zone. In order to expand available depth between his palm and screen, the user can pull his hand back. The inner glyph reduces in size until a certain threshold is reached, and the ring display stabilizes.

At any time the user can push into the z-axis. When he crosses the threshold separating dead zone from active, the system triggers pushback. The system measures the z-value of the hand relative to this threshold, and generates a correspondence between it and a scaling function described herein. The resulting value generates a z-axis displacement of the data frame and its lateral neighbors. The image frame recedes from the display, as if pushed back into perspective. In the media browser the effect is the individual slide receding into the sequence of slides. As the user pushes and pulls, the z-displacement is updated continuously. The effect is the slide set, laterally arranged, receding and verging in direct response to his movements.

The glyph also changes when the user crosses the pushback threshold. From scaling-based display, it shifts into a rotational mode: the hand's physical z-axis offset from the threshold is mapped into a positive (in-plane) angular offset. As before, the outer glyph is static; the inner glyph rotates clockwise and anti clockwise, relating to movement toward and away from the screen.

The user entering the active zone triggers activity in a second dimension. X-axis movement is correlated similarly to x-displacement of the horizontal frame set. A positive value corresponds to the data set elements—i.e., slides—sliding left and right, as manipulated by the user's hand. In the media browser, as the user scrolls right, the glyph rotates clockwise. Scrolling left, the glyph rotates counterclockwise. The user exits pushback and selects a slide by breaking the open-palm pose. The user positions the glyph to select a slide: the slide closest to glyph center fills the display. The frame collect springs back to its original z-detent, where one slide is coplanar with the display.

Figure 18A:
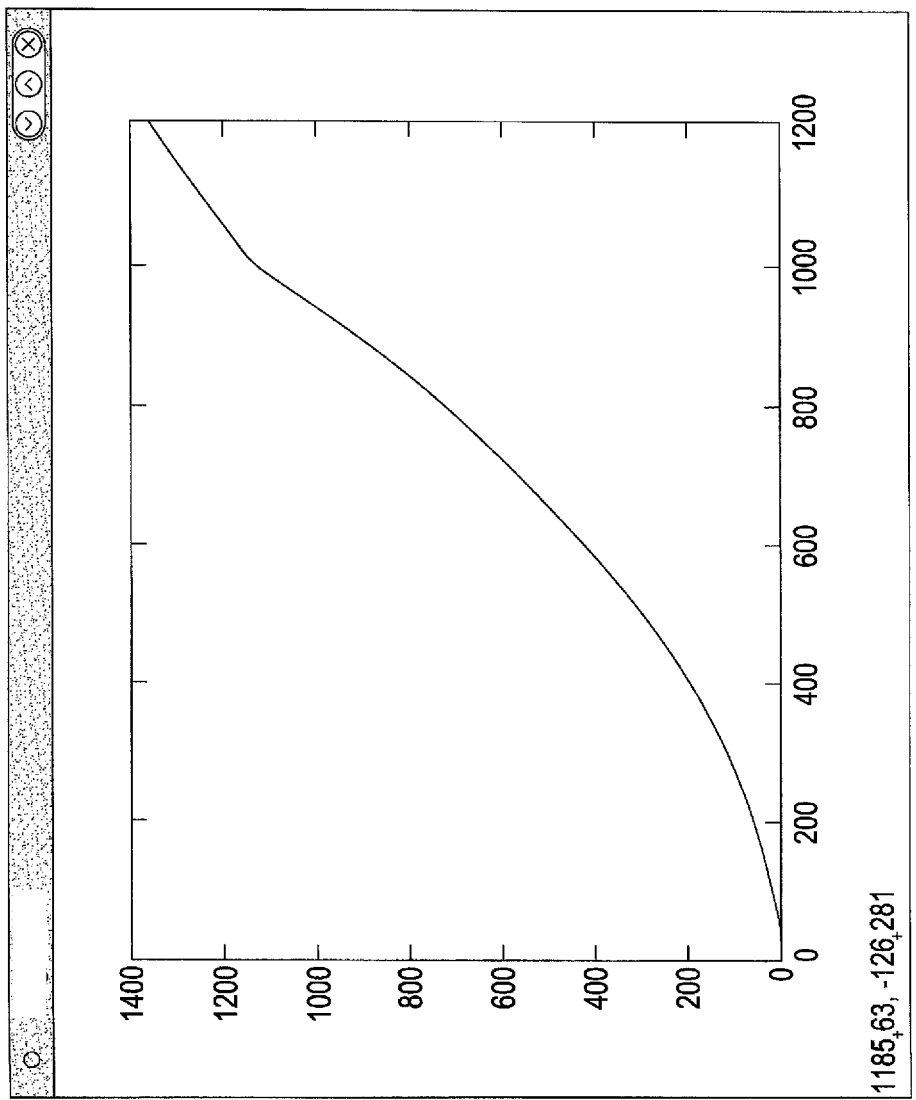
FIG. 18A is a shove filter response for a first range [0 . . . 1200] (full), under an embodiment.
Figure 18B:
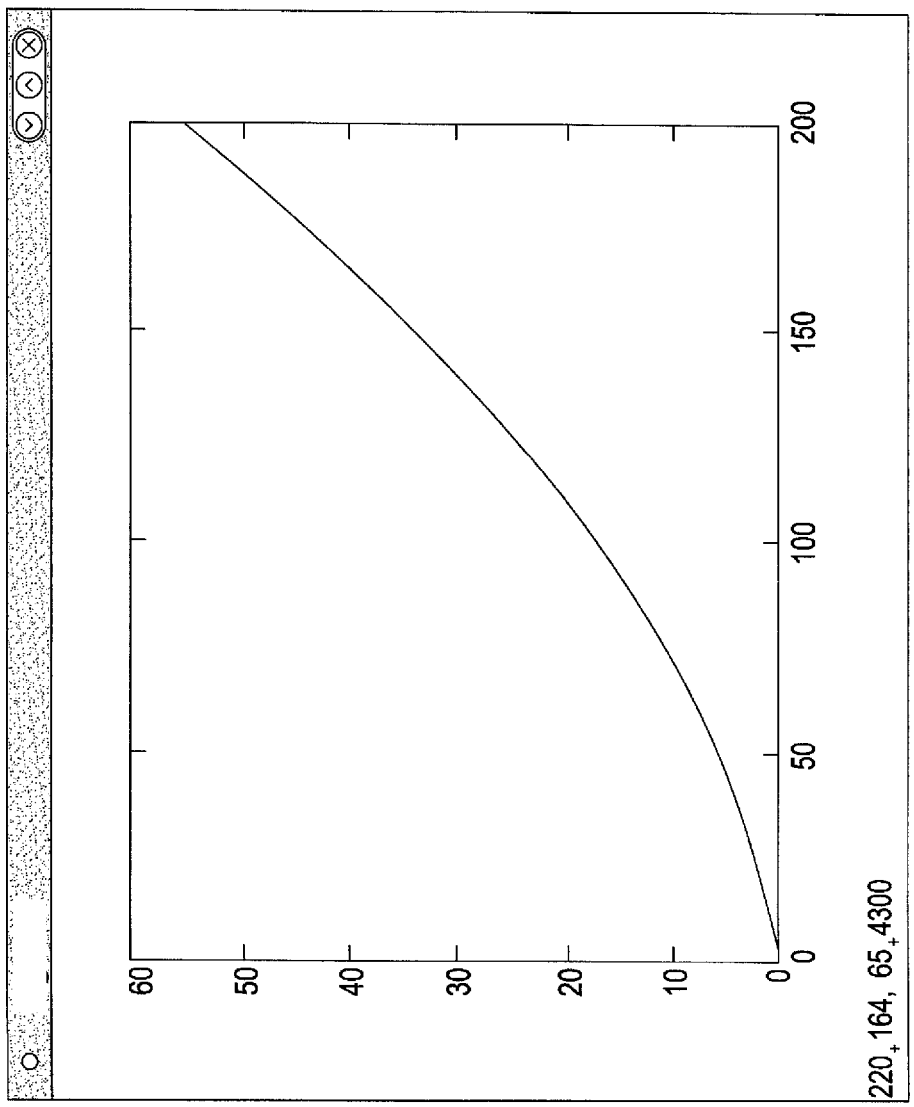
FIG. 18B is a shove filter response for a second range [0 . . . 200] (zoom), under an embodiment.

Expressions of the system's pushback filter are depicted in FIGS. 18A and 18B. In summary, the application calculates hand position displacement, which is separated into components corresponding to the z-axis and x-axis. Offsets are scaled by a coefficient dependent on the magnitude of the offset. The coefficient calculation is tied to the velocity of the motions along the lateral and depth planes. Effectively, small velocities are damped; fast motions are magnified.

Pushback in the media browser includes two components. The description above noted that before the user pushes into the z-axis, he pulls back, which provides a greater range of z-axis push. As the user pulls back, the system calculates the displacement and applies this value to the z-position that is crossed to engage pushback. In contrast to a situation where the user only engages pushback near the end of the gesture, this linkage provides an efficient gesture motion.

Additionally, pushback in the media browser application is adapted for sensor z-jitter. As the palm pushes deeper/farther along the z-axis, the sensor encounters jitter. To enable stable input within the sensor tolerance, the system constrains the ultimate depth reach of the gesture. Example expressions of pushback gesture filters implemented in the media browser application of the kiosk are as follows, but the embodiment is not so limited:

```
double Pushback::ShimmyFilterCoef(double mag, double dt)
{
  const double vel = mag / dt; // mm/s
  const double kmin = 0.1;
  const double kmax = 1.1;
  const double vmin = 40.0;
  const double vmax = 1800.0;
  double k = kmin;
  if (vel > vmax) k = kmax;
  else if (vel > vmin) k = kmin + (vel-vmin)/(vmax-vmin)*(kmax-kmin);
  return k;
}
double Pushback::ShoveFilterCoef(double mag, double dt)
{
  const double vel = mag / dt; // mm/s
  const double kmin = 0.1;
  const double kmax =1.1;
  const double vmin = 40.0;
  const double vmax = 1000.0;
  double k = kmin;
  if (vel > vmax) k = kmax;
  else if (vel > vmin) k = kmin + (vel-vmin)/(vmax-vmin)*(kmax-kmin);
  return k;
}
pos_prv = pos_cur; // new time step so cur becomes prev
const Vect dv = e->CurLoc( ) - pos_prv;
double deltaShove = dv.Dot(shove_direc);
deltaShove *= ShoveFilterCoef(fabs(deltaShove), dt);
double deltaShimmy = dv.Dot(shimmy_direc);
deltaShimmy *= ShimmyFilterCoef(fabs(deltaShimmy), dt);
pos_cur = pos_prv + shove_direc*deltaShove + shimmy_direc*deltaShimmy;
```

"Shimmy" covers lateral motion and "Shove" covers forward/backward motion. Both filters are the same in an embodiment, except the shove filter vmax is smaller, which results in faster movement sooner.

Generally, an embodiment computes the position offset (dv) for the current frame and then separates it into the shove component (deltaShove) and shimmy (deltaShimmy) component, which corresponds to the z-axis and x-axis. An embodiment scales the partial offsets by a coefficient that depends on the magnitude of the offset, and reconstructs the combined offset.

If the coefficient is 1.0, no scaling is applied and the physical offset is exactly mapped to the virtual offset. A value in (0.0, 1.0) damps the motion and a value above 1.0 magnifies the motion.

The coefficient calculation is a linear interpolation between a minimum and maximum coefficient (0.1 and 1.1 here) based on where the velocity sits in another range (40 to 1800 for shimmy and 40 to 1000 for shove). In practice, this means that for small velocities, significant damping is applied, but fast motions are magnified by to some degree (e.g., 10%, etc.).

FIG. 18A is a shove filter response for a first range [0 . . . 1200] (full), under an embodiment. FIG. 18B is a shove filter response for a second range [0 . . . 200] (zoom), under an embodiment.

Scrolling Input/Functions—Jog-Dial

Jog-dial provides an additional scrolling interaction. This two-handed gesture has a base and shuttle, which provides velocity control. The base hand is ofp-open (^^^|-:x^), and the shuttle hand is of p-closed (^^^|>:x^). When the system detects the gesture, it estimates their distance over a period of 200 ms, and then maps changes in distance to the horizontal velocity of the slide deck. The gesture relies on a "dead" zone, or central detent, as described in the Related Applications.

At any distance exceeding that minimal one, the application maps that value to a velocity. A parameter is calculated that is proportional to screen size, so that the application considers the size of screen assets. This enables, for example, rapid movement on a larger screen where display elements are larger. The speed is modulated by frame rate and blended into a calculated velocity of the shuttle hand.

Example expressions of jog-dial implemented in an embodiment of the kiosk are as follows, but the embodiment is not so limited:

```
double MediaGallery::ShuttleSpeed(double vel) const
{
  double sign = 1.0;
  if (vel < 0.0){
    sign = -1.0;
    vel = -vel;
  }
  const double a = 200.0;
  const double b = 1.0;
  const double c = 0.05;
  const double d = 140.0;
  const double alpha = std::min(1.0, vel/a);
  return sign * -shuttleScale * (vel*alpha + (1.0-alpha)*a /
    (b+exp(-c*(vel-d))));
}
const double detent = 15.0;
double dx = dist - baseShuttleDist;
if (fabs(dx) < detent) return OB_OK; // central detent
if (dx < 0) dx += detent;
else dx -= detent;
// map hand offset into slide offset
double dt = now - timeLastShuttle;
timeLastShuttle = now;
double offset = ShuttleSpeed(dx) * dt;
shuttleVelocity = offset*0.6 + shuttleVelocity*0.4;
```

Generally, the SOE kiosk of an embodiment estimates hand distance (baseShuttleDist) when the interaction starts and then any changes within approximately +/−15 mm have no effect (the central detent), but the embodiment is not so limited. If a user moves more than +/−15 mm, the distance (minus the detent size) is mapped to a velocity by the ShuttleSpeed function. The shuttleScale parameter is proportional to the screen size as it feels natural to move faster on a larger screen since the assets themselves are physically larger. Further, the speed is modulated by the frame rate (dt) and blended into the global shuttleVelocity.

Figure 19A:
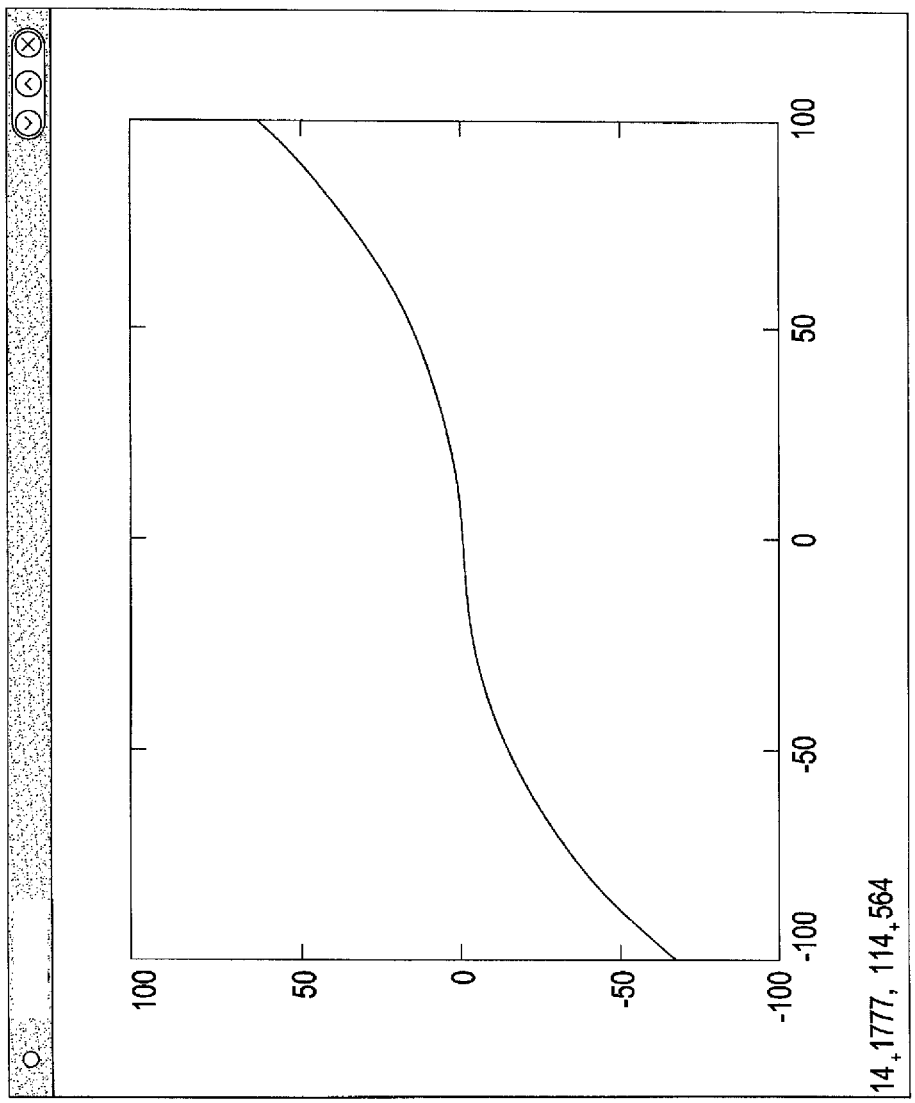
FIG. 19A is a first plot representing velocity relative to hand distance, under an embodiment.
Figure 19B:
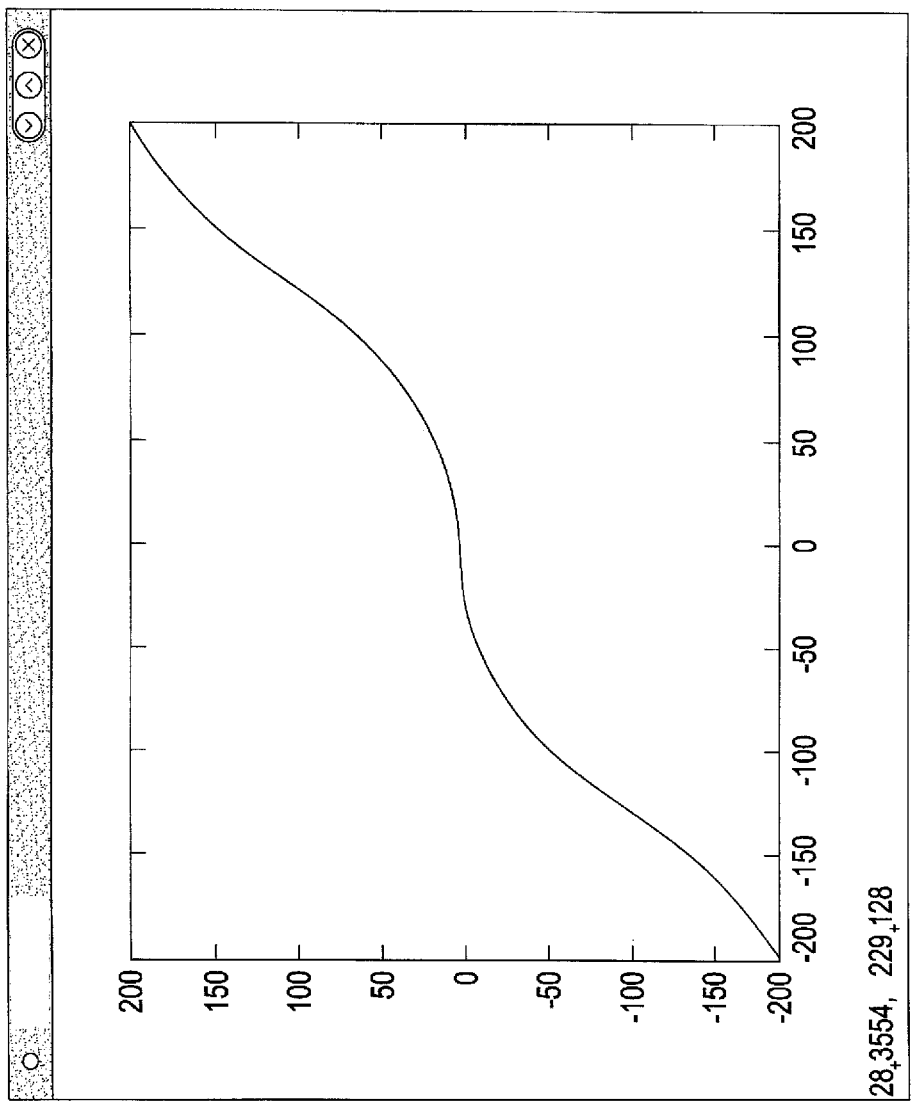
FIG. 19B is a second plot representing velocity relative to hand distance, under an embodiment.
Figure 19C:
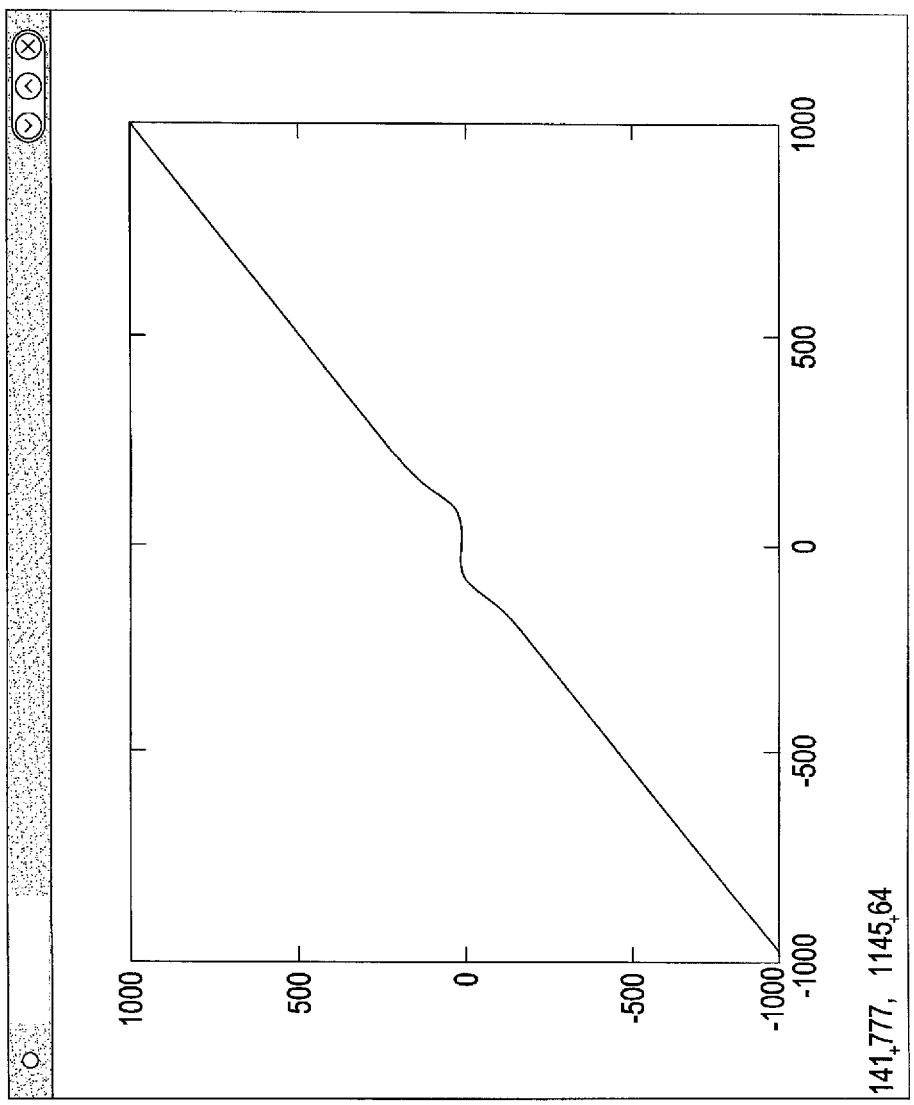
FIG. 19C is a third plot representing velocity relative to hand distance, under an embodiment.

The achieved effect is essentially linear, as depicted in FIGS. 19A-19C, which show how the function behaves over different scales and hand distances. FIG. 19A is a first plot representing velocity relative to hand distance, under an embodiment. FIG. 19B is a second plot representing velocity relative to hand distance, under an embodiment. FIG. 19C is a third plot representing velocity relative to hand distance, under an embodiment. The embodiment is generally linear, meaning distance is directly mapped to velocity, but for small distances the system can move even more slowly to allow more control because the combination of features disclosed herein allows both precise, slow movement and rapid movement.

iPhone Input

As an SOE agent, the media browser accepts and responds to low-level data available from different devices. For example, the browser accepts inertial data from a device such as an iPhone, which has downloaded the g-speak application corresponding to the iOS client. The architecture can designate inputs native to the device for actions: in this instance, a double-tap engages a "pointer" functionality provided by the g-speak pointer application. Maintaining pressure, the user can track a cursor across a slide.

Video

The application supports video integration and control. Ofp-open (^^^|-:x^) plays video; closing to a fist (^^^^>:x^) pauses. Again, the system also accepts data like that from an iPhone, enabled with the g-speak pointer application: double tap pauses playback; slide triggers scrubbing.

Applications—Edge Suite—Upload, Pointer, Rotate

A suite of applications highlights the data/device integration capabilities of the kiosk. As noted earlier, the SOE is an ecumenical space. The plasma architecture described in the Related Applications sets up an agnostic pool for data, which seeks and accepts the range of events. While it is designed and executed to provide robust spatial functionalities, it also makes use of low-level data available from devices connected to the SOE.

The upload, pointer, and rotate applications collect and respond to low-level data provided by a device fundamentally not native to the environment; i.e., a device not built specifically for the SOE. The edge device downloads the g-speak application to connect to the desired SOE. Described herein is functionality provided by the g-speak pointer application, which is representative without limiting the g-speak applications for the iOS or any other client.

In these applications an iOS device with the relevant g-speak application can join the SOE at any time, and the data from this "external" agent is accepted. Its data is low-level, constrained in definition. However, the SOE does not reject it based on its foreign sourcing, profile, or quality. Data is exchanged via the proteins, pools, and slawx architecture described in the Related Applications and herein. The edge device can deposit proteins into a pool structure, and withdraw proteins from the pool structure; the system looks for such events regardless of source.

This low-level data of an embodiment takes two forms. First, the iOS generates inertial data, providing relative location. The SOE also makes use of "touchpad" mode, which directly maps commands to screen. Persistent is the robust spatial manipulation of an SOE; at the same time, gesture use is strategic. Applications like upload/rotate/pointer are developed specifically for general public settings, where an unrestricted audience interacts with the kiosk. The suite, then, chooses to use a select number of gestures, optimizing for ease-of-use and presentation.

Displayed on the system's home screen are elements including the g-speak pointer app icon, kiosk application icons, the tutorial, and the sensor mirror. The g-speak pointer app icon provides download information. To navigate across applications, the user input is pushback. As her open hand pushes toward the screen (into the z-axis), the menu recedes into a display she rapidly tracks across (in this example, along the horizontal axis). To select an application, the user pauses on the desired application. The "V" gesture (^V>:x^) prompts selection. Pushback (||||-:x^) is used across the applications as an exit gesture. Once the user's open palm crosses a distance threshold, the screen darkens and assets fade. Breaking the gesture, as with a closed fist, triggers exit.

The tutorial and sensor mirror are displayed in a panel near the bottom of every screen, including this system start screen. Installations are described herein where this example suite is used in unrestricted settings, where the general public interacts with the kiosk. The tutorial and sensor mirror are elements beneficial in such settings.

The tutorial is a set of animations illustrating commands to navigate across applications (and, within a selection, to use the application). The sensor mirror, as noted earlier, can act effectively as a debugging mechanism, its feedback helping the user adjust input. Like the tutorial, it also is useful for public access. With a traditional computer, the system is dormant until the user activates engagement. With the kiosk, the sensor mirror is a flag, indicating to the user the system has been engaged. As stated herein, the information is anonymized and restricted to depth.

Applications—Edge Suite—Upload

Upload is an application for uploading and viewing images; its design reflects its general public use in settings such as retail and marketing but is not so limited. It deploys familiar iOS client actions. A vertical swipe switches an iPhone to its camera screen, and the user takes a photo. The phone prompts the user to discard or save the image. If a user opts to save, the file is uploaded to the system, which displays the image in its collection. The system accepts the default image area set by the device, and this value can be modified by the application caretaker.

The default display is a "random" one, scattering images across the screen. A highlighted circle appears behind an image just uploaded. A double-tap selects the photo. To drag, a user maintains pressure. This finger engagement with the screen issues inertial data accepted by the kiosk.

Moving an image to front and center enlarges the image, in this example. Additional display patterns include a grid; a whorl whose spiral can fill the screen; and radial halfcircle. A horizontal swipe cycles through these displays (e.g., with left as previous, and right as next). A double-tap rotates an image rotated by a display like whorl or radial.

The user also can provide touchpad input. This is a direct mapping to the screen (instead of inertial). Double-tap again selects an image, and maintained pressure moves an element. A swipe is understood as this same pressure; a two-finger swipe, then, cycles through displays.

Applications—Edge Suite—Pointer

Pointer is an experiential, collaborative application that engages up to two users. A swipe starts the application. Displayed is a luminescent, chain-link graphic for each user. The chains are bent at its links, coiled and angled in random manner. A double-tap is selection input; maintaining pressure lets the user then move the chain, as if conducting it.

This engagement is designed around the system environment, which presents latency and precision challenges. First, the user connects typically over a wireless network that can suffer in latency. Also, user motion may be erratic, with input also constrained by the data provided by the device. Instead of structuring selection around specific points, the application reads selection as occurring with a general area. As the user swirls the chain across the screen, the visual feedback is fluid. It emphasizes this aesthetic, masking latency.

The pointer application also provides touchpad interaction. Double-tap selects an area, and maintained pressure moves the pointer. The application accepts and displays input for up to two devices.

Applications—Edge Suite—Rotate

A multi-player, collaborative pong game, rotate layers gesture motion on top of accelerometer data. In this example, a ratchet motion controls the paddle of a pong game.

Displayed at start, the field of play is a half-circle (180 degrees). A ball bouncing off the baseline of the half-circle ricochets off at some random angle toward an arc that is a paddle controlled by a user. Each participant is assigned an arc, its color correlated to its player. The player moves the paddle/arc to strike the ball back to the baseline. Each time the ball bounces again off the center, its speed increases. Each time it strikes the paddle, the paddle gets smaller. (This decrease is some set small percentage, whereby the paddle does not disappear.) The game, then, increases in difficulty.

A double-tap joins the game. The user, maintaining pressure with a digit, rotates the paddle with a ratchet motion. Radial input from the device is passed only when the finger is on the screen. The paddle stops in space, the ball still bouncing, if the user releases pressure. The paddle pulses after approximately ten seconds of no input. The ball freezes with game state freeze when the user moves to exit the game.

The ratchet motion maps to visuals on screen as designed to account for user practice. While the wrist provides a full 180 degrees of rotation, a user starting from a "central" position typically rotates 30 degrees in either direction. The application accounting for this behavior relatively maps this motion to paddle control and feedback. To reach the maximum distance in either direction, for example, the user is not required to fill 180 degrees.

One design and velocity aspect extends the user engagement: paddle size does not always map directly to hit area. To nurture user success and repeat experiences, the application in certain conditions extends paddle function outside of its visually perceived area. When a certain speed threshold is surpassed, the user moving the paddle rapidly, the hit area increases. Akin to "angels in the outfield" effect, this extension does not display, to avoid user perception of a bug. Because the paddle is indeed moving rapidly, the user's apprehension typically does not keep pace. Per its application relevance for commercial settings, the caretaker defines values, modified with text input, that control the game, including arc width, arc distance from center, and ball velocity.

Example Use Cases

The kiosk system brings to bear benefits of flexibility because its installation is lighter, as well as portable. The following example use cases highlight this operational maneuverability, and invoke functionalities and gestures described in the baseline applications described above. These examples represent, without limiting, the domains that benefit from the SOE kiosk.

In a military setting, a briefing is convened to review a recent incident in a field of operations. In an operations room with a kiosk, on officer uses the mapping application to convey a range of information, touching on political boundaries; terrain; personnel assets; population density; satellite imagery. Asset location and satellite imagery are linked in from sources appropriate to the briefing nature. Data sources can be stored locally or accessed via the network. The officer selects political boundaries data (palette gesture, ^^^|-:x^) and snaps it to the entire display area (cinematographer, ^^^|-:x^), before zooming in on a recent flare-up in activity (pan/zoom, VV-:x^ to ^^^^>:x^). He pulls up the fluoroscope menu on the left side of the display (palette, ^^^|-:x^). He selects (closing his thumb) and snaps (cinematographer, ^^^|-:x^) onto the area first a population density lens, then a terrain lens. After discussing these area contours, he pushes in (zoom, ^^^^>:x^) to note asset location at time of activity. Further zooming in (^^^^>:x^) he expands the region displays and reviews asset location at present-day.

Under an example use case involving emergency preparation and response, as a hurricane approaches the coastline, government agencies and officials issue advisories and move quickly to share information with the public. The governor's office convenes a press conference with participation of his emergency response czar, weather service director, law enforcement figures, public utility officials, as well as officials from his administration. With a kiosk sourcing data from these different agencies, the press conference uses maps displaying wind data, precipitation data, population density, evacuation routes, and emergency shelters.

An extraction engineer and a geologist review an extraction area in an additional use case, using a geospatial map with lenses for topology; soil samples; subsurface topology; original subsoil resources; rendered subsoil resources. The customized application includes recognition of edge devices. From a global map of operations, the extraction engineer pushes into a detailed display of the extraction area (pan/zoom, VV-:x^ ^^^^>:x^). From the lens menu she selects rendered subsoil resources (palette, ^^^|-:x^); accessed from an external database over the network, it shows the current expression of subsoil resources. She creates an original subsoil resource lens (frame-it, ^^^|-"x^), which displays extraction at some point in the past. The geologist uses his iPhone, with the downloaded g-speak pointer application, to point to a particular swath: as they discuss recent geological occurrences, the geologist frames a subsurface topology lens (frame-it, ^^^|-"x^), and pulling it toward himself, fixes the fluoroscope to the display where an underground river approaches the extraction area. The geologist then grabs the map (fist, ^^^^>:x^): he moves it to slide adjoining regions underneath the subsurface lens, the two colleagues discussing recent activity.

Under yet another example use case, joint reconstruction procedure makes use of two kiosks in a sterile operating room. At one screen a nurse controls a version of the media browser. Its default overview display shows patient data such as heart rate, blood pressure, temperature, urine, and bloodwork. A second kiosk runs a spatial mapping implementation, which lets the surgeons zoom in on assets including x-rays, CT scans, MRIs, and the customized procedure software used by the hospital. As the team works, displayed is an image from procedure software, which provides positioning information. A surgeon on the procedure team holds up his fist and pulls it toward himself, to view the thighbone in more detail. (^^^^>:x^). When an unexpected level of resistance is encountered in relevant cartilage, a surgeon on the team pulls up the lens panel and selects MRI images of the area (palette, ^^^|-:x^).

At a financial services seminar a speaker starts a deck presentation. He clicks right to move from one slide to the next (click R, ^^^|-:x^). When an audience member raises a question about building a complete portfolio, he navigates quickly back to a previous slide using two hands (jog dial, ^^^|-:x^), which shows the components of a portfolio in a piechart. He gets out his phone, with the downloaded g-speak pointer application, and holds down a finger to use the device as pointer, discussing the different investment types. He dwells at length on a certain mutual fund. With his free hand, he again navigates quickly to a different slide, this time with pushback (IIII-:x^). An audience member asks about structuring college funds for his grandchildren. The speaker jog dials to a slide with video (^^^|-:x^ and ^^^|>:x^) where a customer talks about the same goal, and how the speaker's firm helped him balance his different financial interests.

A luxury brand installs a kiosk in key locations of a major department store, including New York, London, Paris, and Tokyo. Its hardware installation reflects brand values, including high-end customization of the casing for the screen. It runs a media browser, showcasing the brand's "lookbook" and advertising campaign. With the simple "L"-like gesture, (^^^|-:x^ to (^^^||:x^ or ^^^|>:x^) users can click through slides with different looks. Video slides throughout play "behind-the-scenes" footage of photo shoots, where the stylist and photographer discuss the shoot. A central video plays footage from the most recent fashion show in Paris.

A beverage company installs a kiosk endcap in grocery stores to introduce a new energy drink. Experiential, the kiosk lets users play a version of the collaborative Rotate game. A teen passing by with his mom stops to watch the center graphic on the home screen: the main game graphic, the paddle rotates back and forth to block a bouncing ball. The teen follows the simple instructions at the top of the screen to download the free g-speak pointer application onto his phone. A tutorial graphic at the bottom of the screen shows a hand, finger pressed to phone, rotating the wrist. The teen follows the gesture and plays a few rounds while his parent shops. When his parent returns, the two follow another tutorial on the bottom of the screen, which shows pushback (||||-:x^). This gesture pulls up slides with nutrition information; one slide includes an extended endorsement from a regional celebrity athlete.

Spatial Operating Environment (SOE)

Figure 20:
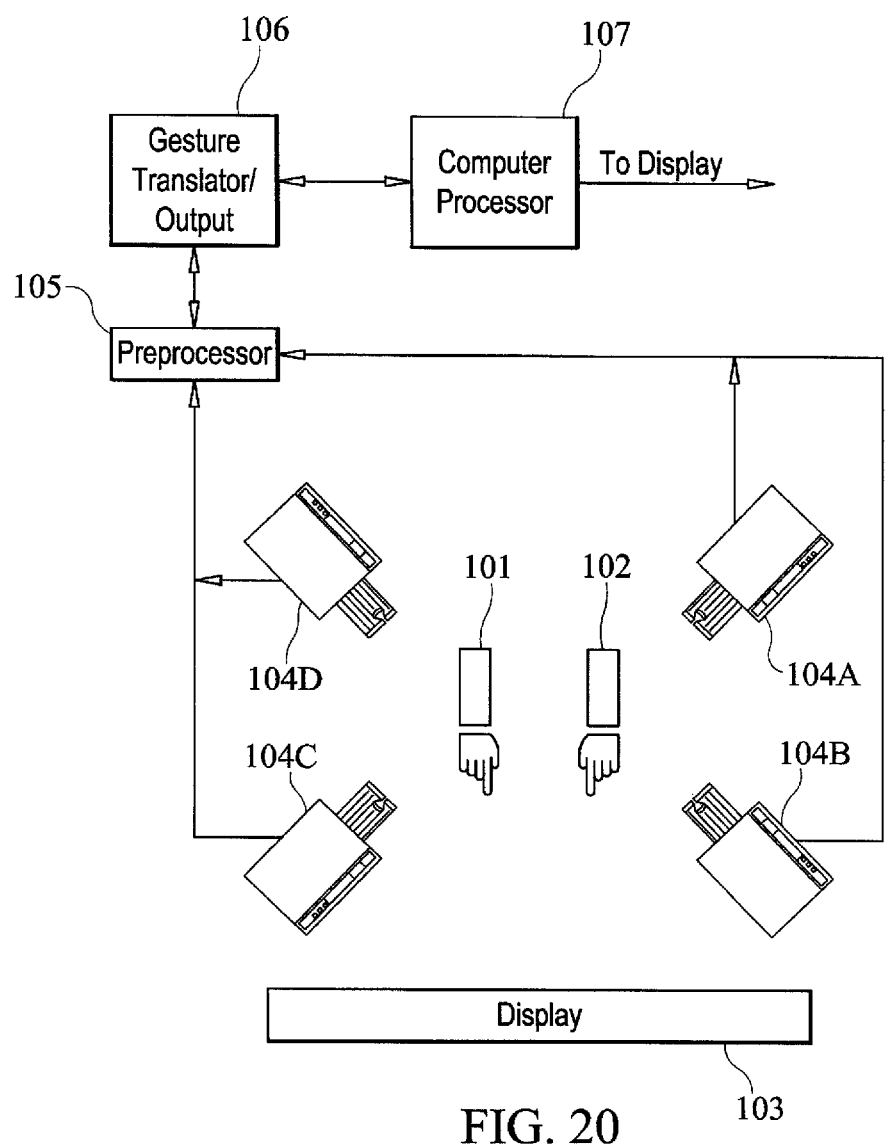
FIG. 20 is a block diagram of a gestural control system, under an embodiment.

Embodiments of a spatial-continuum input system are described herein in the context of a Spatial Operating Environment (SOE). As an example, FIG. 20 is a block diagram of a Spatial Operating Environment (SOE), under an embodiment. A user locates a hand 101 (or hands 101 and 102) in the viewing area 150 of an array of cameras (e.g., one or more cameras or sensors 104A-104D). The cameras detect location, orientation, and movement of the fingers and hands 101 and 102, as spatial tracking data, and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103. The systems and methods described in detail above for initializing real-time, vision-based hand tracking systems can be used in the SOE and in analogous systems, for example.

Although the system is shown with a single user's hands as input, the SOE 100 may be implemented using multiple users. In addition, instead of or in addition to hands, the system may track any part or parts of a user's body, including head, feet, legs, arms, elbows, knees, and the like.

While the SOE includes the vision-based interface performing hand or object tracking and shape recognition described herein, alternative embodiments use sensors comprising some number of cameras or sensors to detect the location, orientation, and movement of the user's hands in a local environment. In the example embodiment shown, one or more cameras or sensors are used to detect the location, orientation, and movement of the user's hands 101 and 102 in the viewing area 150. It should be understood that the SOE 100 may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE 100. Any number or positioning of cameras or sensors that permits the location, orientation, and movement of the user's hands may be used in the SOE 100.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magnetostatic, RFID, or any other suitable type of detection.

Pre-processor 105 generates three dimensional space point reconstruction and skeletal point labeling. The gesture translator 106 converts the 3D spatial information and marker motion information into a command language that can be interpreted by a computer processor to update the location, shape, and action of a cursor on a display. In an alternate embodiment of the SOE 100, the pre-processor 105 and gesture translator 106 are integrated or combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

While the embodiments described herein include markerless vision-based tracking systems, the SOE of an alternative embodiment contemplates the use of marker tags on one or more fingers of the user so that the system can locate the hands of the user, identify whether it is viewing a left or right hand, and which fingers are visible. This permits the system to detect the location, orientation, and movement of the user's hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labeling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 21.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 21:
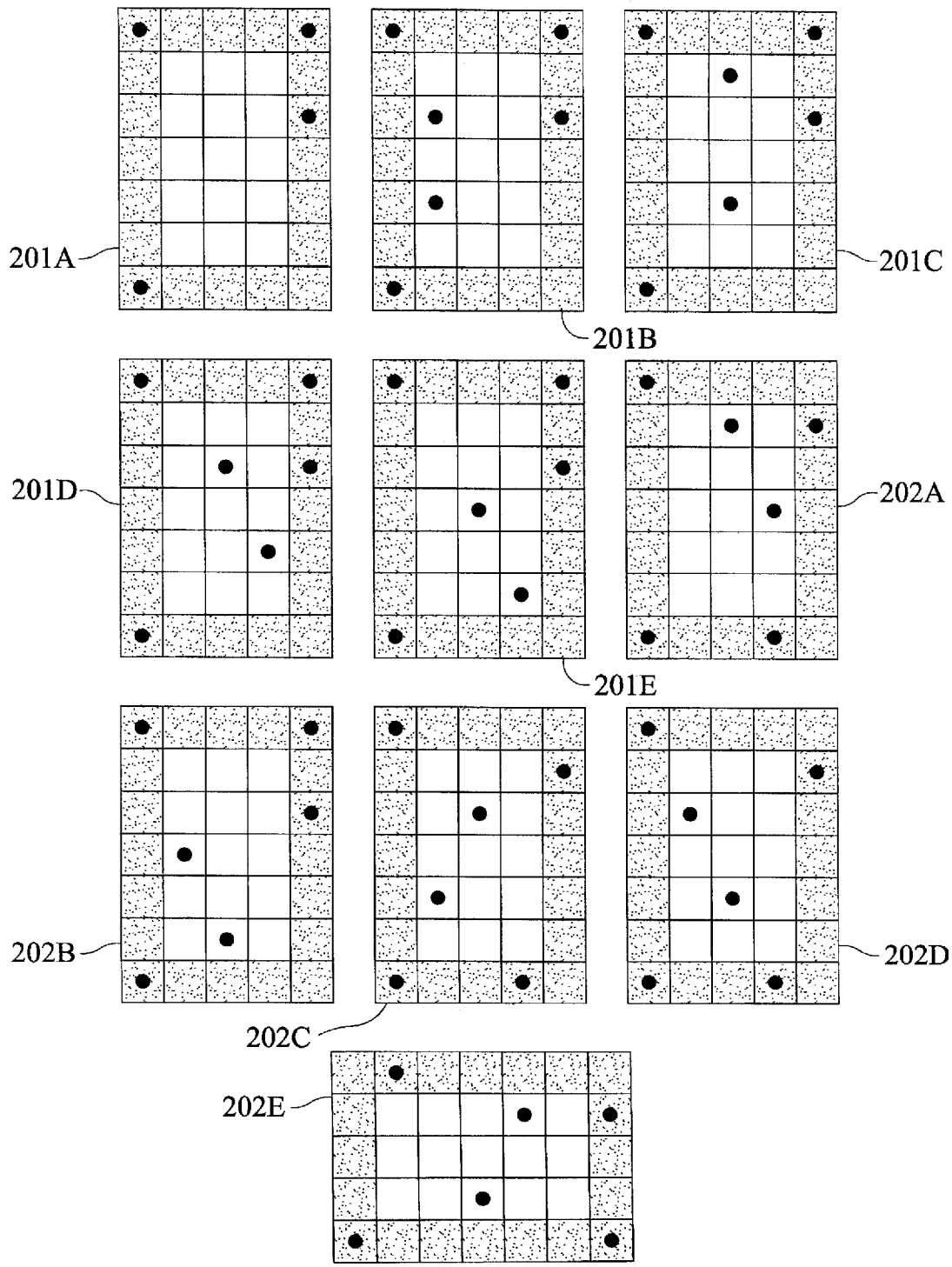
FIG. 21 is a diagram of marking tags, under an embodiment.

Referring now to FIG. 21, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 21) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 201A-201E while those attached to the right hand's fingers could be assigned a different pattern as shown in tags 202A-202E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'—individual markers directly onto the operator's fingers and hands.

Gesture Vocabulary

The SOE of an embodiment contemplates a gesture vocabulary comprising hand poses, orientation, hand combinations, and orientation blends. A notation language is also implemented for designing and communicating poses and gestures in the gesture vocabulary of the SOE. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's 'character locations' is then a unique description of the instantaneous state, or 'pose', of the linkage.

Hand Poses

FIG. 22 illustrates hand poses in an embodiment of a gesture vocabulary of the SOE, under an embodiment. The SOE supposes that each of the five fingers on a hand is used. These fingers are codes as p-pinkie, r-ring finger, m-middle finger, i-index finger, and t-thumb. A number of poses for the fingers and thumbs are defined and illustrated in FIG. 22. A gesture vocabulary string establishes a single character position for each expressible degree of freedom in the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

With continuing reference to FIG. 22, a number of poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the embodiments to use ASCII characters for the notation strings. Any suitable symbol, numeral, or other representation maybe used without departing from the scope and spirit of the embodiments. For example, the notation may use two bits per finger if desired or some other number of bits as desired.

A curled finger is represented by the character "^" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the embodiments. Each pose is represented by five characters with the order being p-r-m-i-t as described above. FIG. 22 illustrates a number of poses and a few are described here by way of illustration and example. The hand held flat and parallel to the ground is represented by "11111". A fist is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 23 illustrates hand orientation descriptors and examples of coding that combines pose and orientation. In an embodiment, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of an embodiment, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principle be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or nonlinear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[||||:vx] is a flat hand (thumb parallel to fingers) with palm facing down and fingers forward.

[||||:x^] is a flat hand with palm facing forward and fingers toward ceiling.

[||||:x] is a flat hand with palm facing toward the center of the body (right if left hand, left if right hand) and fingers forward.

[^^^-:-x] is a single-hand thumbs-up (with thumb pointing toward ceiling).

[^^|-:-x] is a mime gun pointing forward.

Two Hand Combination

The SOE of an embodiment contemplates single hand commands and poses, as well as two-handed commands and poses. FIG. 24 illustrates examples of two hand combinations and associated notation in an embodiment of the SOE. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 25, 26:
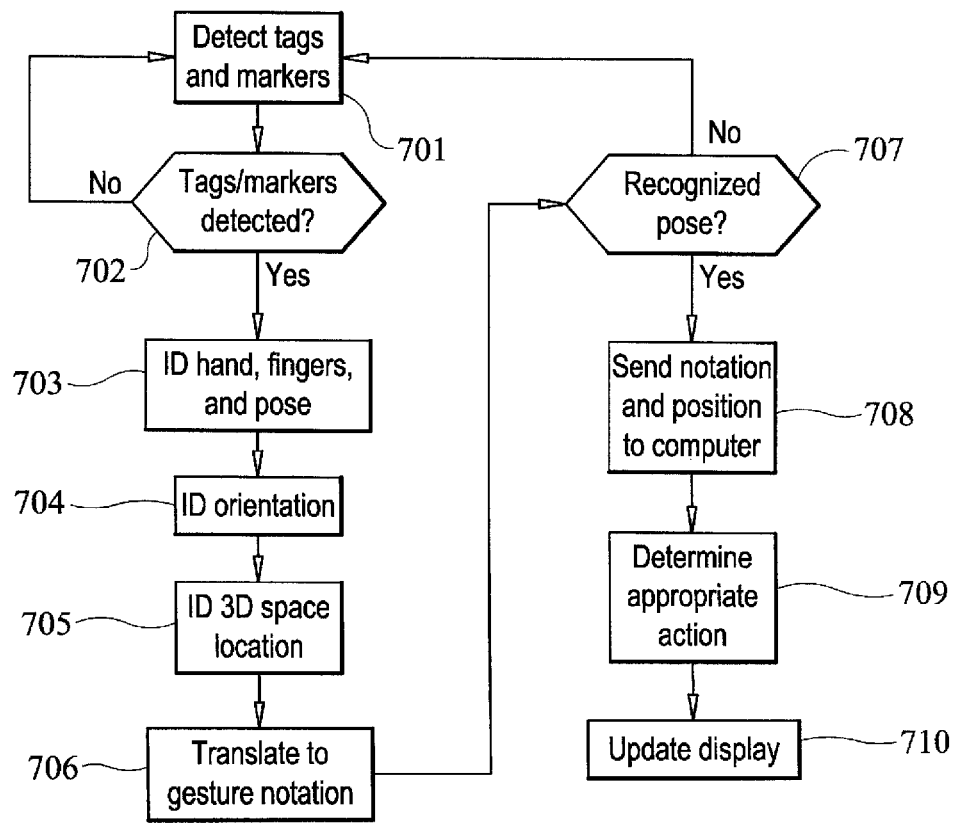
FIG. 25 is a diagram of orientation blends in a gesture vocabulary, under an embodiment.
FIG. 26 is a flow diagram of system operation, under an embodiment.

FIG. 25 illustrates an example of an orientation blend in an embodiment of the SOE. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

Example Commands

FIGS. 27/1 and 27/2 show a number of possible commands that may be used with the SOE. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

Operation

FIG. 26 is a flow diagram illustrating the operation of the SOE in one embodiment. At 701 the detection system detects the markers and tags. At 702 it is determined if the tags and markers are detected. If not, the system returns to 701. If the tags and markers are detected at 702, the system proceeds to 703. At 703 the system identifies the hand, fingers and pose from the detected tags and markers. At 704 the system identifies the orientation of the pose. At 705 the system identifies the three dimensional spatial location of the hand or hands that are detected. (Please note that any or all of 703, 704, and 705 may be combined).

At 706 the information is translated to the gesture notation described above. At 707 it is determined if the pose is valid. This may be accomplished via a simple string comparison using the generated notation string. If the pose is not valid, the system returns to 701. If the pose is valid, the system sends the notation and position information to the computer at 708. At 709 the computer determines the appropriate action to take in response to the gesture and updates the display accordingly at 710.

In one embodiment of the SOE, 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment comprises:

1) a compact and efficient way to specify (encode for use in computer programs) gestures at several different levels of aggregation:
 a. a single hand's "pose" (the configuration and orientation of the parts of the hand relative to one another) a single hand's orientation and position in three-dimensional space.
 b. two-handed combinations, for either hand taking into account pose, position or both.
 c. multi-person combinations; the system can track more than two hands, and so more than one person can cooperatively (or competitively, in the case of game applications) control the target system.
 d. sequential gestures in which poses are combined in a series; we call these "animating" gestures.
 e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of
 i) relative orientations between the fingers and the back of the hand,
 ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to,
 i) build complex contextual and conditional control states,
 ii) to dynamically add hysteresis to the control environment, and
 iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include, i) "entry" state notifiers and "continuation" state notifiers, and ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarily large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack that takes the computational objects and the mapping and outputs a graphical representation of the virtual space.

An input events processing stack which takes event data from a control system (in the current embodiment both gestural and pointing data from the system and mouse input)

and maps spatial data from input events to coordinates in virtual space. Translated events are then delivered to running applications.

A "glue layer" allowing the system to host applications running across several computers on a local area network.
Data Representation, Transit, and Interchange Embodiments of an SOE or spatial-continuum input system are described herein as comprising network-based data representation, transit, and interchange that includes a system called "plasma" that comprises subsystems "slawx", "proteins", and "pools", as described in detail below. The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 28:
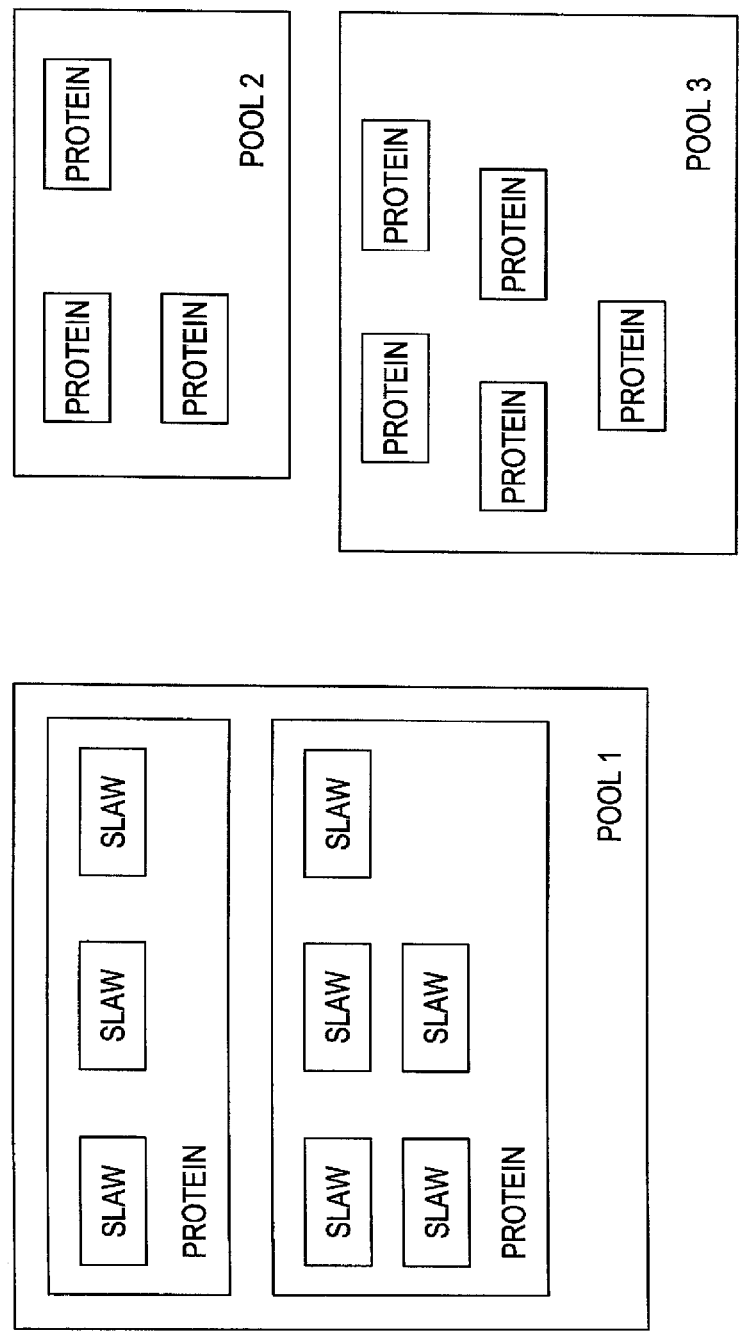
FIG. 28 is a block diagram of a processing environment including data representations using slawx, proteins, and pools, under an embodiment.

FIG. 28 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

Figure 29:
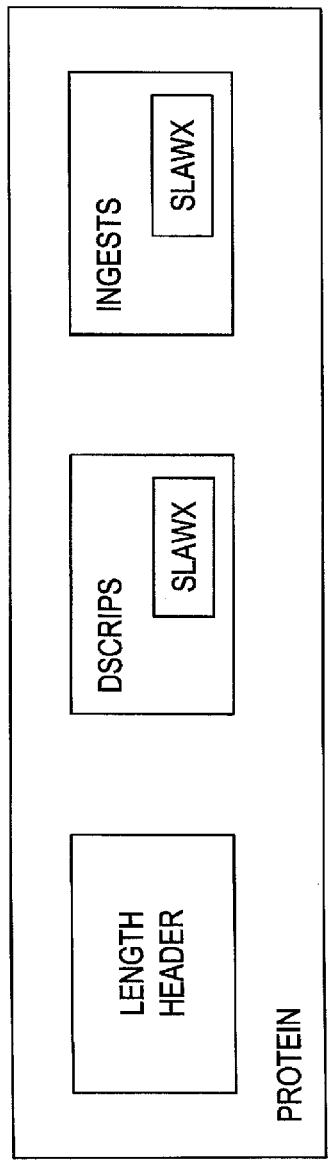
FIG. 29 is a block diagram of a protein, under an embodiment.

FIG. 29 is a block diagram of a protein, under an embodiment. The protein includes a length header, a descrip, and an ingest. Each of the descrip and ingest includes slaw or slawx, as described in detail below.

Figure 30:
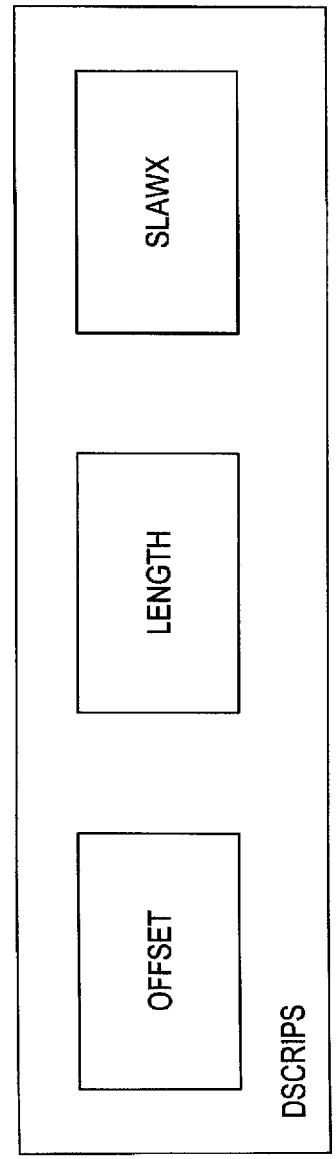
FIG. 30 is a block diagram of a descrip, under an embodiment.

FIG. 30 is a block diagram of a descrip, under an embodiment. The descrip includes an offset, a length, and slawx, as described in detail below.

Figure 31:
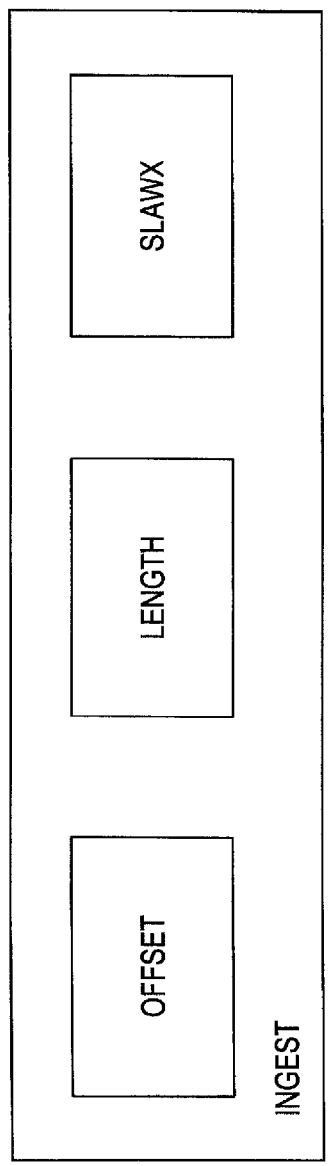
FIG. 31 is a block diagram of an ingest, under an embodiment.

FIG. 31 is a block diagram of an ingest, under an embodiment. The ingest includes an offset, a length, and slawx, as described in detail below.

Figure 32:
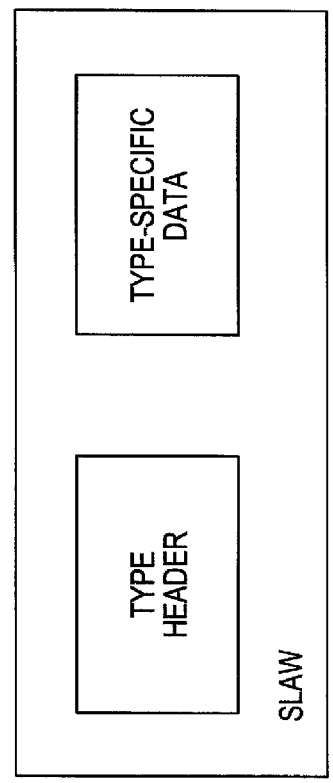
FIG. 32 is a block diagram of a slaw, under an embodiment.

FIG. 32 is a block diagram of a slaw, under an embodiment. The slaw includes a type header and type-specific data, as described in detail below.

Figure 33A:
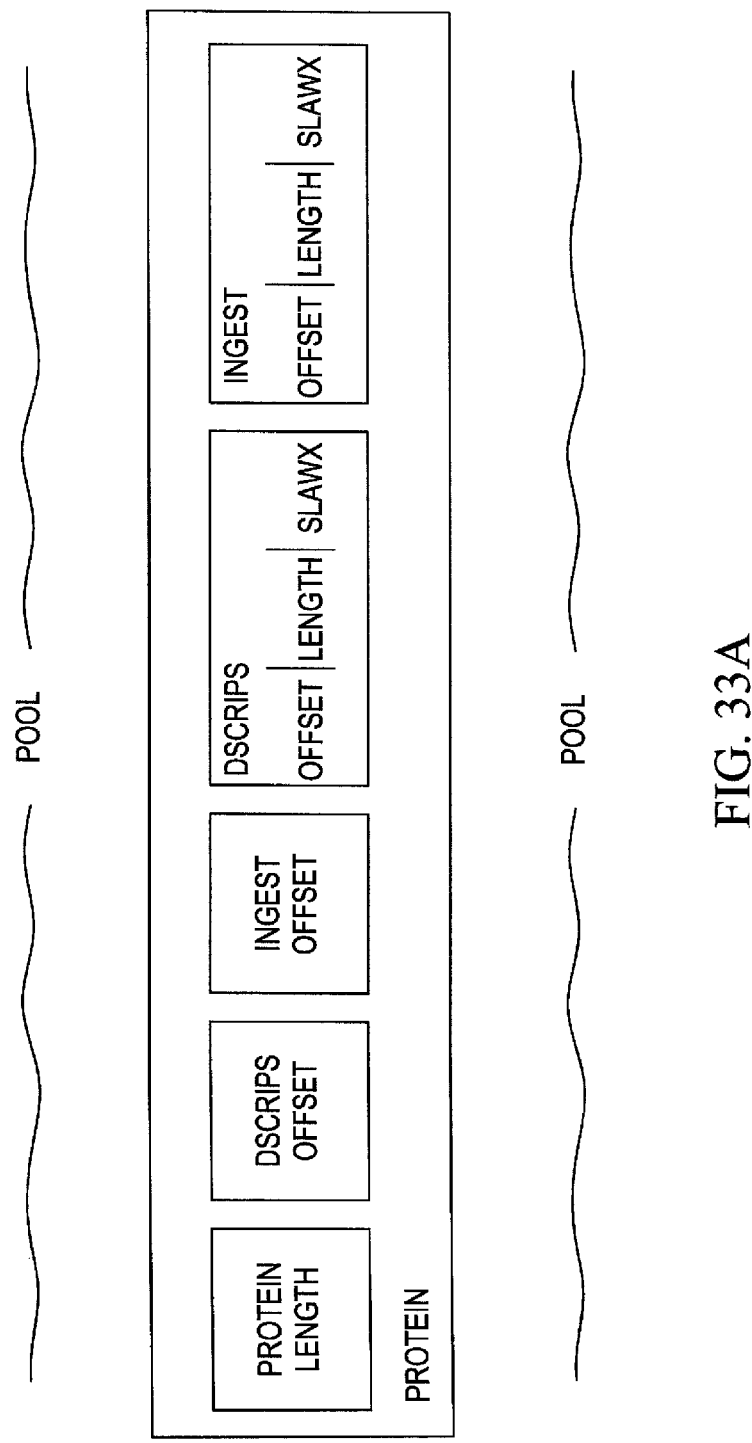
FIG. 33A is a block diagram of a protein in a pool, under an embodiment.

FIG. 33A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described above. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Referring to FIGS. 29 and 33A, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^32 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly. The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and a subsequent descrip entry. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIGS. 33B/1 and 33B2 show a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little-vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

Figure 33C:
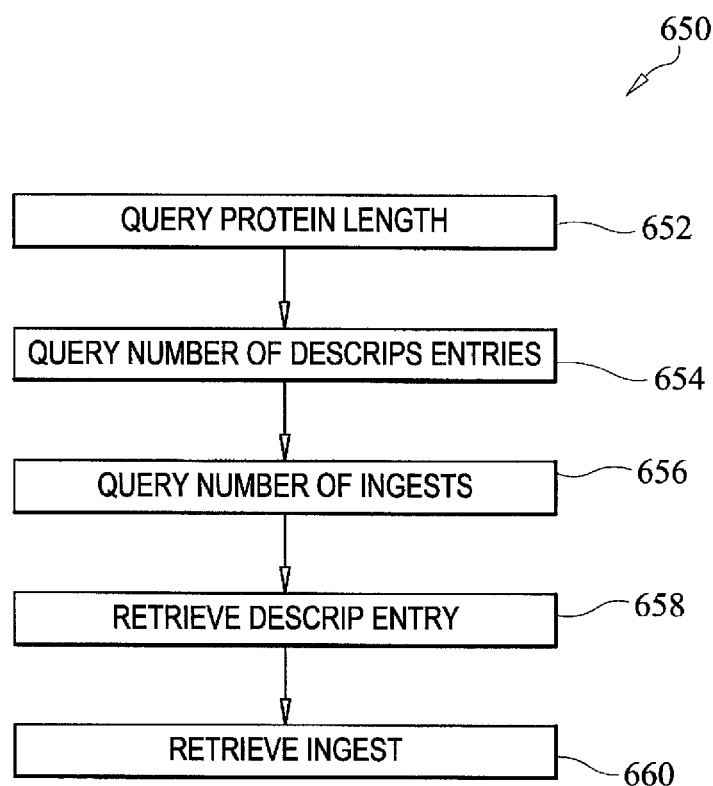
FIG. 33C is a flow diagram for using proteins, under an embodiment.

A minimal (and read-only) protein implementation of an embodiment includes operation or behavior in one or more applications or programming languages making use of proteins. FIG. 33C is a flow diagram 650 for using proteins, under an embodiment. Operation begins by querying 652 the length in bytes of a protein. The number of descrips entries is queried 654. The number of ingests is queried 656. A descrip entry is retrieved 658 by index number. An ingest is retrieved 660 by index number.

Figure 33D:
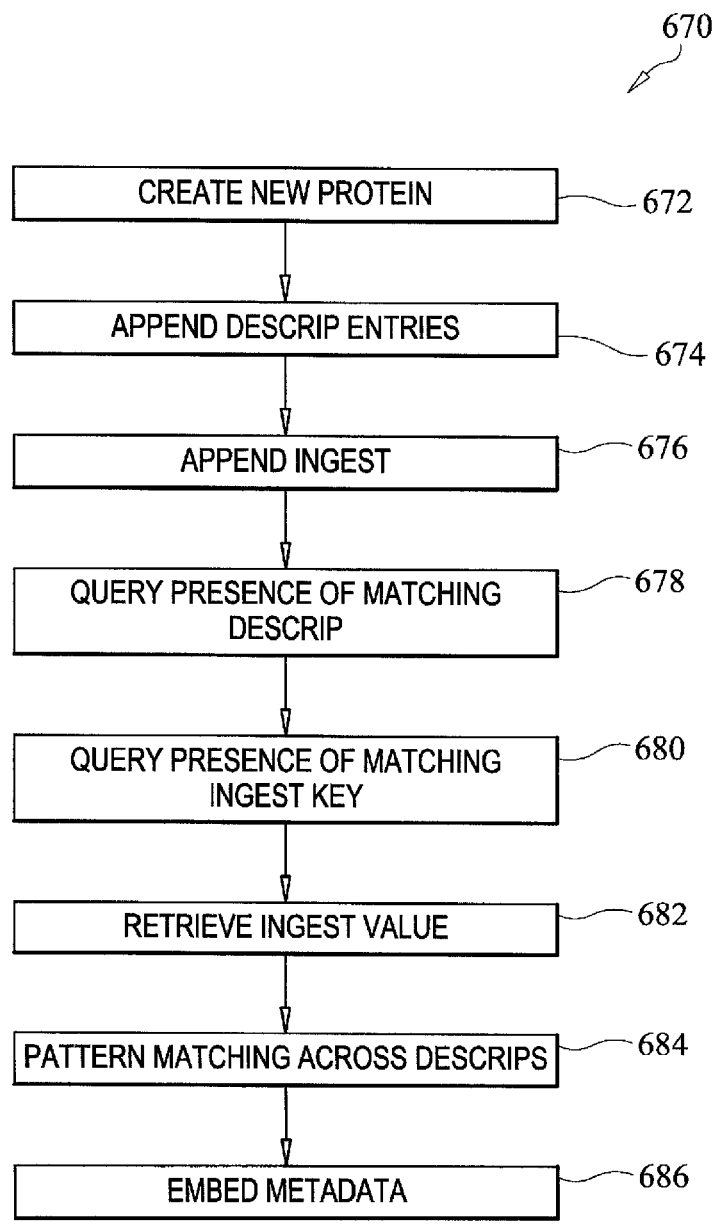
FIG. 33D is a flow diagram for constructing or generating proteins, under an embodiment.

The embodiments described herein also define basic methods allowing proteins to be constructed and filled with data, helper-methods that make common tasks easier for programmers, and hooks for creating optimizations. FIG. 33D is a flow diagram 670 for constructing or generating proteins, under an embodiment. Operation begins with creation 672 of a new protein. A series of descrips entries are appended 674. An ingest is also appended 676. The presence of a matching descrip is queried 678, and the presence of a matching ingest key is queried 680. Given an ingest key, an ingest value is retrieved 682. Pattern matching is performed 684 across descrips. Non-structured metadata is embedded 686 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

Figure 34:
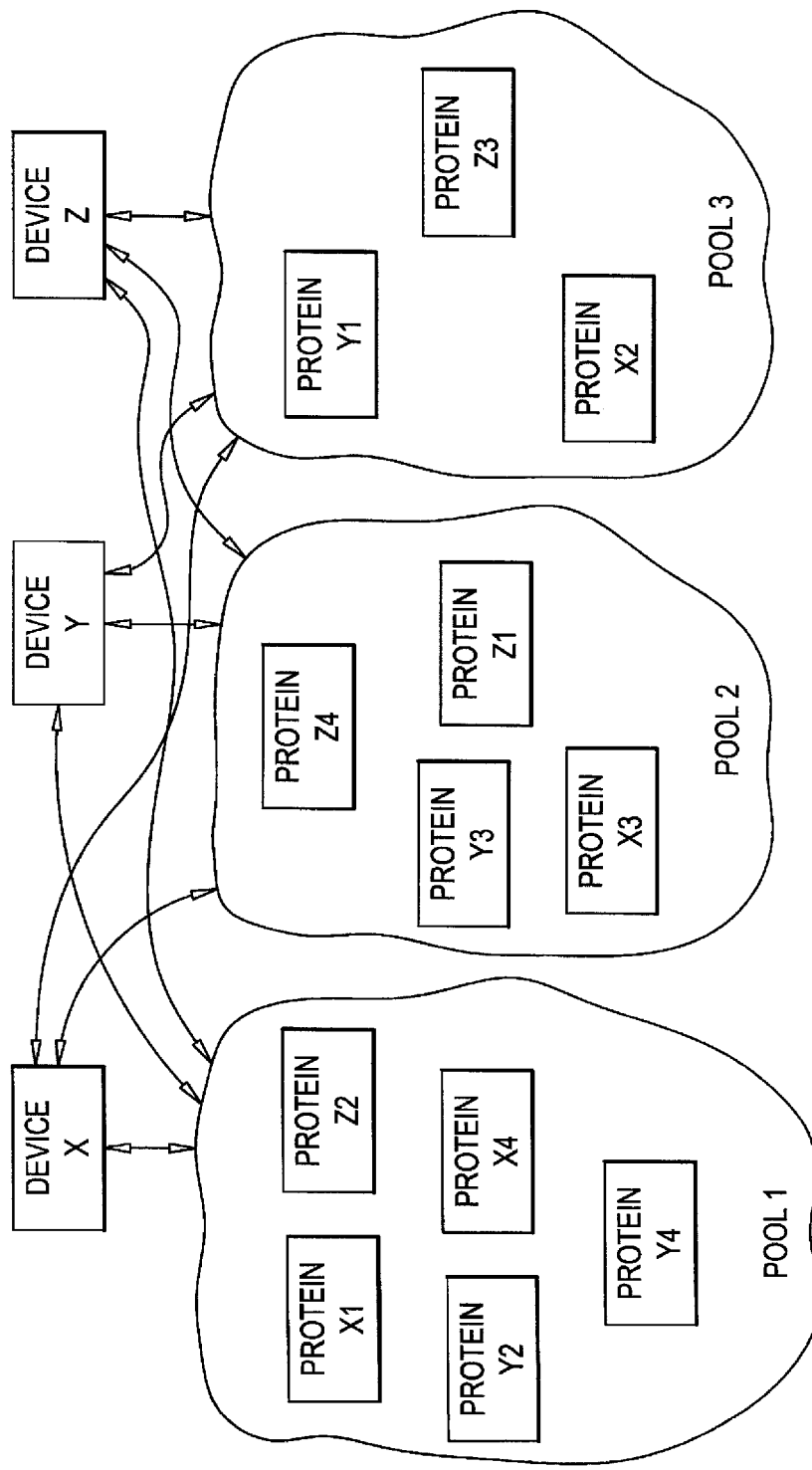
FIG. 34 is a block diagram of a processing environment including data exchange using slawx, proteins, and pools, under an embodiment.

The proteins described above are provided to pools as a way of sharing the protein data contents with other applications. FIG. 34 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices.

Figure 35:
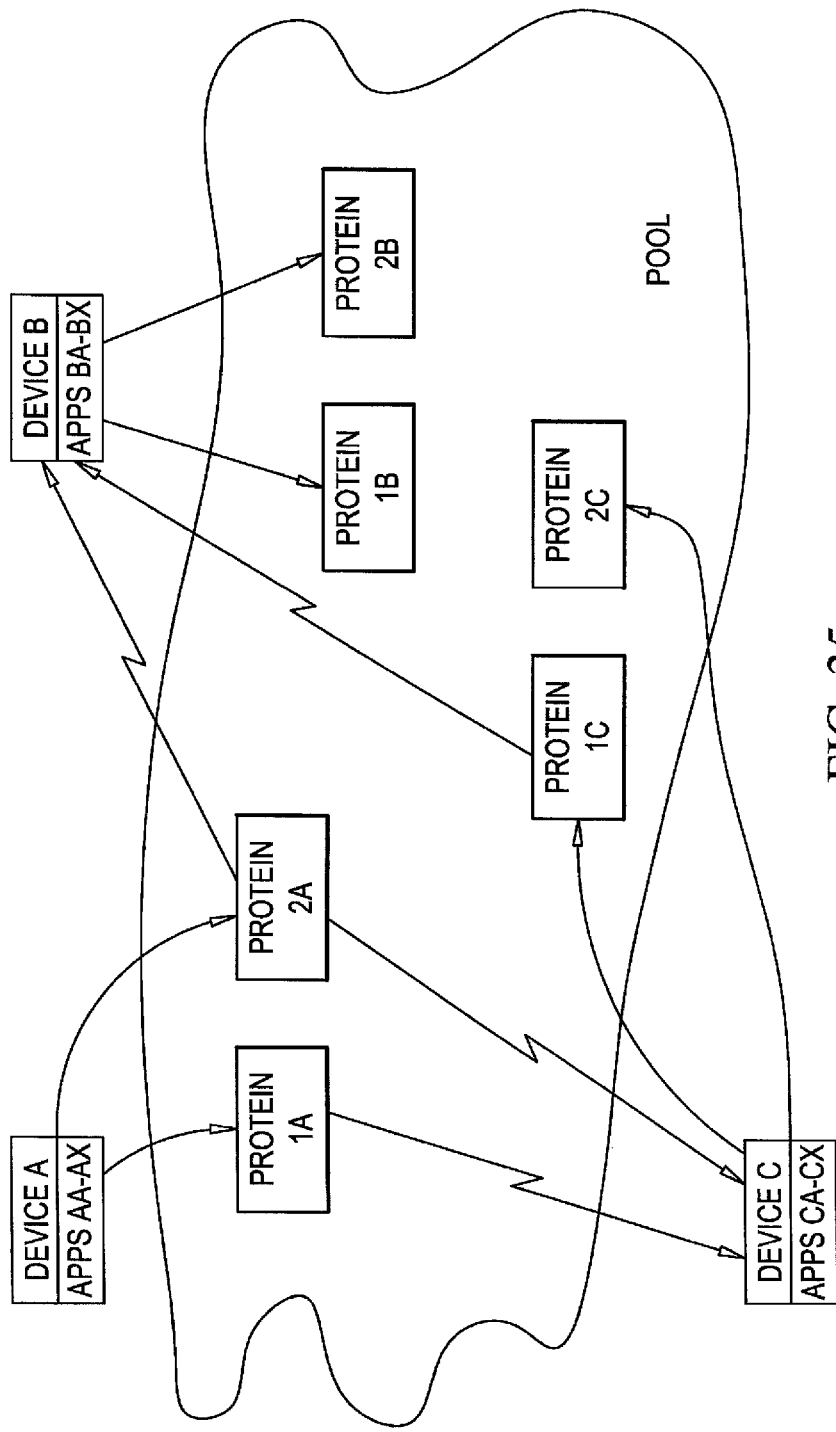
FIG. 35 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an embodiment.

FIG. 35 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 36:
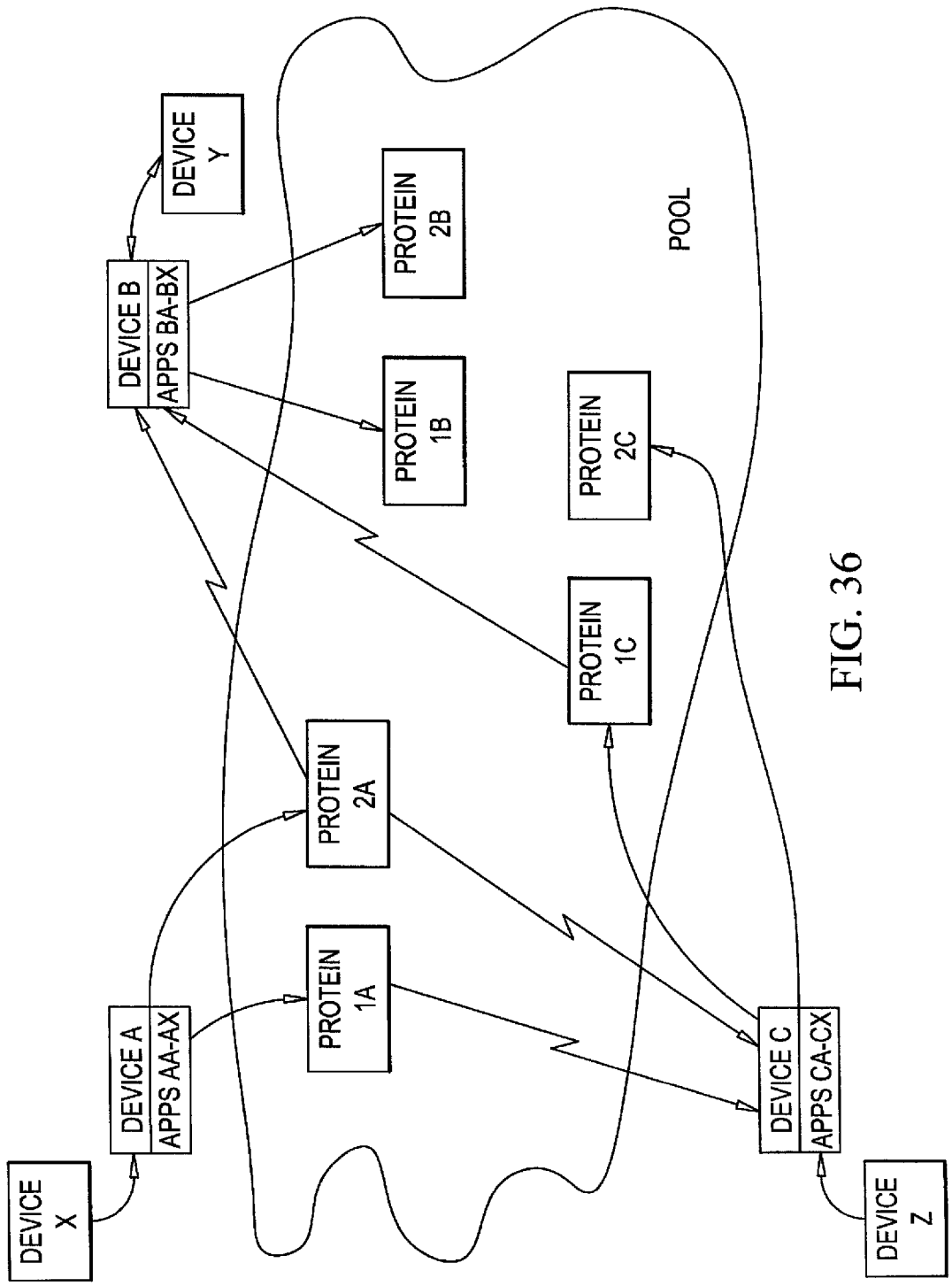
FIG. 36 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an alternative embodiment.

FIG. 36 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 37:
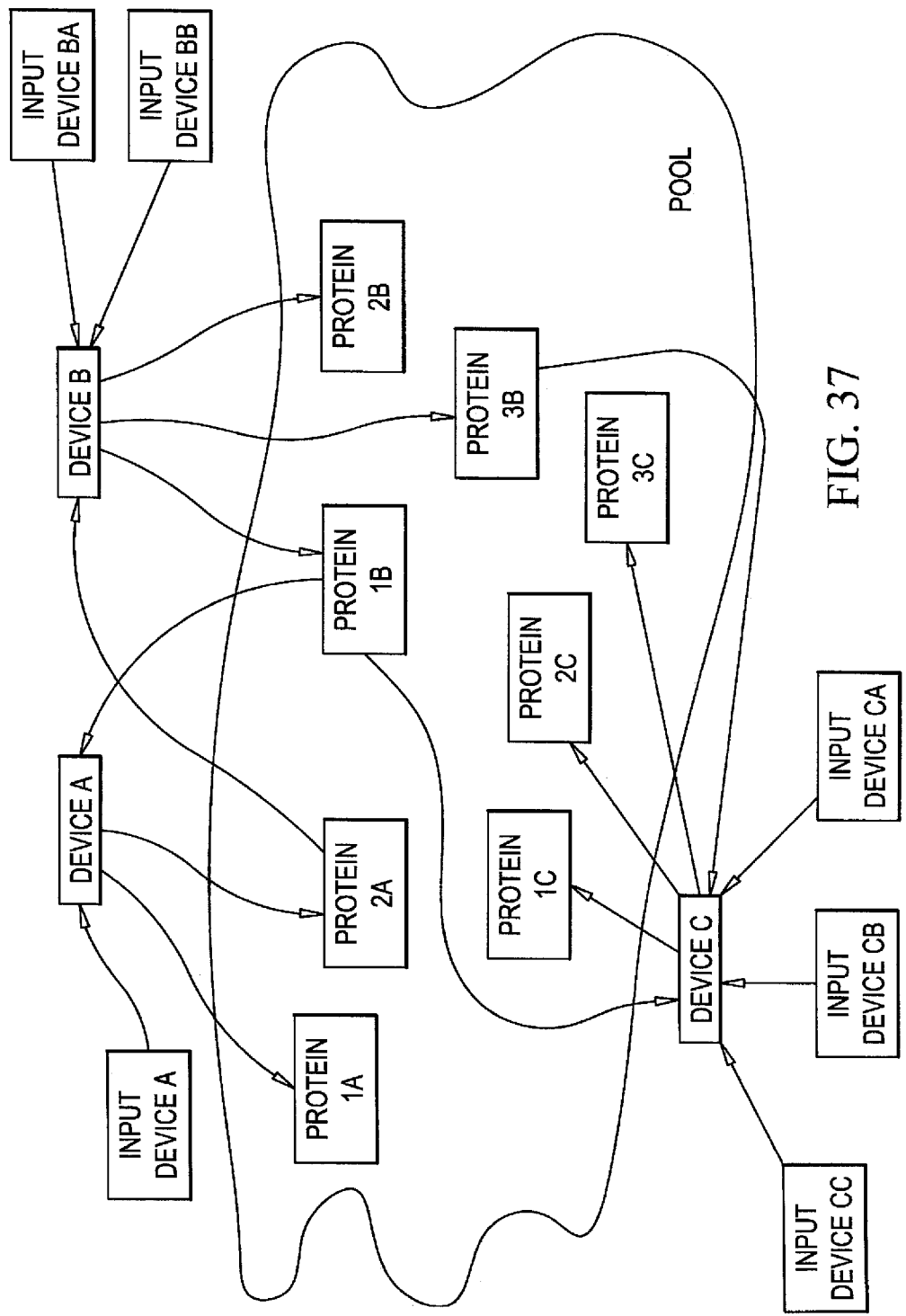
FIG. 37 is a block diagram of a processing environment including multiple input devices coupled among numerous programs running on one or more of the devices in which the Plasma constructs (i.e., pools, proteins, and slaw) are used to allow the numerous running programs to share and collectively respond to the events generated by the input devices, under another alternative embodiment.

FIG. 37 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

[Descrips: {point, engage, one, one-finger-engage, hand, pilot-id-02, hand-id-23}
    Ingests: {pilot-id=>02,
      hand-id=>23,
      pos=>[0.0, 0.0, 0.0]
      angle-axis=>[0.0, 0.0, 0.0, 0.707]
      gripe=> . . . ^‖:vx
      time=>184437103.29}]

As a further example, the protein describing a mouse click is as follows:

[Descrips: {point, click, one, mouse-click, button-one, mouse-id-02}
    Ingests: {mouse-id=>23,
      pos=>[0.0, 0.0, 0.0]
      time=>184437124.80}]

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 38:
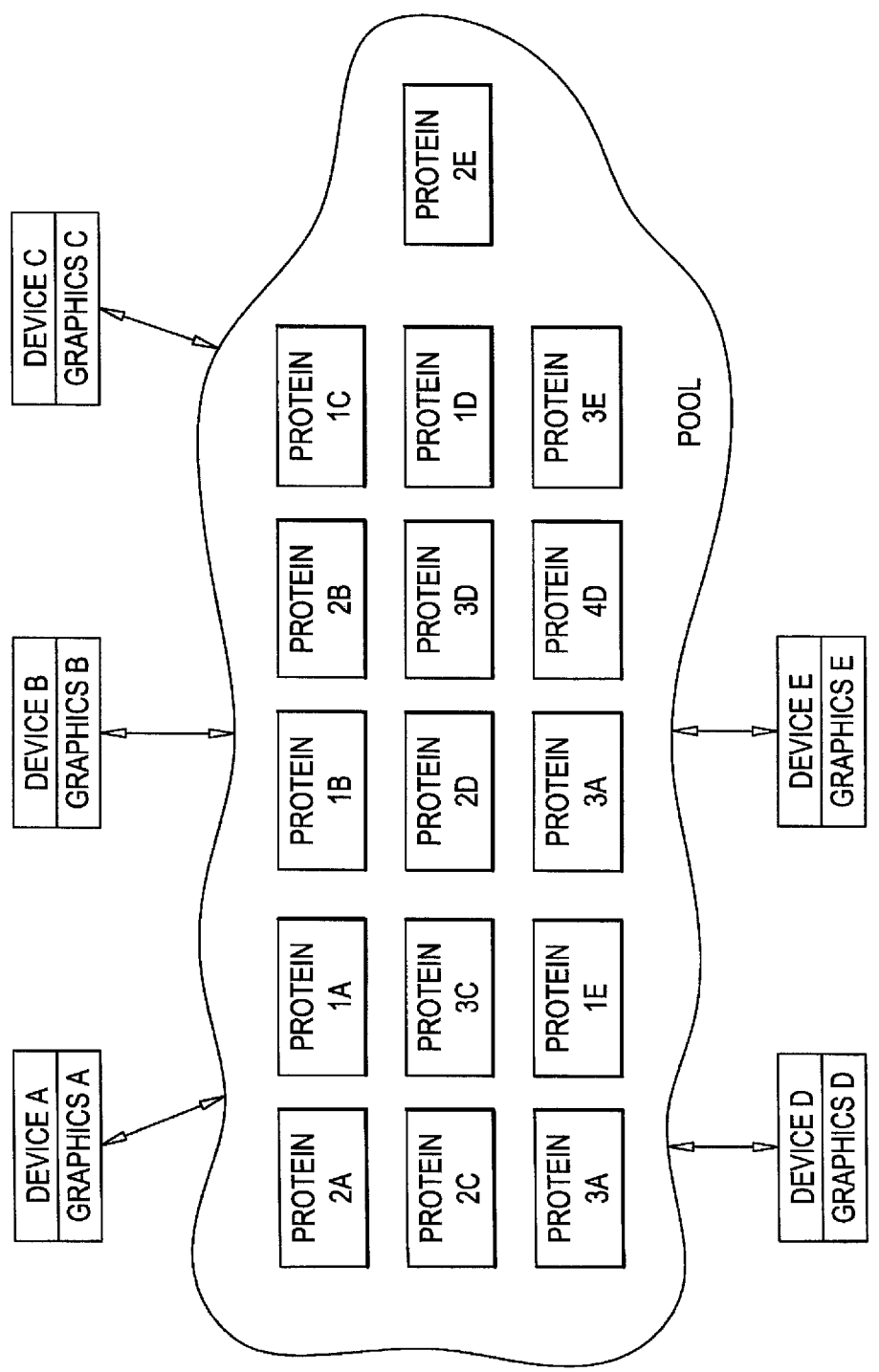
FIG. 38 is a block diagram of a processing environment including multiple devices coupled among numerous programs running on one or more of the devices in which the Plasma constructs (i.e., pools, proteins, and slaw) are used to allow the numerous running programs to share and collectively respond to the graphics events generated by the devices, under yet another alternative embodiment.

FIG. 38 is a block diagram of a processing environment including multiple devices coupled among numerous programs miming on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the miming programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

Figure 39:
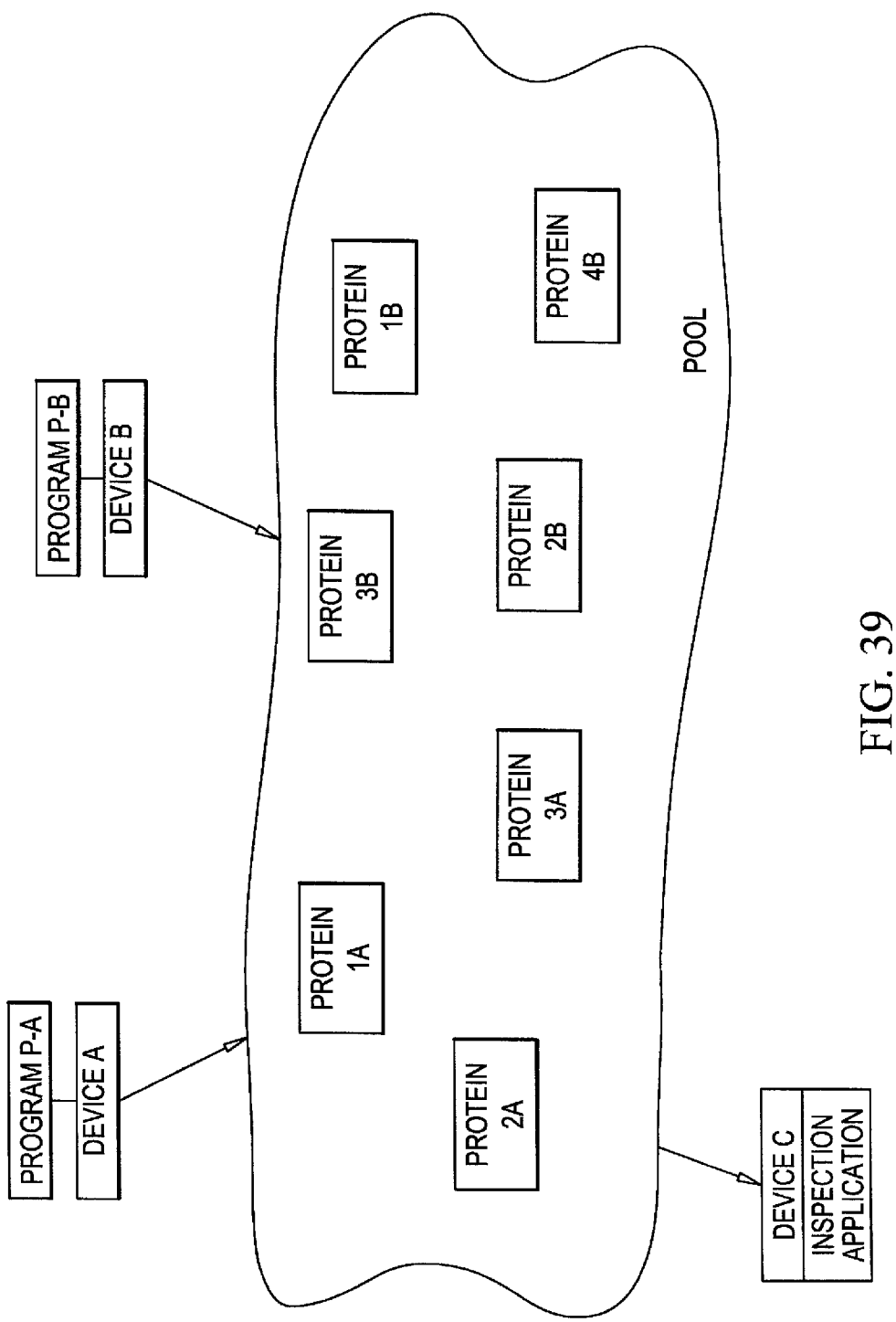
FIG. 39 is a block diagram of a processing environment including multiple devices coupled among numerous programs running on one or more of the devices in which the Plasma constructs (i.e., pools, proteins, and slaw) are used to allow stateful inspection, visualization, and debugging of the running programs, under still another alternative embodiment.

FIG. 39 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 39, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 40:
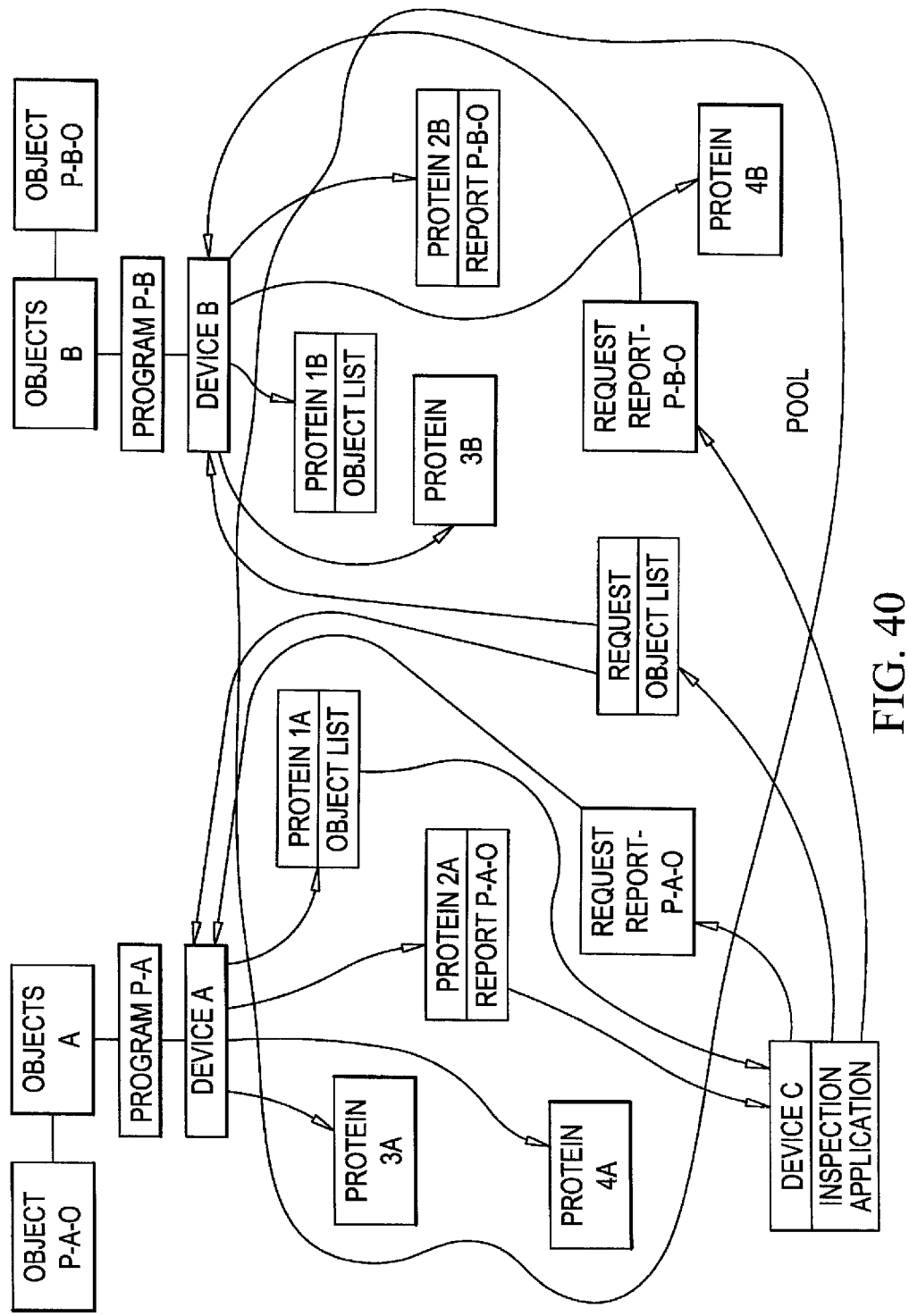
FIG. 40 is a block diagram of a processing environment including multiple devices coupled among numerous programs running on one or more of the devices in which the Plasma constructs (i.e., pools, proteins, and slaw) are used to allow influence or control the characteristics of state information produced and placed in that process pool, under an additional alternative embodiment.

FIG. 40 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments of, and examples for, are described herein for illustrative purposes, various equivalent modifications are possible within the scope of other systems and methods, as those skilled in the relevant art will recognize. The teachings of the embodiments provided herein can be applied to other processing systems and methods, not only for the systems and methods described above.

The elements and acts of the various embodiments described above can be combined to provide further embodiments. These and other changes can be made to the embodiments in light of the above detailed description.

What is claimed is:

1. A method of decoupling plurality of applications in a processing environment of a plurality of devices, the method comprising:
    detecting an event of a source device;
    generating at least one data sequence comprising device event data specifying the event am state information of the event, wherein the device event data and state information are type-specific data having a type corresponding to an application of the source device;
    forming a data capsule to include the at least one data sequence, the data capsule having a data structure comprising an application-independent representation of the at least one data sequence;
    selecting a repository of a plurality of repositories, according to at least one of a type of the device event data and a destination application;
    transferring the data capsule into the selected repository;
    maintaining intact the at least one data sequence of the data capsule during the transferring;
    detecting a second event of a second source device;
    searching the repository for data capsules corresponding to the second event identifying a correspondence between the data capsule and the second event, wherein the searching includes skimming backwards and skimming forwards to determine whether the data capsules corresponding to the second event has appeared in conjunction with certain others;
    extracting the data capsule from the repository in response to the identifying; and
    executing on behalf of the second source device a processing operation corresponding to the second event on behalf of the second source device in response to contents of the data capsule, wherein the source device corresponds to an application of a first type and the second source device corresponds to a second application of a second type.

2. The method of claim 1, wherein the generating of the at least one data sequence comprises:
    generating a first respective data set that includes first respective device event data;
    generating a second respective data set that includes second respective state information; and
    forming a first data sequence to include the first respective data set and the second respective data set.

3. The method of claim 2, wherein the generating of the first respective data set includes forming the first respective data set to include identification data of the source device, the identification data including data identifying the source device.

4. The method of claim 2, wherein the generating of the at least one data sequence comprises:
    generating a first respective data set that includes first respective device event data;
    generating a second respective data set that includes second respective state information; and
    forming a second data sequence to include the first respective data set and the second respective data set.

5. The method of claim 4, wherein the generating of the first respective data set includes generating a first respective data set offset, wherein the first respective data set offset points to the first respective data set of the second data sequence.

6. The method of claim 4, wherein the generating of the second respective data set includes generating a second respective data set offset, wherein the second respective data set offset points to the second respective data set of the second data sequence.

7. The method of claim 2, wherein the first respective data set is a description list, the description list including a description of the data.

8. The method of claim 1, wherein the device event data is a tagged byte-sequence representing typed data.

9. The method of claim 8, wherein the device event data includes a type header and a type-specific data layout.

10. The method of claim 1, wherein the state information is a tagged byte-sequence representing typed data.

11. The method of claim 10, wherein the state information includes a type header and a type-specific data layout.

12. The method of claim 1, comprising:
    generating at least one offset; and
    forming the data capsule to include the at least one offset.

13. The method of claim 12, comprising:
    generating a first offset having a first variable length,
    wherein the first offset points to the device event data of a first data sequence of the at least one data sequence.

14. The method of claim 12, comprising:
    generating a second offset having a second variable length,
    wherein the second offset points to the state information of a first data sequence of the at least one data sequence.

15. The method of claim 12, comprising:
    forming a first code path through the data capsule using a first offset of the at least one offset; and
    forming a second code path through the data capsule using a second offset of the at least one offset,
    wherein the first code path and the second code path are different paths.

16. The method of claim 12, wherein at least one of the first offset and the second offset include metadata, the metadata comprising context-specific metadata corresponding to a context of the application.

17. The method of claim 1, comprising:
generating a header that includes a length of the data capsule; and
forming the data capsule to include the header.

18. The method of claim 1, wherein the repository is coupled to the plurality of applications, wherein the repository includes a plurality of data capsules corresponding to the plurality of applications, the repository providing access to the plurality of data capsules by the plurality of applications, and wherein at least two applications of the plurality of applications are different applications.

19. The method of claim 1, wherein the repository provides state caching of a plurality of data capsules.

20. The method of claim 1, wherein the repository provides linear sequencing of a plurality of data capsules.

21. The method of claim 1, wherein the plurality of repositories includes an input pool.

22. The method of claim 21, wherein the type of the device event data comprises tracking data.

23. The method of claim 21, wherein the destination application is a gesture recognition application.

24. The method of claim 1, wherein the plurality of repositories includes an output pool.

25. The method of claim 24, wherein the type of the device event data comprises gestural event data.

26. The method of claim 24, wherein the destination application is a gesture-aware application.

27. The method of claim 1, wherein the data structure is untyped.

28. The method of claim 1, wherein the data structure of the data capsule provides a platform-independent representation of the device event data and the state information.

29. The method of claim 1, wherein the data structure of the data capsule provides platform-independent access to the device event data and the state information.

30. The method of claim 1, comprising:
transferring the data capsule from a first application having a first application type to at least one second application having at least one second application type, wherein the first application type is different than the second application type, and wherein the generating of the at least one data sequence was executed by the first application.

31. The method of claim 30, comprising using the at least one data sequence during operations of the second application.

32. The method of claim 1, wherein the event comprises a user interface event.

33. The method of claim 1, wherein the event comprises a graphics event.

34. The method of claim 1, wherein the event comprises depositing of state information.

* * * * *